(12) United States Patent
Chino

(10) Patent No.: US 10,704,610 B2
(45) Date of Patent: Jul. 7, 2020

(54) CLUTCH, DRIVE TRANSMISSION DEVICE AND IMAGE FORMING APPARATUS

(71) Applicant: CANON KABUSHIKI KAISHA, Tokyo (JP)

(72) Inventor: Hideto Chino, Ashigarakami-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 15/848,295

(22) Filed: Dec. 20, 2017

(65) Prior Publication Data

US 2018/0195560 A1    Jul. 12, 2018

(30) Foreign Application Priority Data

Jan. 11, 2017  (JP) .................... 2017-002417
Jun. 20, 2017  (JP) .................... 2017-120277
Oct. 30, 2017  (JP) .................... 2017-208848

(51) Int. Cl.
  *F16D 13/16*  (2006.01)
  *F16D 23/12*  (2006.01)
  (Continued)

(52) U.S. Cl.
  CPC ............ *F16D 13/16* (2013.01); *F16D 23/12* (2013.01); *F16D 41/06* (2013.01); *G03G 15/757* (2013.01);
  (Continued)

(58) Field of Classification Search
  CPC ........ G02B 7/04; G03B 1/40; G03G 21/1857; G03G 21/186; G03G 15/757; B64H 1/14;
  (Continued)

(56) References Cited

U.S. PATENT DOCUMENTS 2,060,376 A    11/1936  Jex
3,315,493 A *   4/1967  Woodhouse ............ F16D 7/025
                                                  464/23
(Continued)

FOREIGN PATENT DOCUMENTS

BE          431619 A    1/1939
CN        101002033 A   7/2007
(Continued)

OTHER PUBLICATIONS

Japanese Office Action issued in corresponding Japanese Application No. 2017-208848 dated Jun. 25, 2019.
(Continued)

*Primary Examiner* — Tinh Dang
(74) *Attorney, Agent, or Firm* — Venable LLP

(57) ABSTRACT

A clutch includes a rotatable inputting member, a rotatable outputting member, a stationary member, and a contact member. The outputting member includes an output contact portion. The contact member is positioned between the outputting member and the stationary member and includes an arcuate first contact surface and a second contact surface. When the input torque for rotating the inputting member is inputted, the outputting member and the contact member rotate in contact with the inputting member. When a reverse input torque for rotating the outputting member is inputted, the outputting member is spaced from the inputting member, and the output contact portion of the outputting member urges the first contact surface against the stationary member by urging the second contact surface of the contact member thereby to prevent rotation of the outputting member.

24 Claims, 40 Drawing Sheets

(51) Int. Cl.
*G03G 15/00* (2006.01)
*B65H 1/14* (2006.01)
*F16D 41/06* (2006.01)

(52) U.S. Cl.
CPC .......... *F16D 2023/123* (2013.01); *F16D 2041/0601* (2013.01); *F16D 2041/0606* (2013.01)

(58) Field of Classification Search
CPC ........... B65H 2403/70; B65H 2403/72; B65H 2403/721; B65H 2403/724; B65H 2403/73; B65H 2403/732; B65H 63/0368; F16D 13/16; F16D 23/12; F16D 2023/123; F16D 41/06
See application file for complete search history.

(56) References Cited

U.S. PATENT DOCUMENTS

| | | | |
|---|---|---|---|
| 3,447,650 A | | 6/1969 | Dossier |
| 5,411,122 A | * | 5/1995 | Uphaus ............... F16D 13/26 192/110 B |
| 5,520,272 A | * | 5/1996 | Ewer .................... F16D 11/14 192/36 |
| 9,163,678 B2 | * | 10/2015 | Strong .................. F16D 41/06 |
| 9,309,066 B2 | * | 4/2016 | Yamamoto ............ B65H 5/06 |
| 10,280,982 B2 | * | 5/2019 | Ueno .................... B65H 5/06 |
| 2001/0010280 A1 | | 8/2001 | Torii et al. |
| 2011/0026971 A1 | | 2/2011 | Ino et al. |
| 2011/0052276 A1 | | 3/2011 | Taoka |
| 2014/0140745 A1 | | 5/2014 | Choi et al. |
| 2014/0315680 A1 | | 10/2014 | Muramatsu et al. |
| 2014/0332335 A1 | | 11/2014 | Strong |
| 2017/0248211 A1 | | 8/2017 | Chino |

FOREIGN PATENT DOCUMENTS

| | | |
|---|---|---|
| CN | 101989055 A | 3/2011 |
| CN | 102001535 A | 4/2011 |
| CN | 103823343 A | 5/2014 |
| CN | 103946753 A | 7/2014 |
| CN | 105190074 A | 12/2015 |
| DE | 102004022368 A1 | 1/2006 |
| JP | 10246304 A | 9/1998 |
| JP | 2002089591 A | 3/2002 |
| JP | 2008-101715 A | 5/2008 |
| JP | 2009-198949 A | 9/2009 |
| JP | 2009287605 A | 12/2009 |
| JP | 2010286016 A | 12/2010 |
| JP | 2015-018040 A | 1/2015 |
| JP | 2017137937 A | 8/2017 |
| WO | 2005093276 A1 | 10/2005 |

OTHER PUBLICATIONS

European Search Report issued in corresponding EP Application 17208346 dated Jul. 2, 2018.
European communication pursuant to Article 94(3) EPC dated Mar. 21, 2019 in corresponding European Application No. 17208346.1.
Office Action dated Oct. 29, 2019, in Chinese Application No. 201810013088.9.

* cited by examiner (a)

(b)

(a)

(b)

(a)

(b)

(a)

(b)

(a)

(b)

(a)

(b)

(a)

(b)

(a)

(b)

(a)

(b)

CLUTCH, DRIVE TRANSMISSION DEVICE AND IMAGE FORMING APPARATUS

FIELD OF THE INVENTION AND RELATED ART

The present invention relates to a clutch having a function of not only transmitting an input torque from an inputting member to an outputting member but also blocking (cutting off) a torque inputted from the outputting member toward the inputting member, and relates to a drive transmission device including the clutch and an image forming apparatus including the drive transmission device.

Conventionally, as a drive transmitting means for not only transmitting an input torque from an inputting member side to an outputting member side but also blocking a torque inputted from the outputting member side toward the inputting member side (this torque is referred to as a reverse input torque), there are reverse input cutoff clutches (Japanese Laid-Open Patent Application (JP-A) 2008-101715 and JP-A 2009-198949. JP-A 2008-101715 discloses an example of the reverse input cutoff clutch.

The reverse input cutoff clutch disclosed in JP-A 2008-101715 is a combination of an inputting member, an outputting member, an intermediary member including a roller or a ball or the like, and a cylindrical housing member of which rotation is constrained. The inputting member includes a plurality of input engaging pieces extending in a radially outward direction with certain intervals. The outputting member includes a plurality of output engaging pieces extending in a radially outward direction.

In the reverse input cutoff clutch of JP-A 2008-101715, the intermediary member is accommodated in a wedge-shaped space formed between the outputting member and the housing member, and is urged by a spring member in an inner peripheral direction.

This intermediary member is operated in a locked state in which the intermediary member bites between the outputting member and the housing member and a lock-released state in which the intermediary member rotates while slide-contacting an inner peripheral surface of the housing member. As a result the reverse input cutoff clutch of JP-A 2008-101715 has a constitution in which transmission of the input torque from the inputting member to the outputting member and cutting-off (blocking) of the reverse input torque from the outputting member toward the inputting member are controlled.

JP-A 2009-198949 discloses a constitution in which a reverse input cutoff clutch is provided for the purpose of silencing an image heating device including a cam for changing a pressure of a nip between a heating roller and a pressing roller.

However, in the reverse input cutoff clutch of JP-A 2008-101715, the intermediary member is formed in a spherical shape or a circular shape, and therefore, when the intermediary member is in a rest state, by wedge action, a relatively large point pressure generates at a contact portion thereof with the housing member.

In order to reduce the pressure, there was a need that not only a plurality of intermediary members are provided radially at several positions between the inputting member and the outputting member with certain intervals but also the input engaging pieces and the output engaging pieces are provided in the number corresponding to the number of the intermediary members.

Further, in the drive transmitting means in which a relatively large reverse input torque generates, also the point pressure increases, and therefore, there was a need that as materials of the housing member, the intermediary member and the like, materials, such as a metallic material, which are resistant to abrasion and breakage are used.

From the above-described reasons, the conventional reverse input cutoff clutches caused a problem such that a structure was liable to be complicated since the structure included the intermediary members at the several positions. Further, the problem also led to an increase in number of component parts constituting the reverse input cutoff clutch and an increase in cost due to use of an expensive material such as the metallic material.

SUMMARY OF THE INVENTION

A principal object of the present invention is to provide a clutch having a simple and inexpensive constitution.

According to an aspect of the present invention, there is provided a clutch comprising: an inputting member rotatable by input of an input torque; a rotatable outputting member to which the input torque is transmitted through the inputting member; a stationary member including a cylindrical inner wall surface surrounding the inputting member and the outputting member and configured to be mounted on a mounting portion in a rotation-prevented state; and a contact member contactable to the inputting member, the outputting member and the stationary member, wherein the outputting member includes an output contact portion contactable to the inputting member, wherein the contact member is positioned between the outputting member and the stationary member and includes an arcuate first contact surface contacting the cylindrical inner wall surface of the stationary member and a second contact surface contactable to the output contact portion, wherein when the input torque for rotating the inputting member is inputted, the outputting member and the contact member rotate in contact with the inputting member, and wherein when a reverse input torque for rotating the outputting member is inputted, the outputting member is spaced from the inputting member, and the output contact portion of the outputting member urges the first contact surface against the stationary member by urging the second contact surface of the contact member thereby to prevent rotation of the outputting member.

Further features of the present invention will become apparent from the following description of exemplary embodiments with reference to the attached drawings.

BRIEF DESCRIPTION OF THE DRAWINGS

Parts (a) and (b) of FIG. 1 are perspective views of a clutch in First Embodiment.

Figure 3:
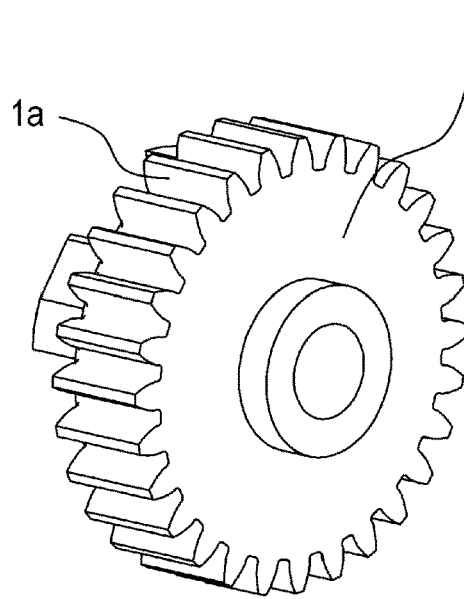
Figure 3:
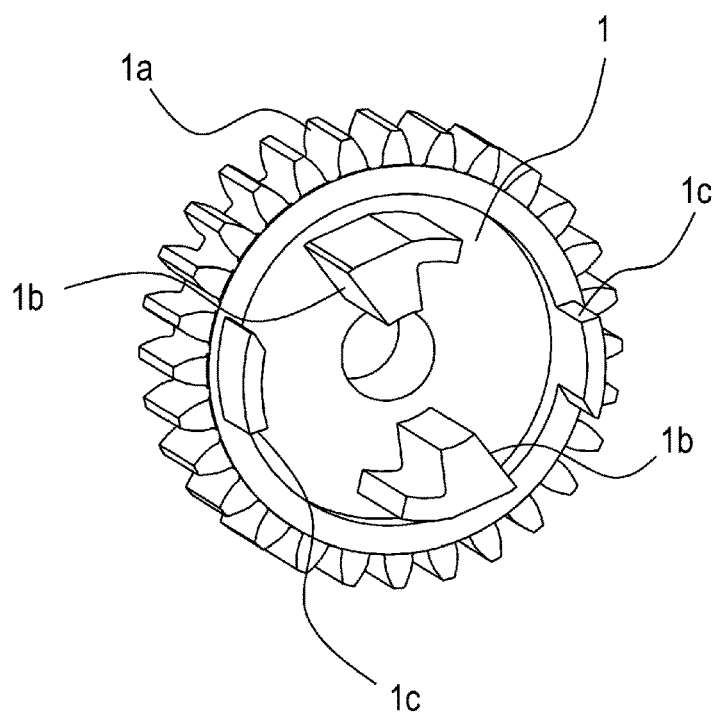

Parts (a) and (b) of FIG. 3 are perspective views of an inputting member.

Figure 4:
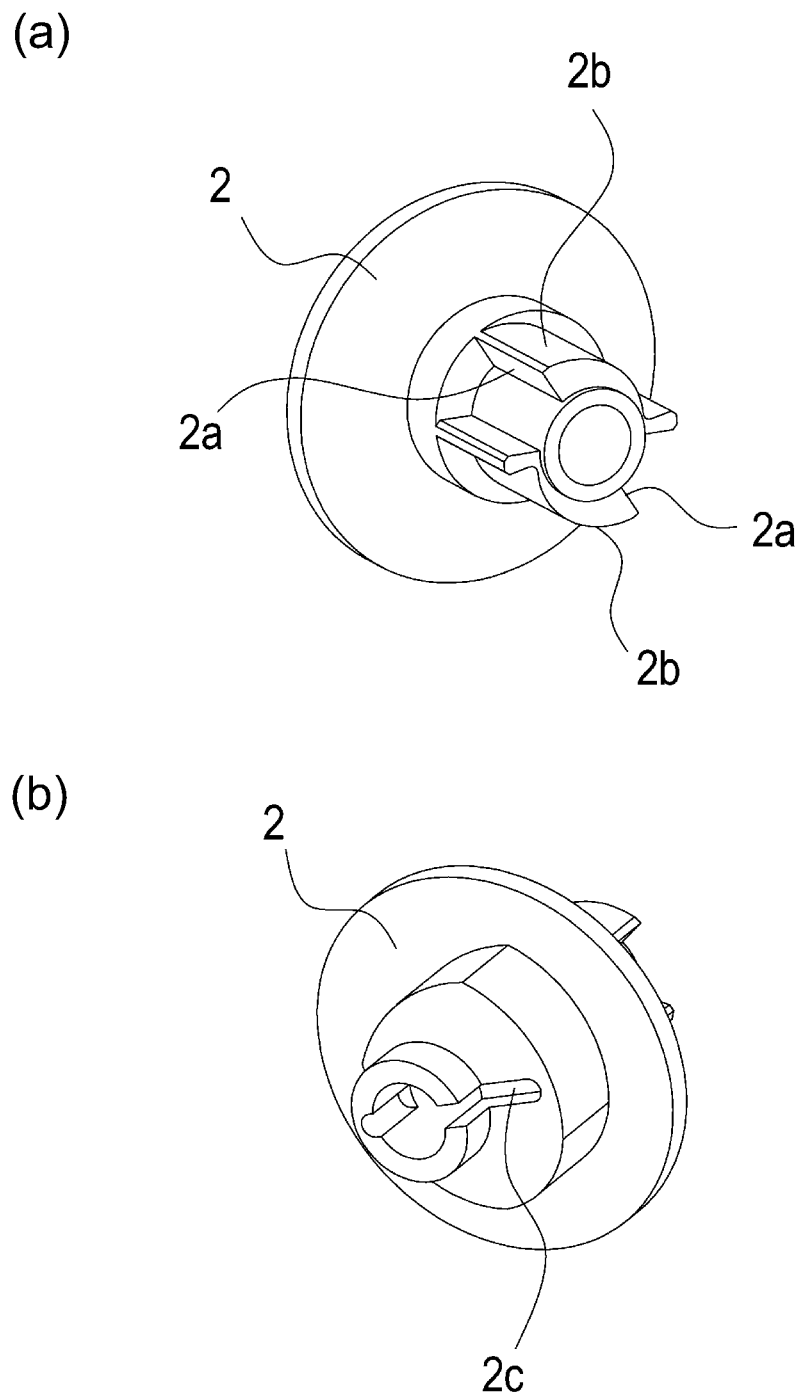

Parts (a) and (b) of FIG. 4 are perspective views of an outputting member.

Figure 5:
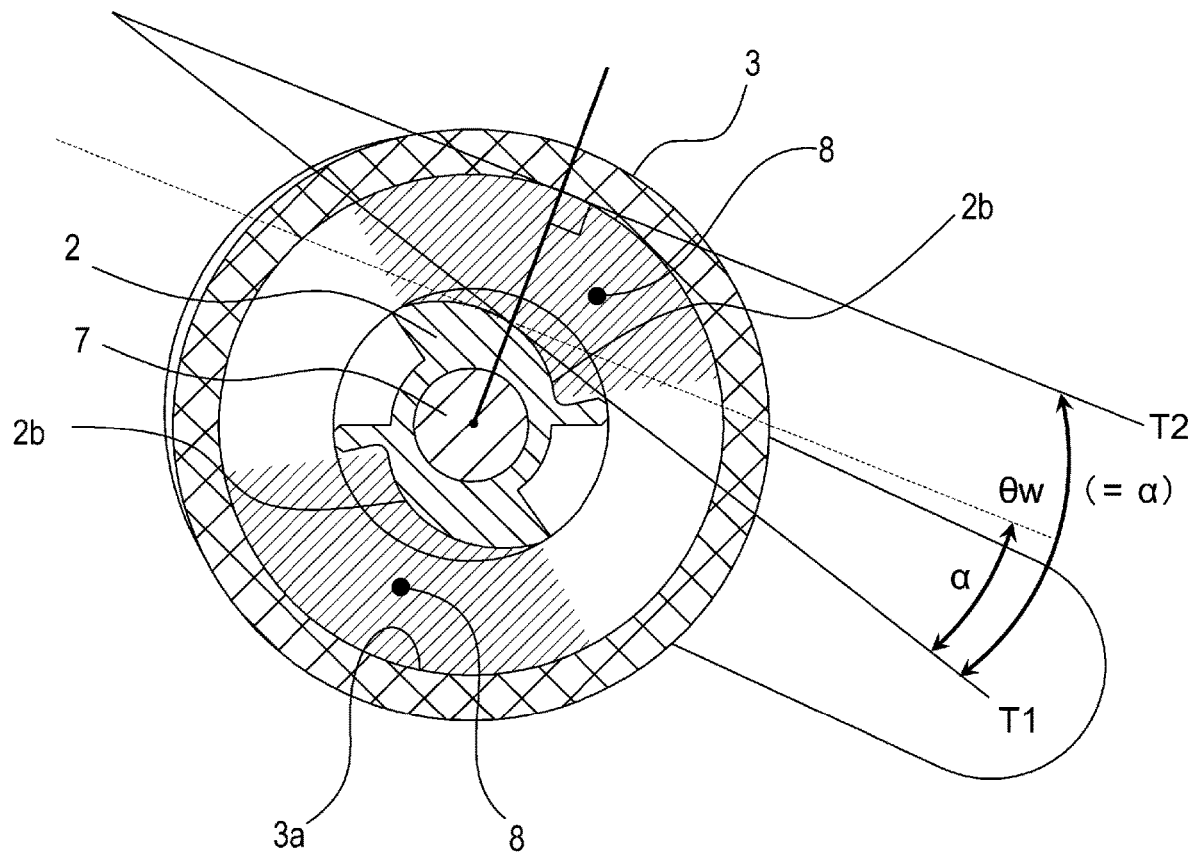

FIG. 5 is a sectional view of the outputting member and a stationary member.

Figure 6:
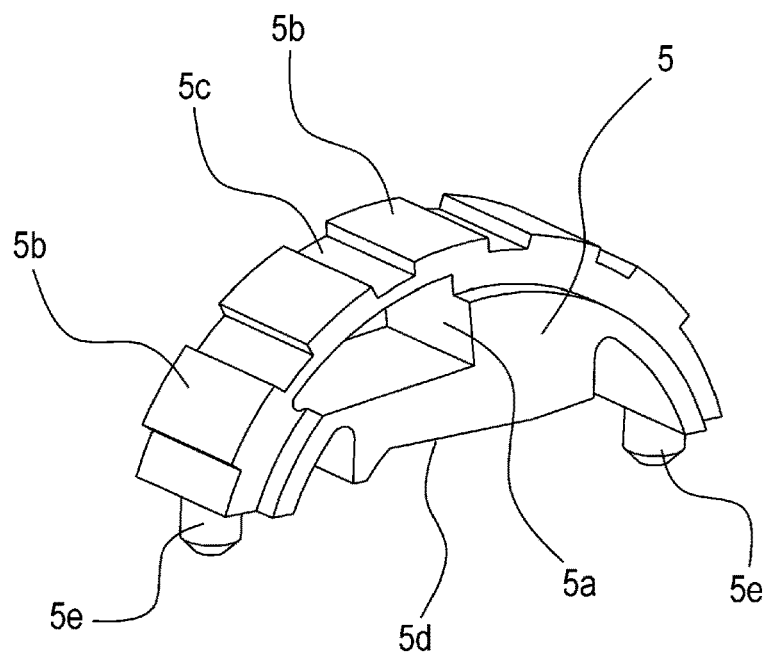
Figure 6:
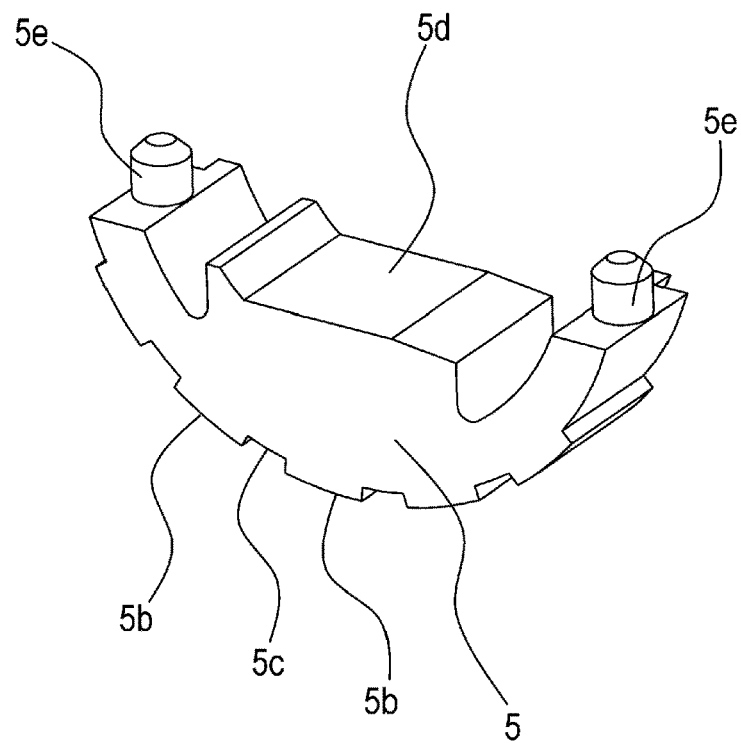

Parts (a) and (b) of FIG. 6 are perspective views of a contact member.

Figure 7:
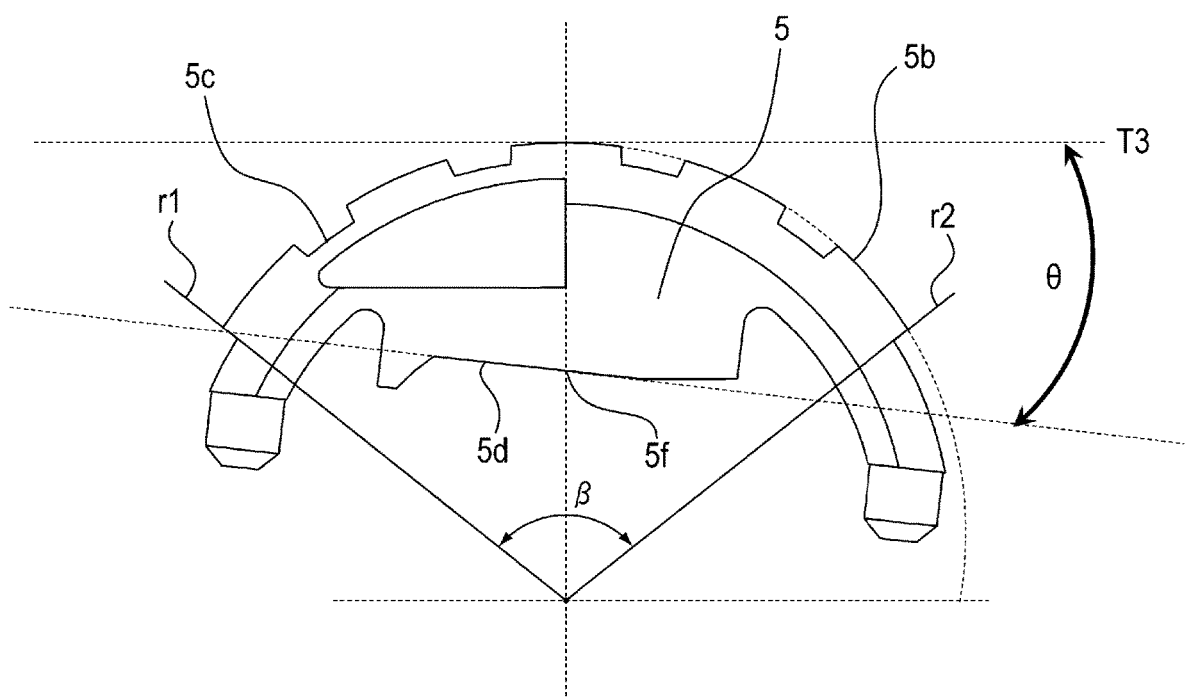

FIG. 7 is a front view of the contact member.

Figure 8:
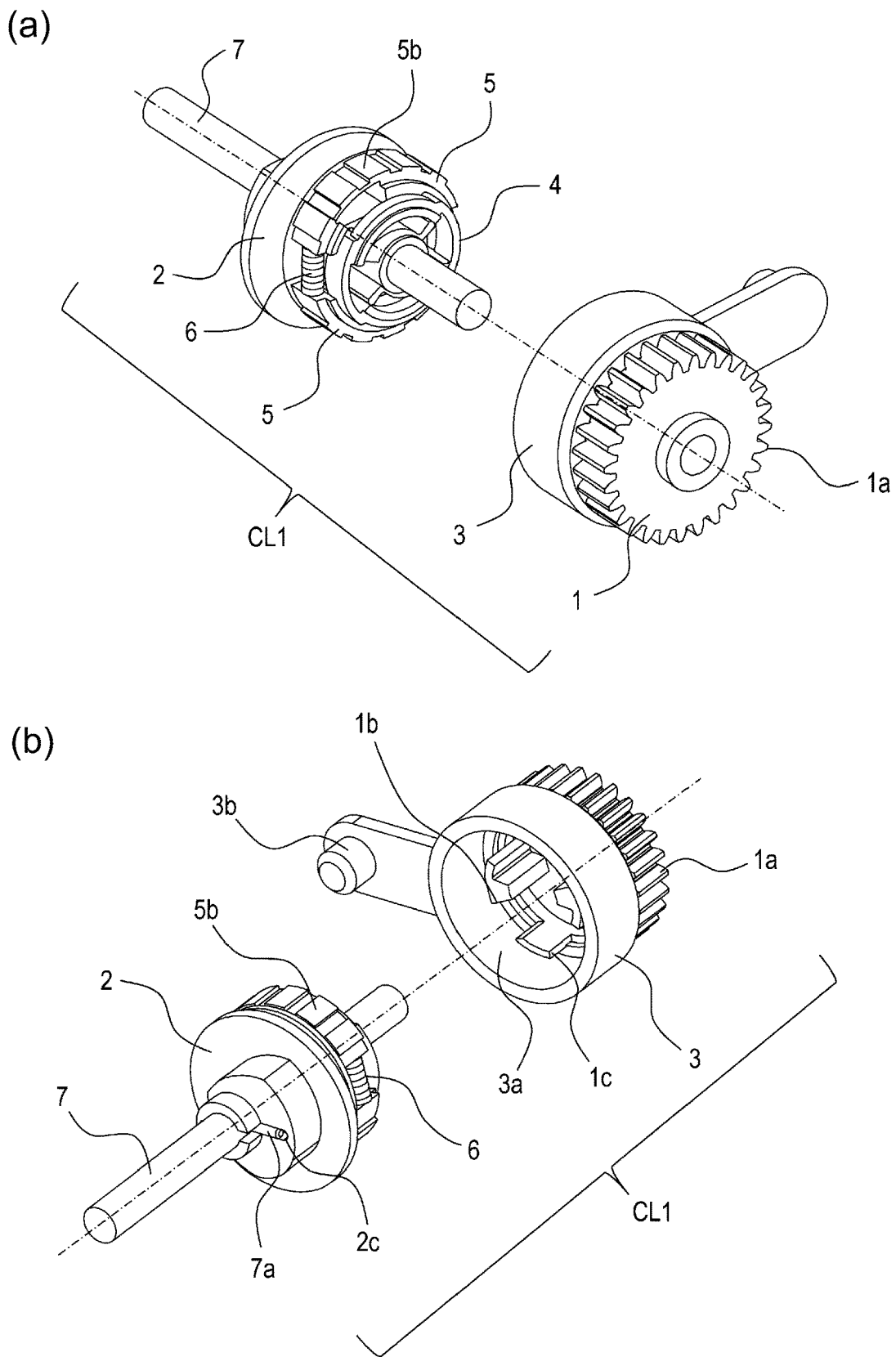

Parts (a) and (b) of FIG. 8 are perspective views of a clutch during assembling.

Figure 9:
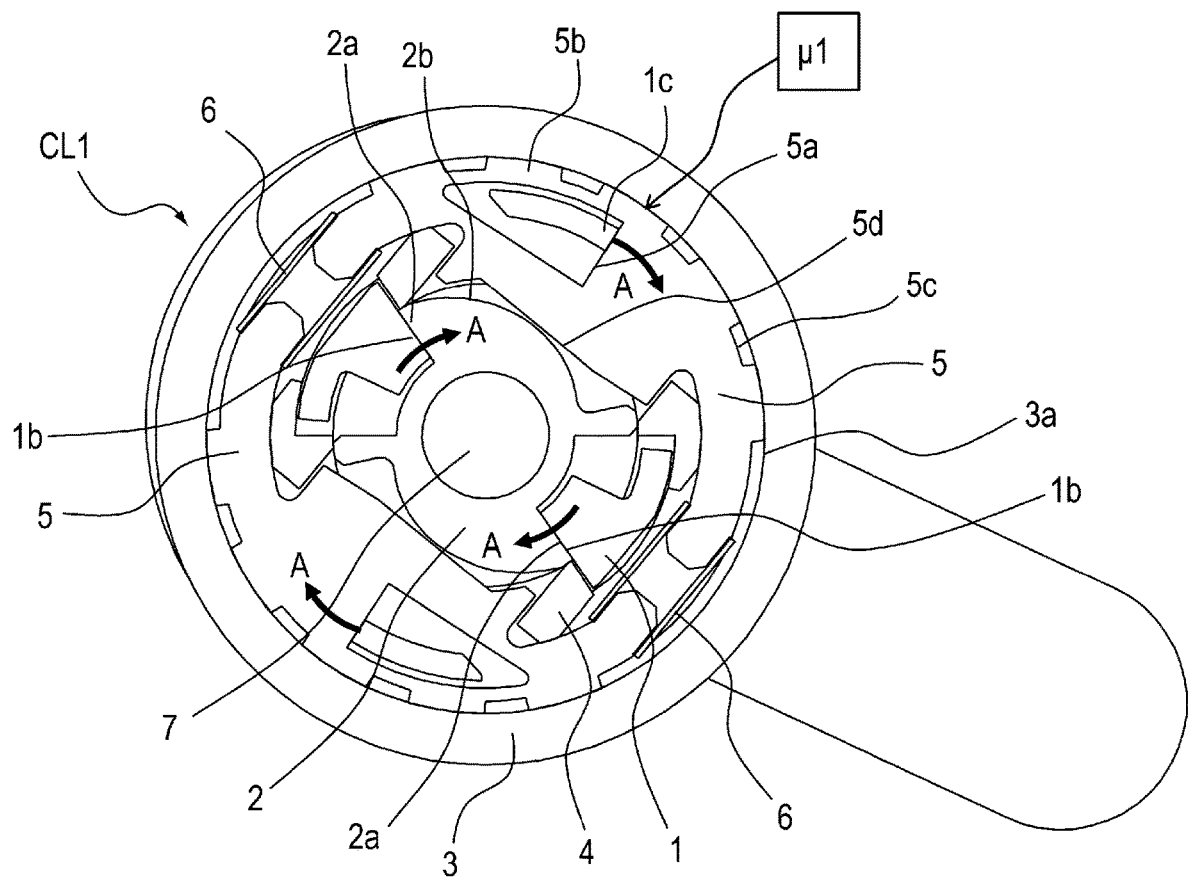

FIG. 9 is a sectional view of the clutch transmitting an input torque from the inputting member to the outputting member.

Figure 10:
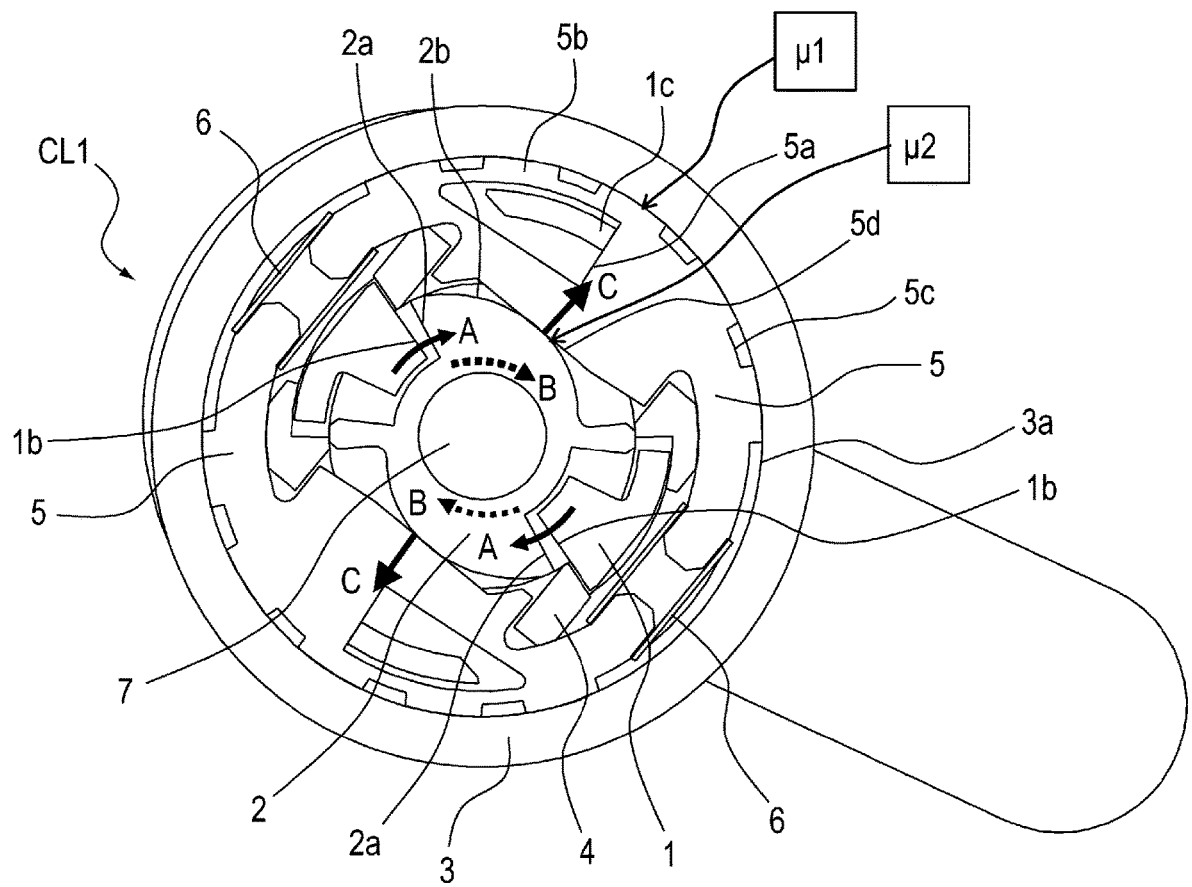

FIG. 10 is a sectional view of the clutch cutting off a reverse input cutoff clutch from the outputting member.

Figure 11:
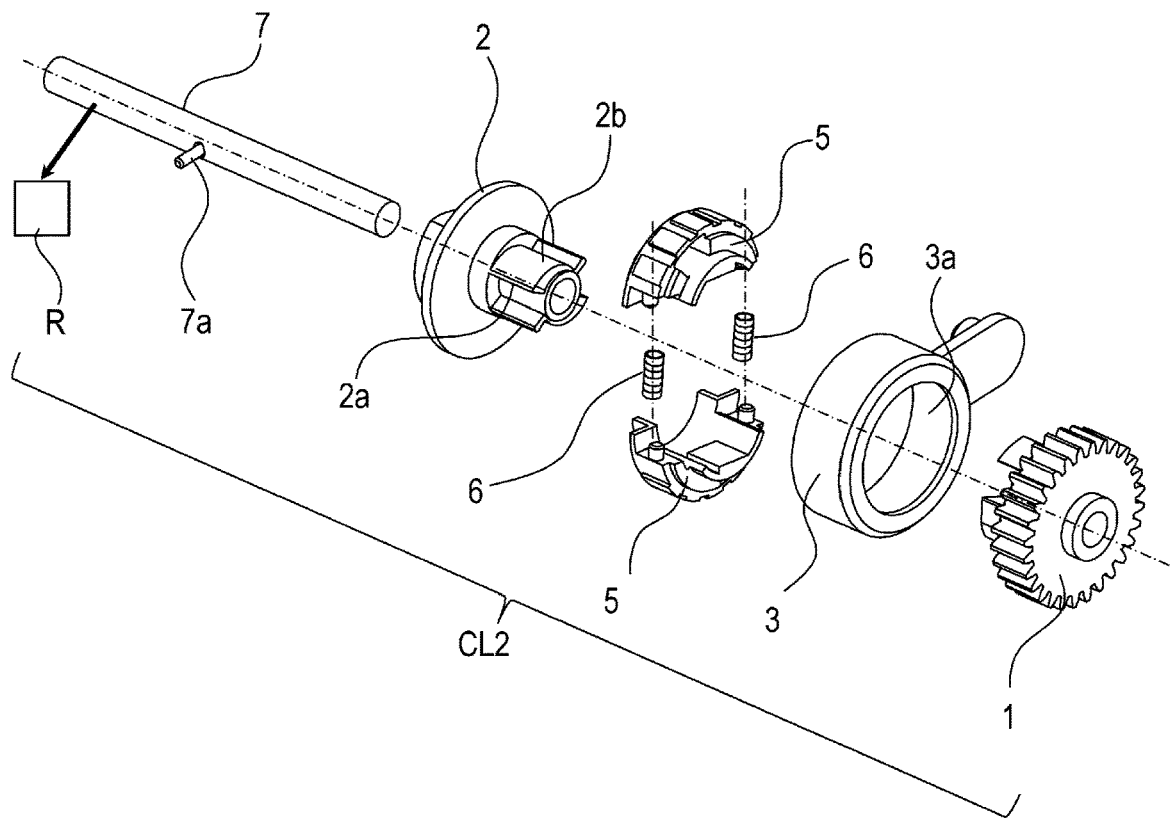

FIG. 11 is a perspective view of a clutch before assembling in Second Embodiment.

Figure 12:
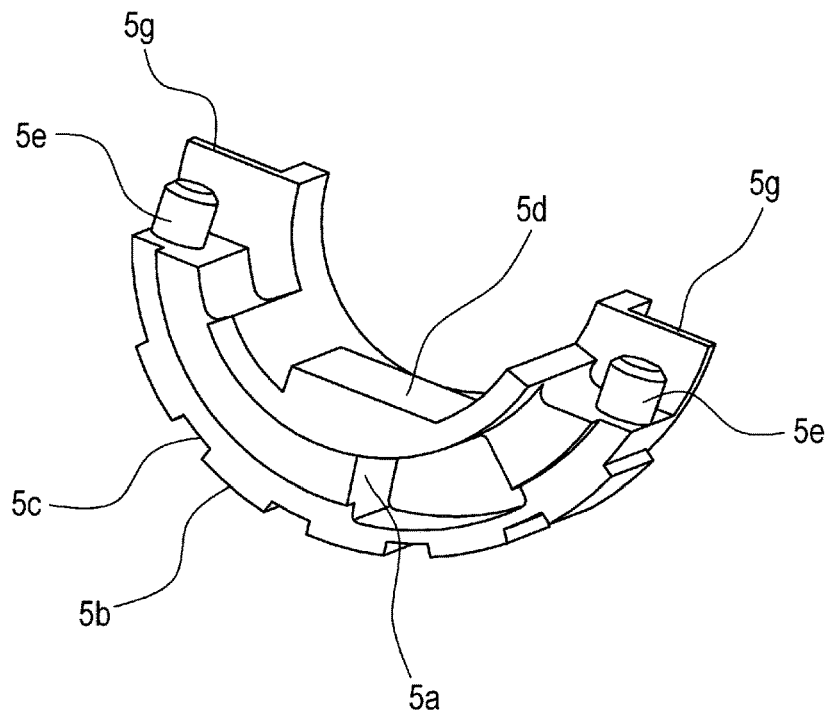

FIG. 12 is a perspective view of a contact member in Second Embodiment.

Figure 13:
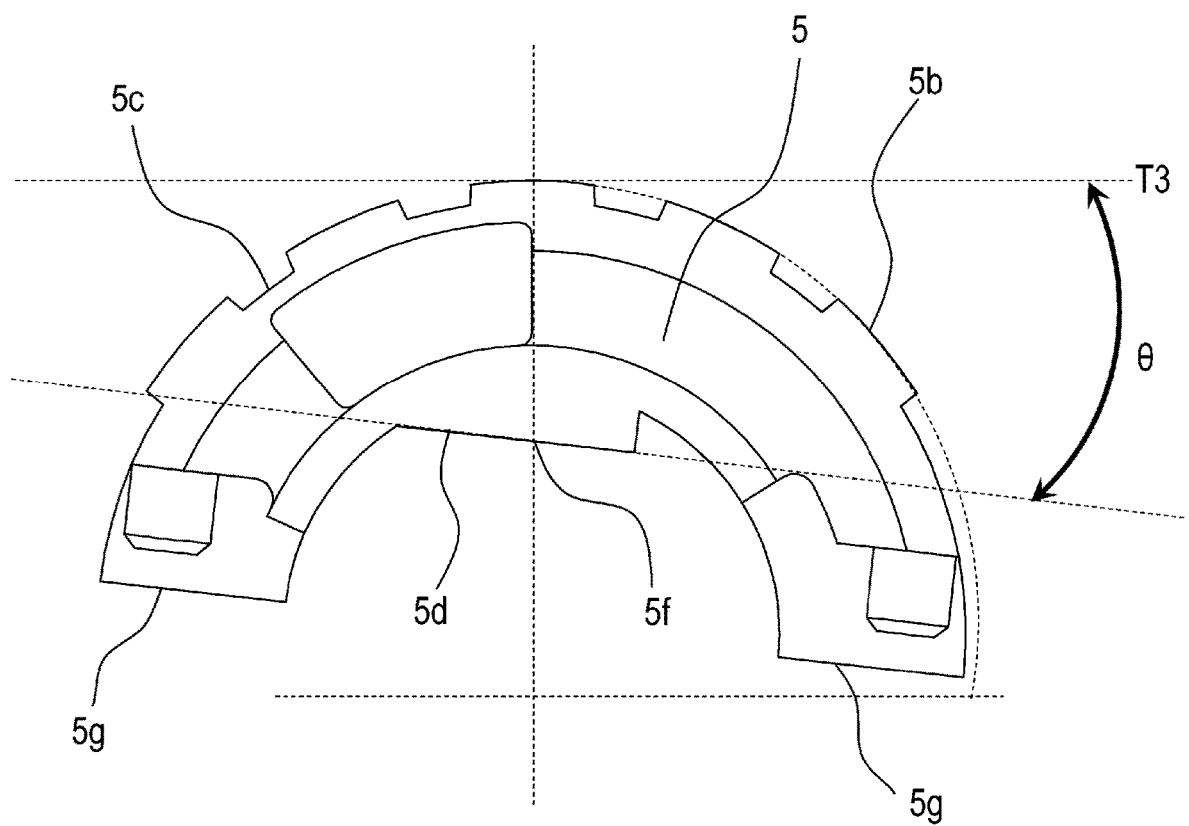

FIG. 13 is a front view of the contact member in Second Embodiment.

Figure 14:
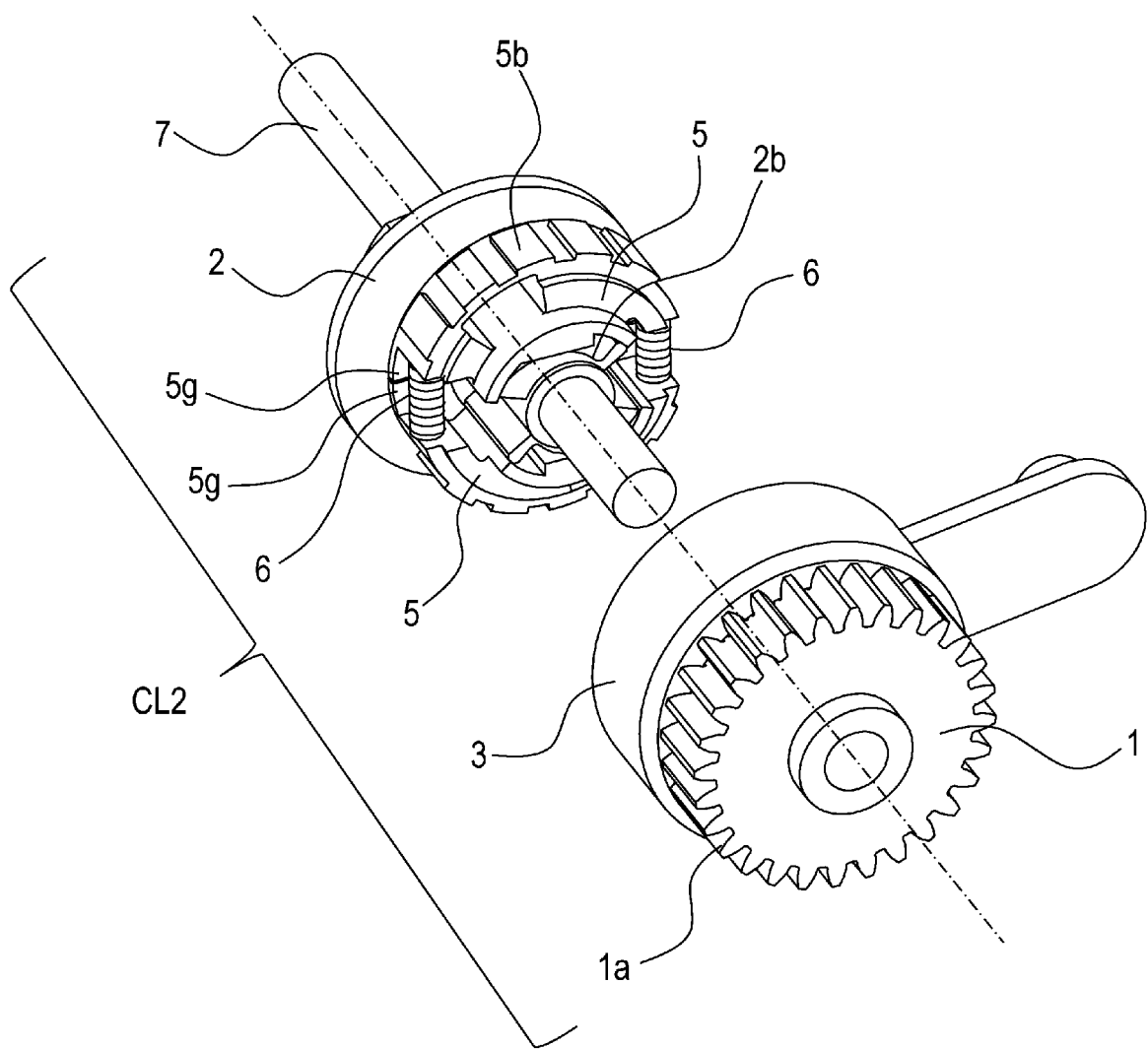

FIG. 14 is a perspective view of the clutch during assembling in Second Embodiment.

Figure 15:
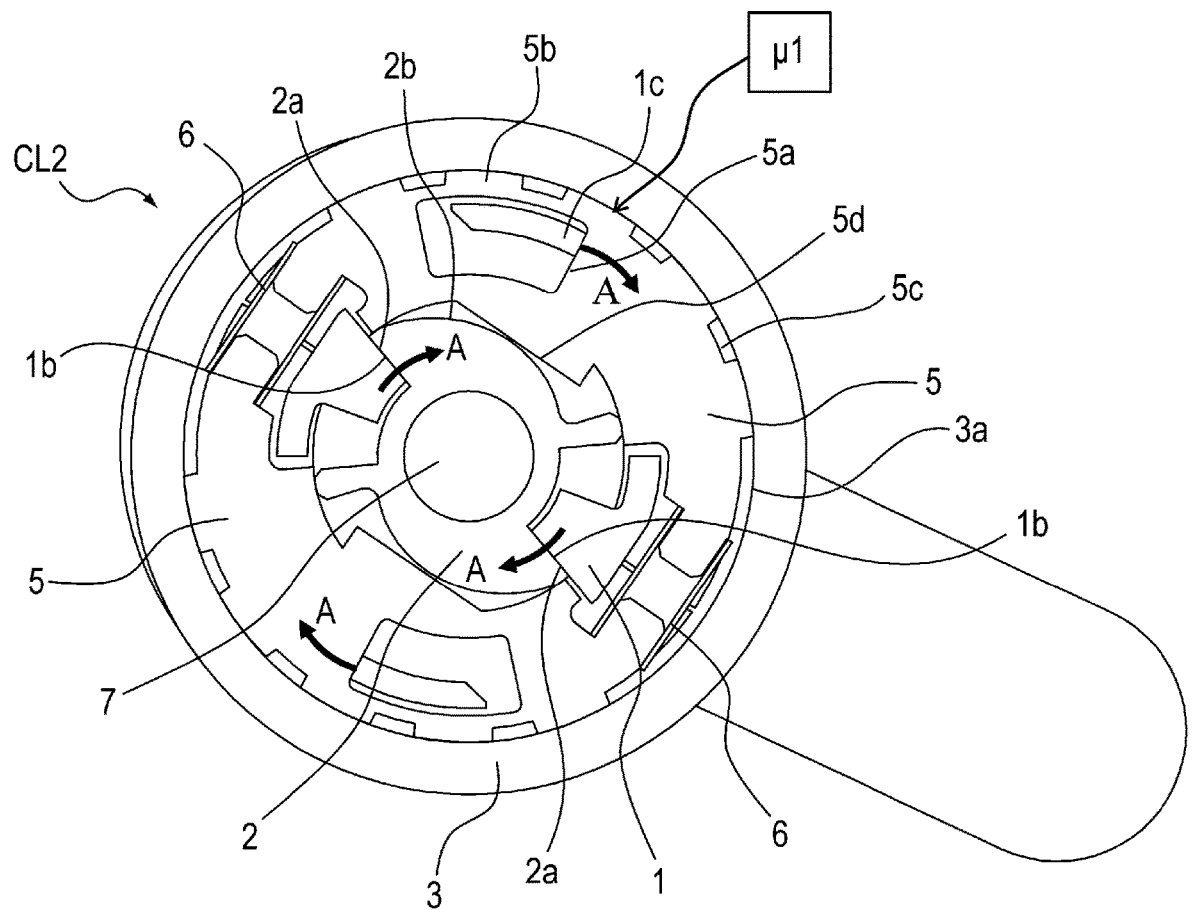

FIG. 15 is a sectional view of the clutch transmitting an input torque from an inputting member to the outputting member in Second Embodiment.

Figure 16:
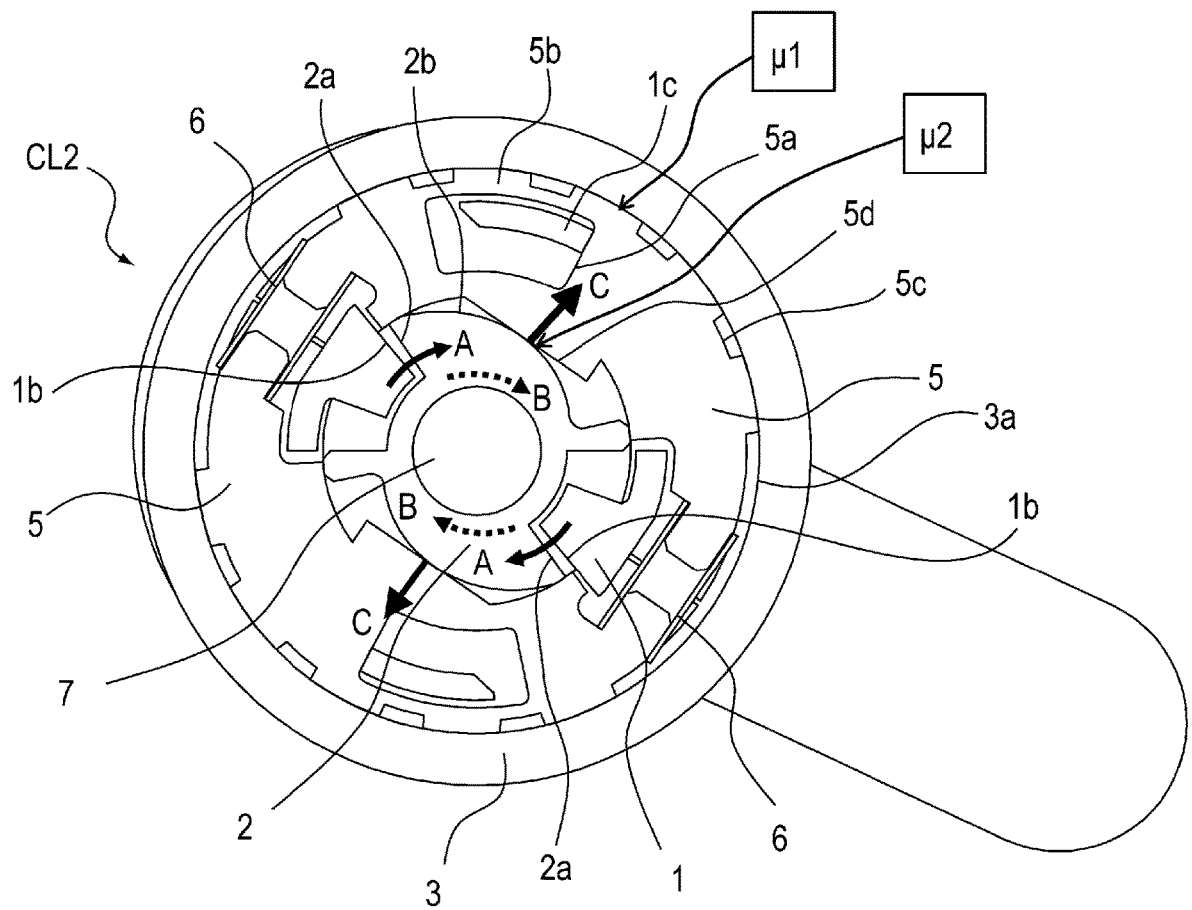

FIG. 16 is a sectional view of the clutch cutting off a reverse input torque from the outputting member in Second Embodiment.

Figure 17:
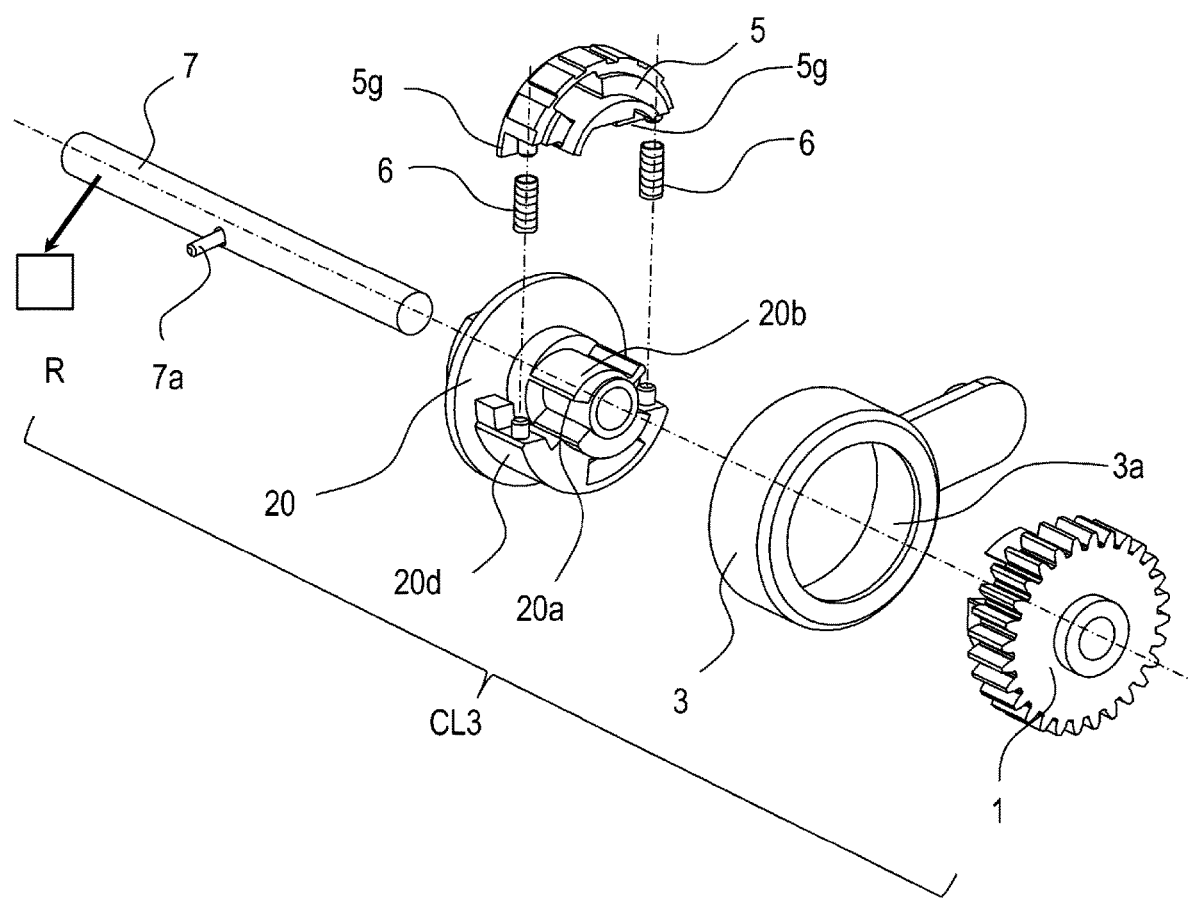

FIG. 17 is a perspective view of a clutch before assembling in Second Embodiment.

Figure 18:
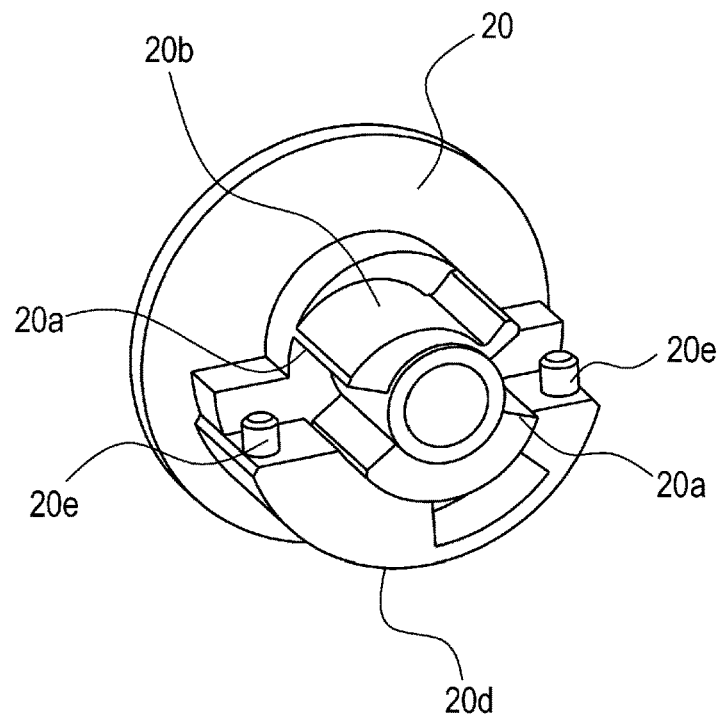
Figure 18:
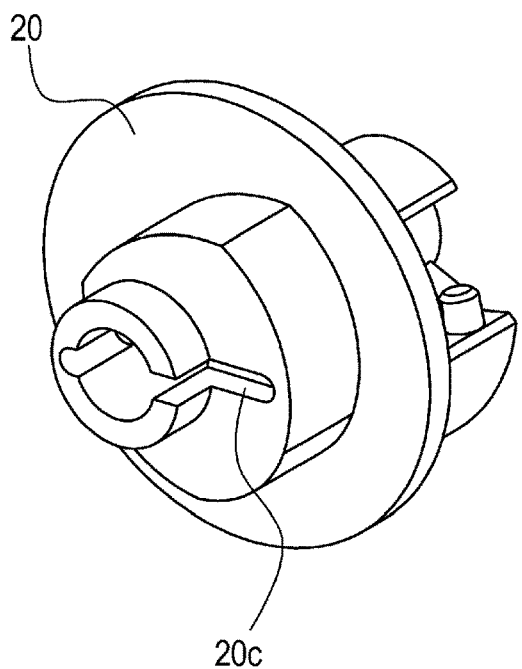

Parts (a) and (b) of FIG. 18 are perspective views of an outputting member in Third Embodiment.

Figure 19:
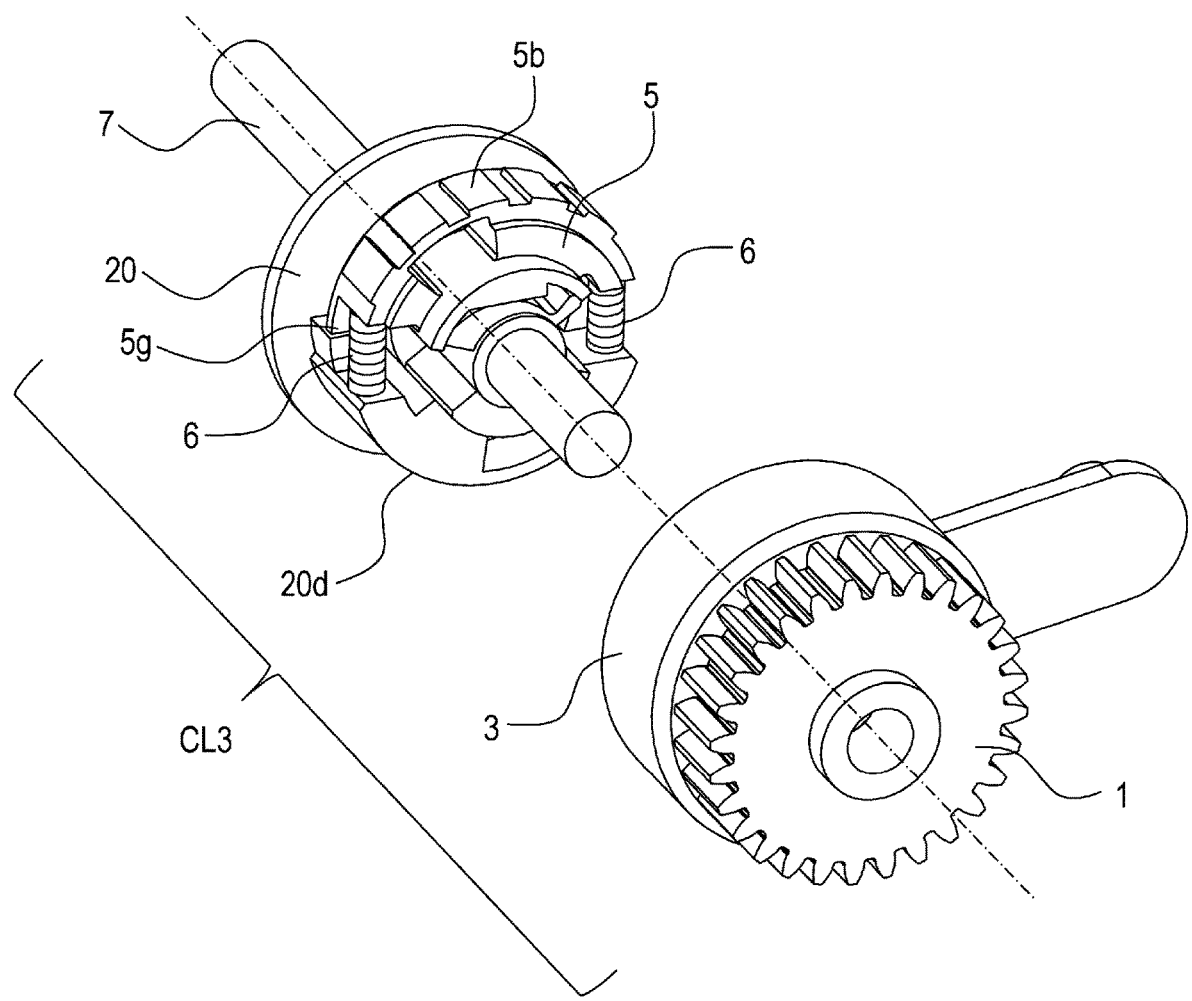

FIG. 19 is a perspective view of the clutch during assembling in Third Embodiment.

Figure 20:
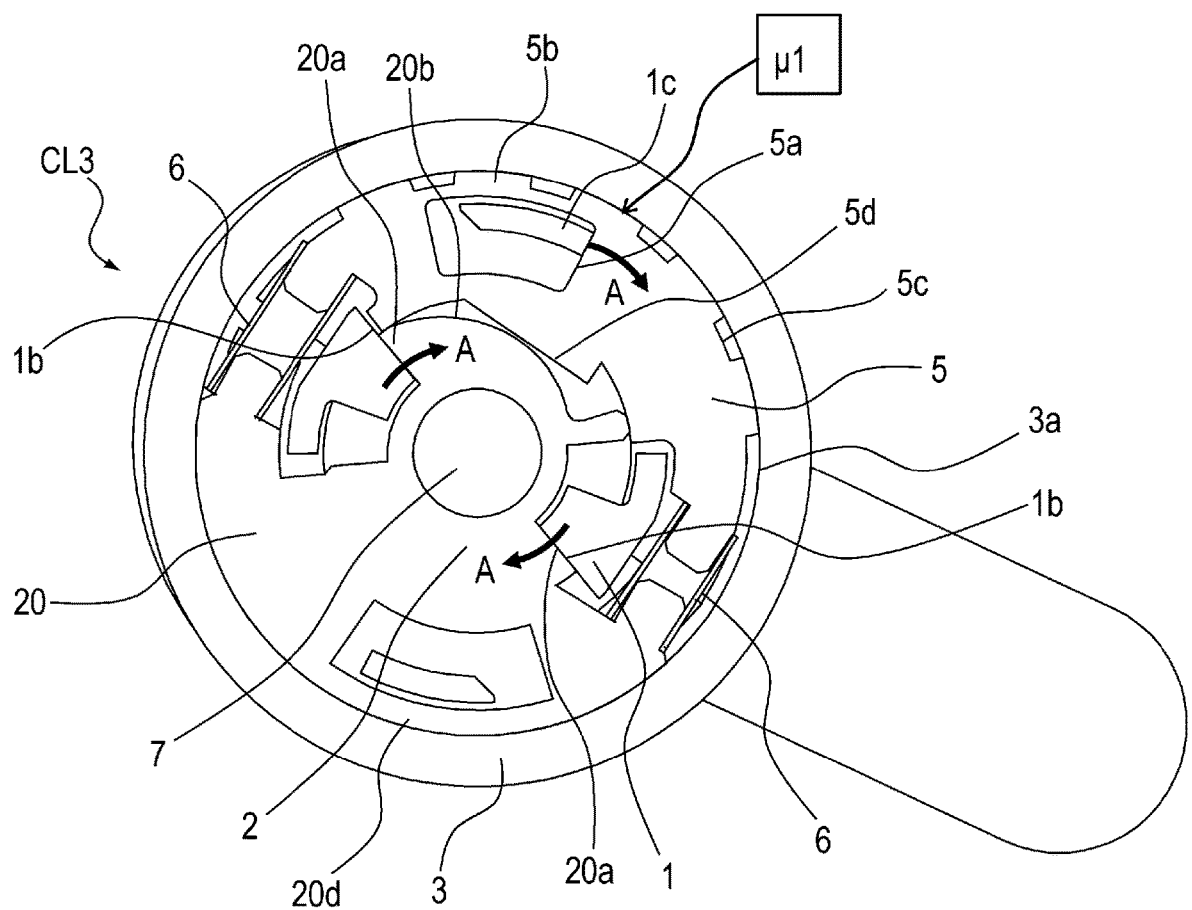

FIG. 20 is a sectional view of the clutch transmitting an input torque from an inputting member to the outputting member in Third Embodiment.

Figure 21:
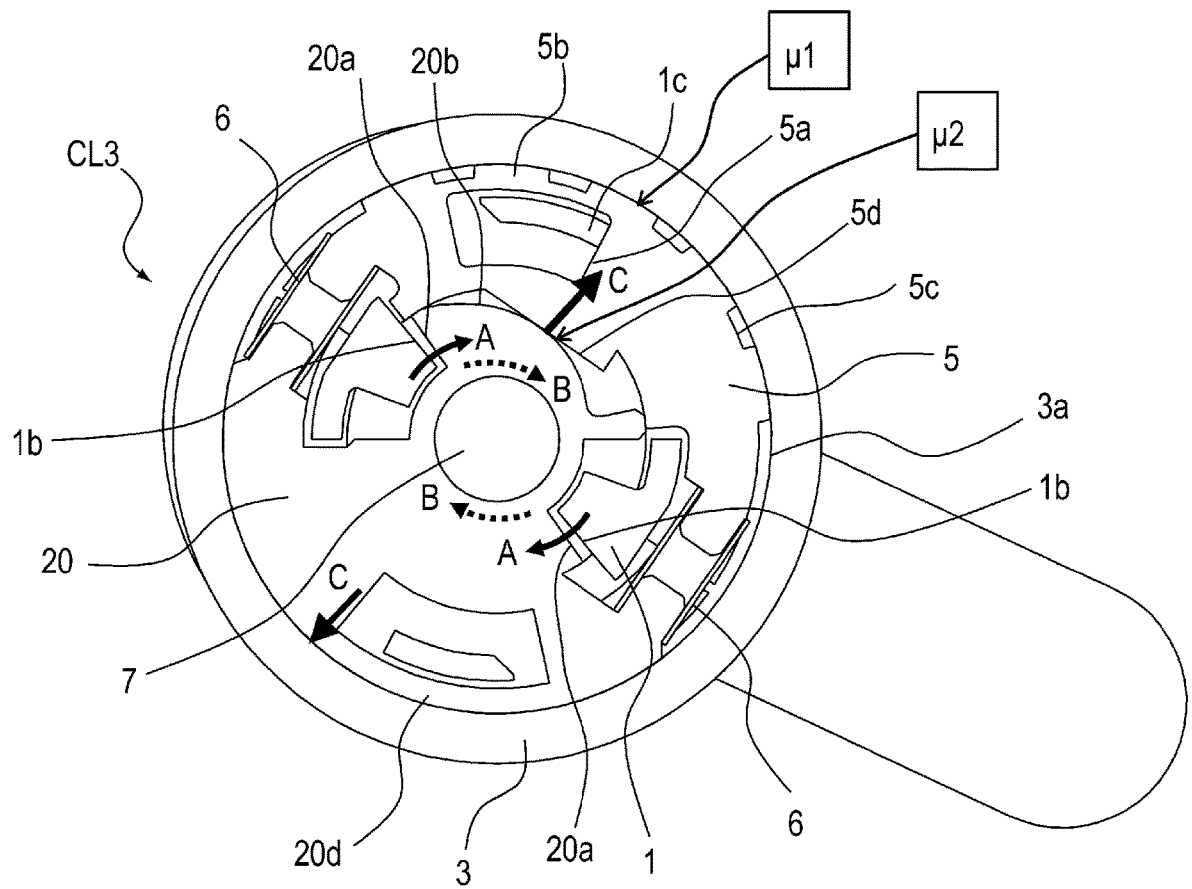

FIG. 21 is a sectional view of the clutch cutting off a reverse input torque from the outputting member in Third Embodiment.

Figure 22:
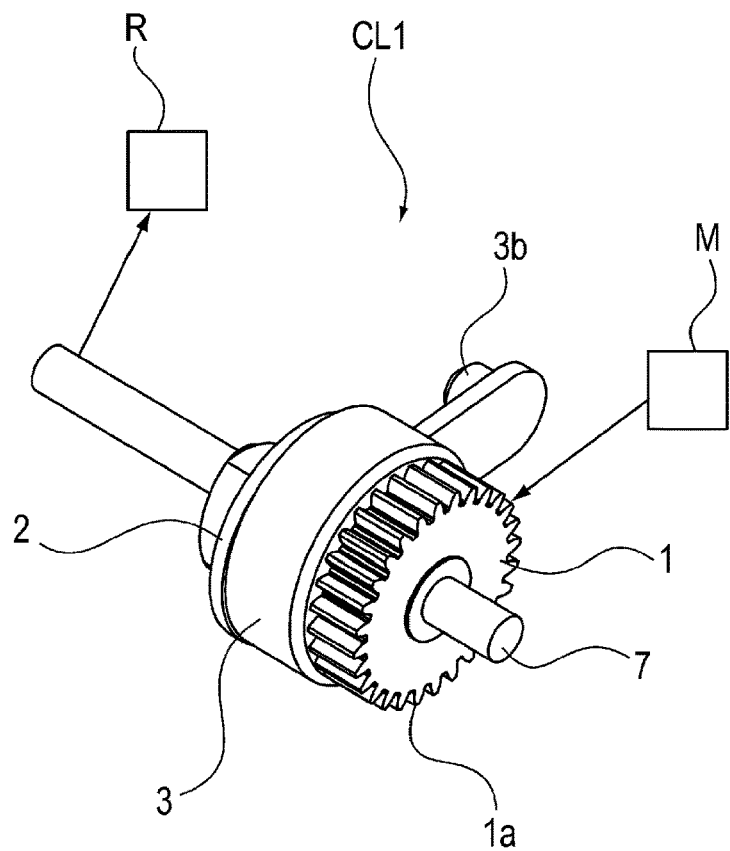
Figure 22:
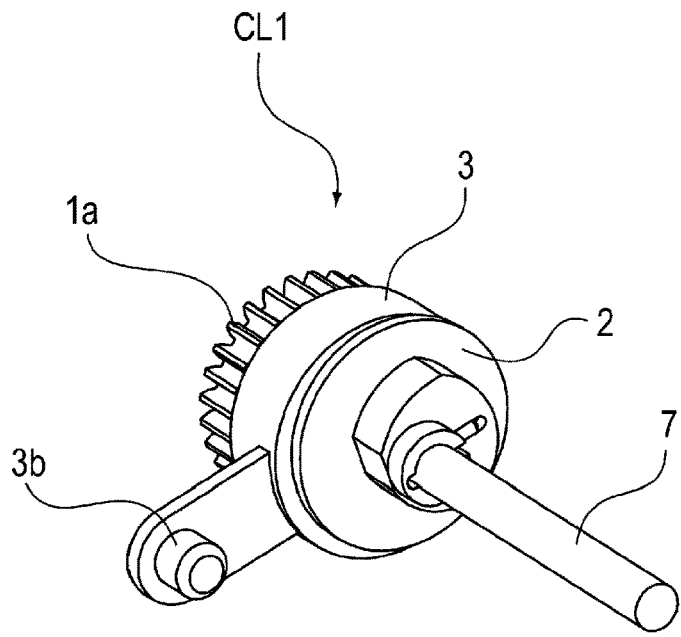

Parts (a) and (b) of FIG. 22 are perspective views of a clutch in Fourth Embodiment.

Figure 23:
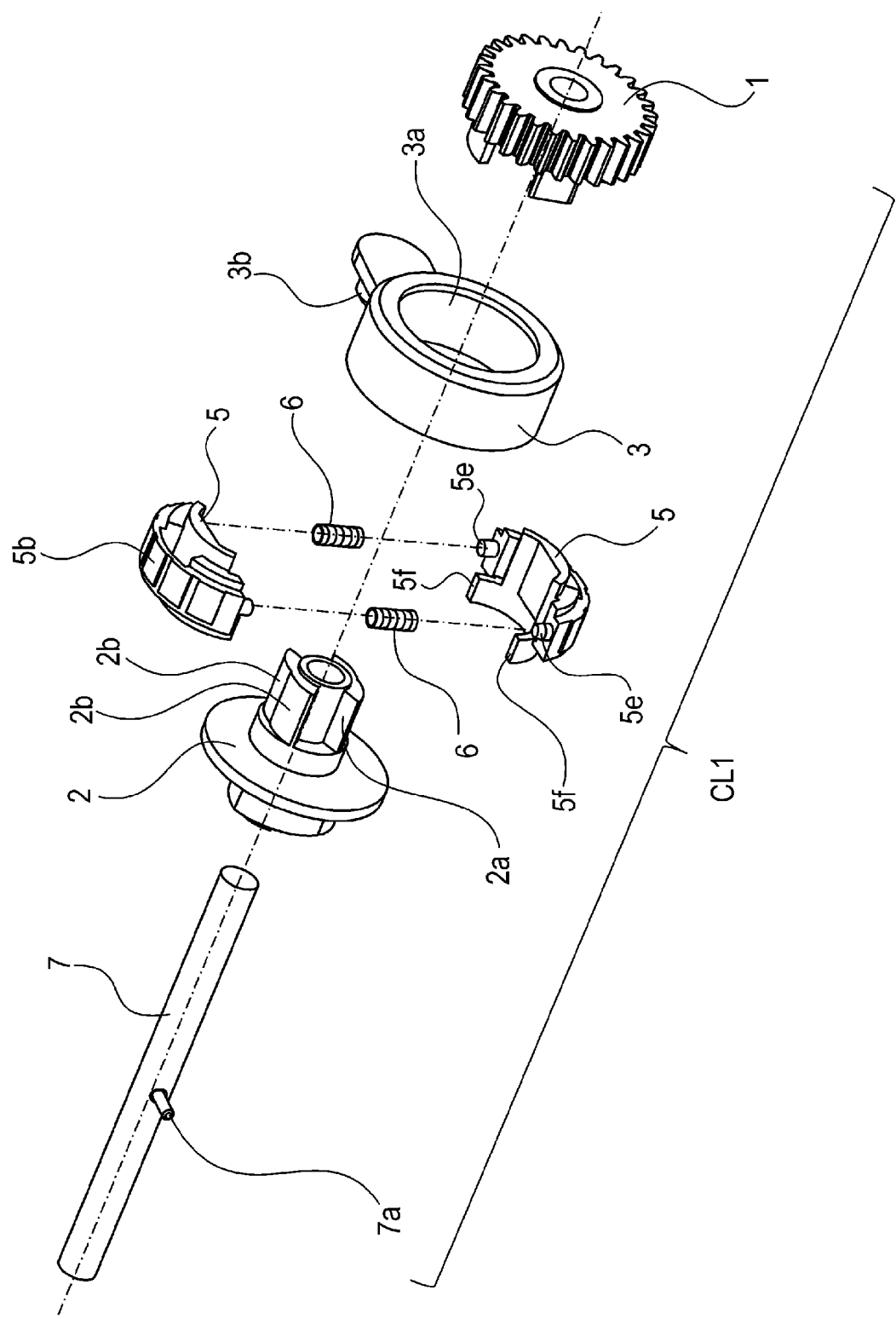

FIG. 23 is a perspective view before assembling of the clutch in Fourth Embodiment.

Figure 24:
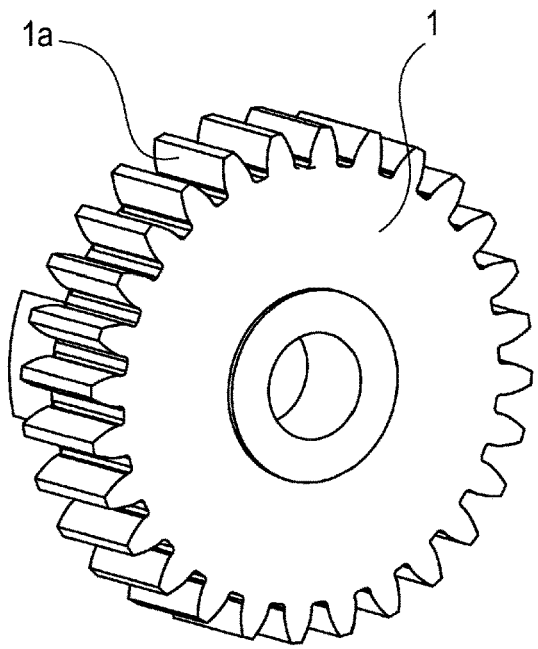
Figure 24:
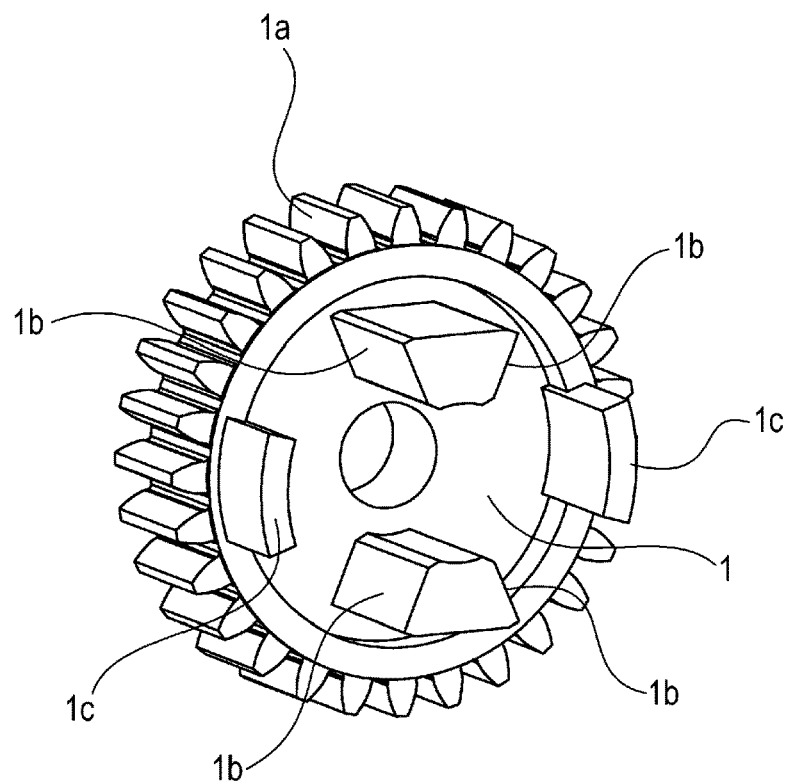

Parts (a) and (b) of FIG. 24 are perspective views of an inputting member.

Figure 25:
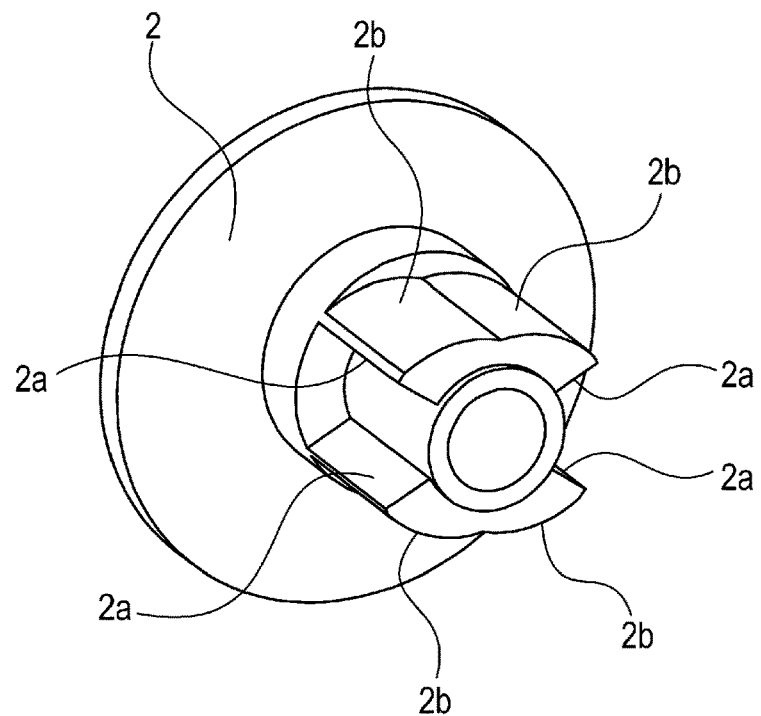
Figure 25:
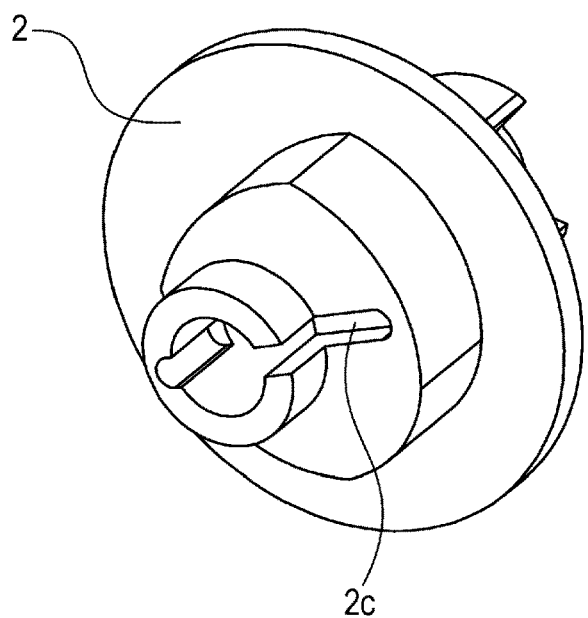

Parts (a) and (b) of FIG. 25 are perspective views of an outputting member.

Figure 26:
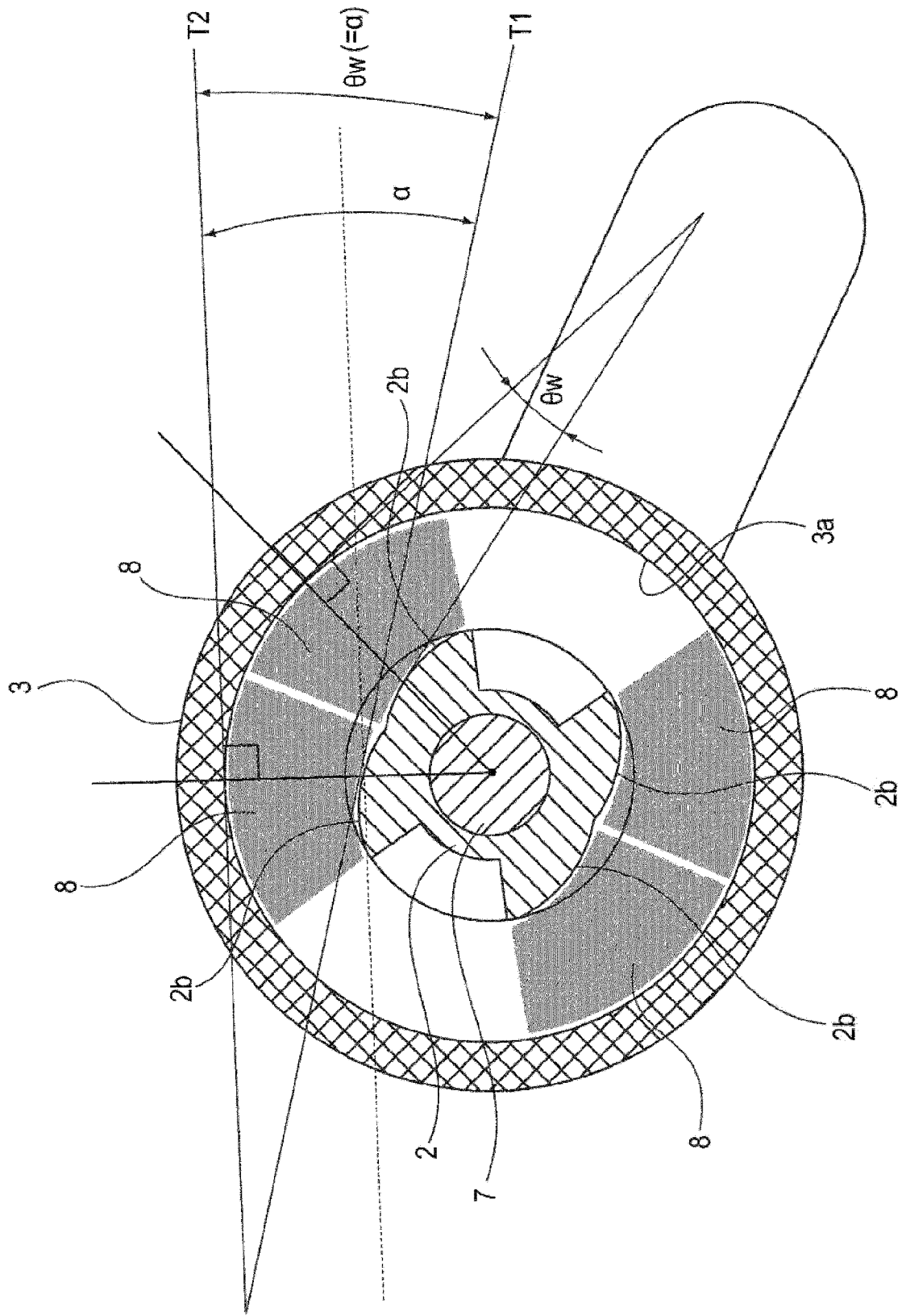

FIG. 26 is a sectional view of the outputting member and a stationary member.

Figure 27:
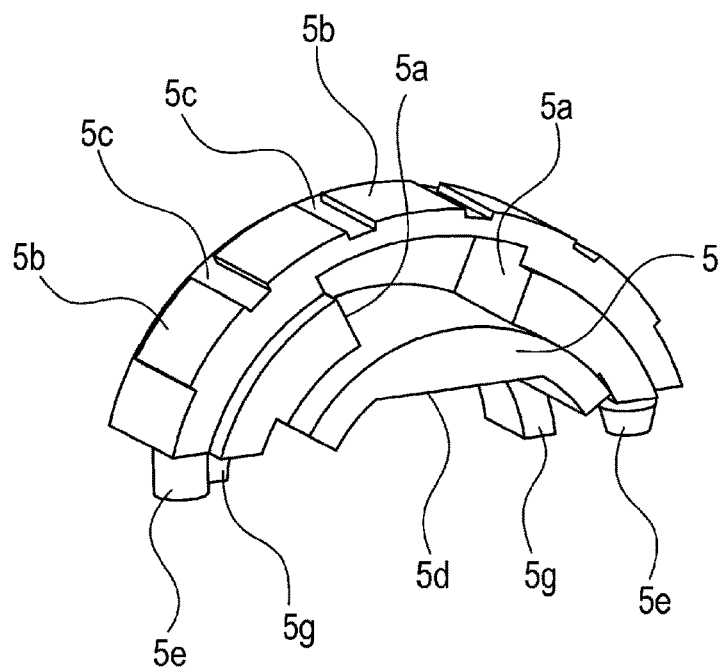
Figure 27:
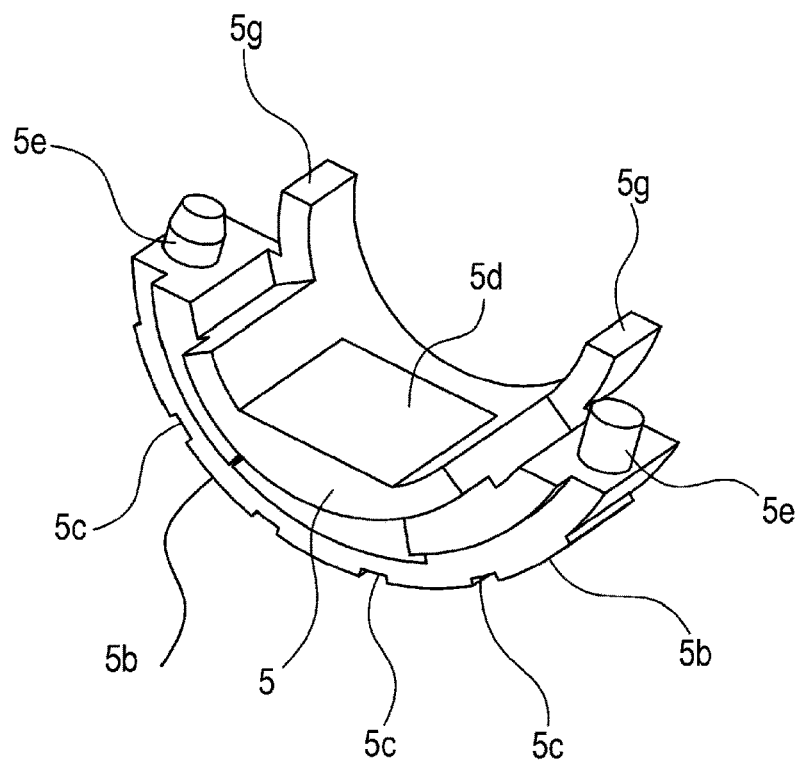

Parts (a) and (b) of FIG. 27 are perspective views of a contact member.

Figure 28:
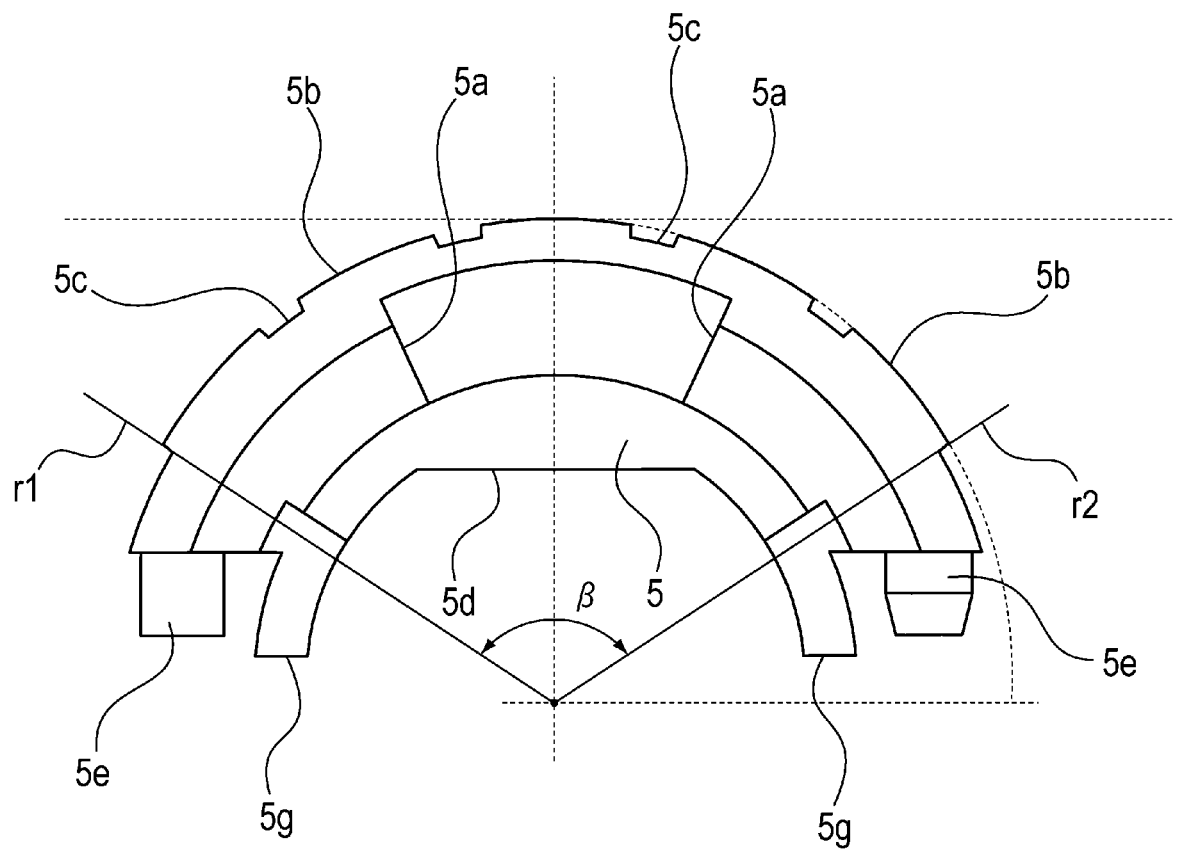

FIG. 28 is a front view of the contact member.

Figure 29:
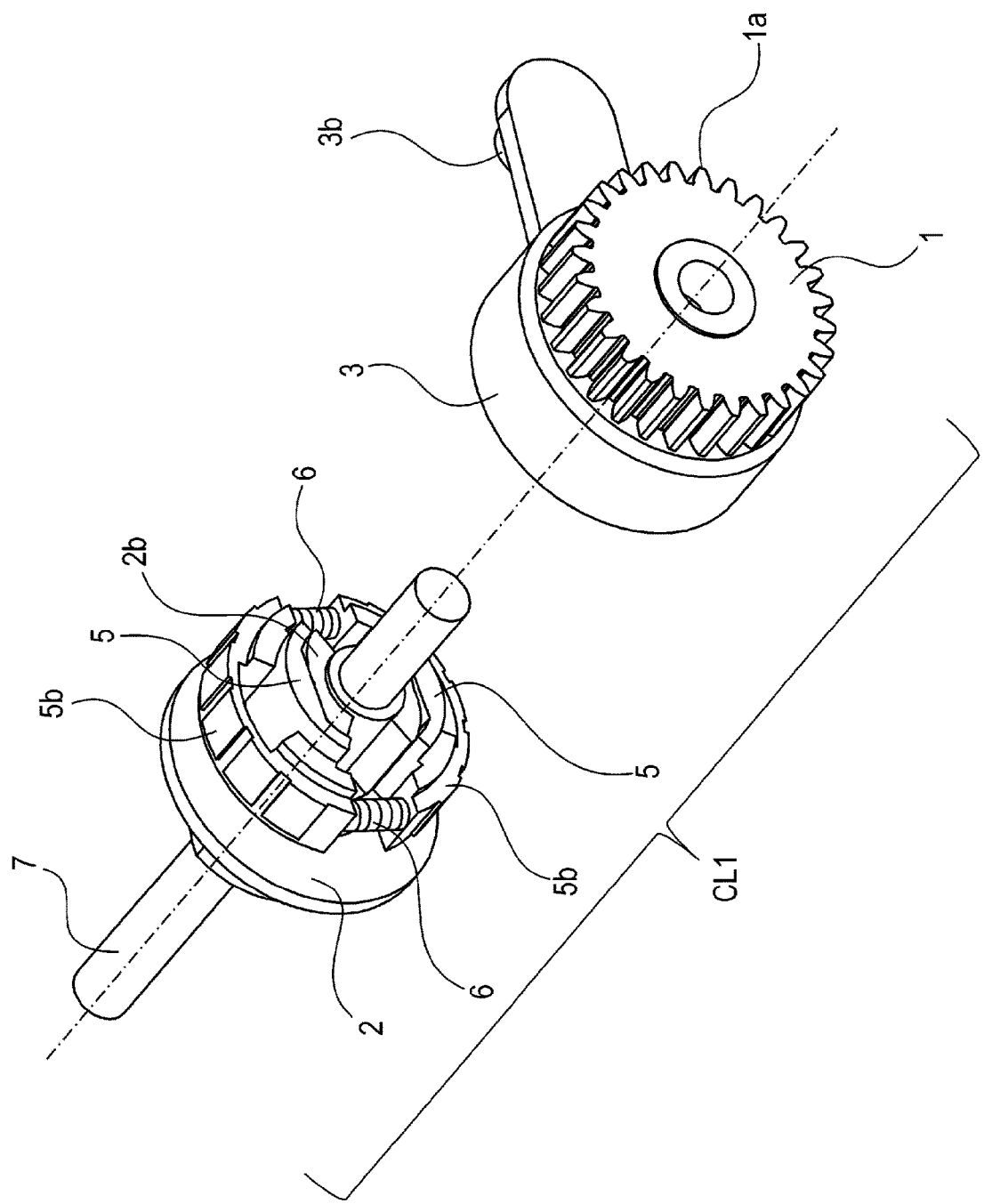

FIG. 29 is a perspective view of a clutch during assembling.

Figure 30:
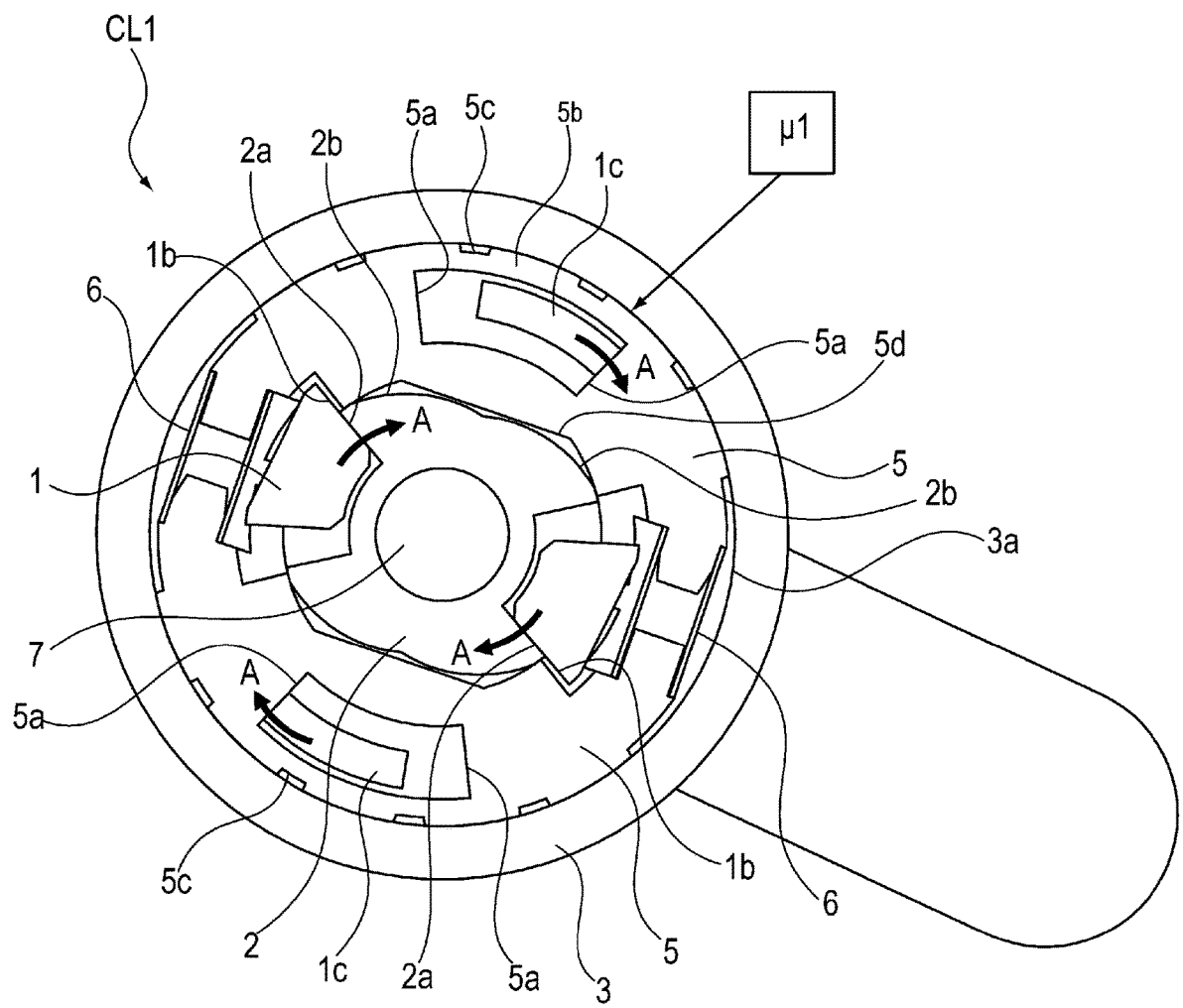

FIG. 30 is a sectional view of the clutch transmitting an input torque from the inputting member to the outputting member.

Figure 31:
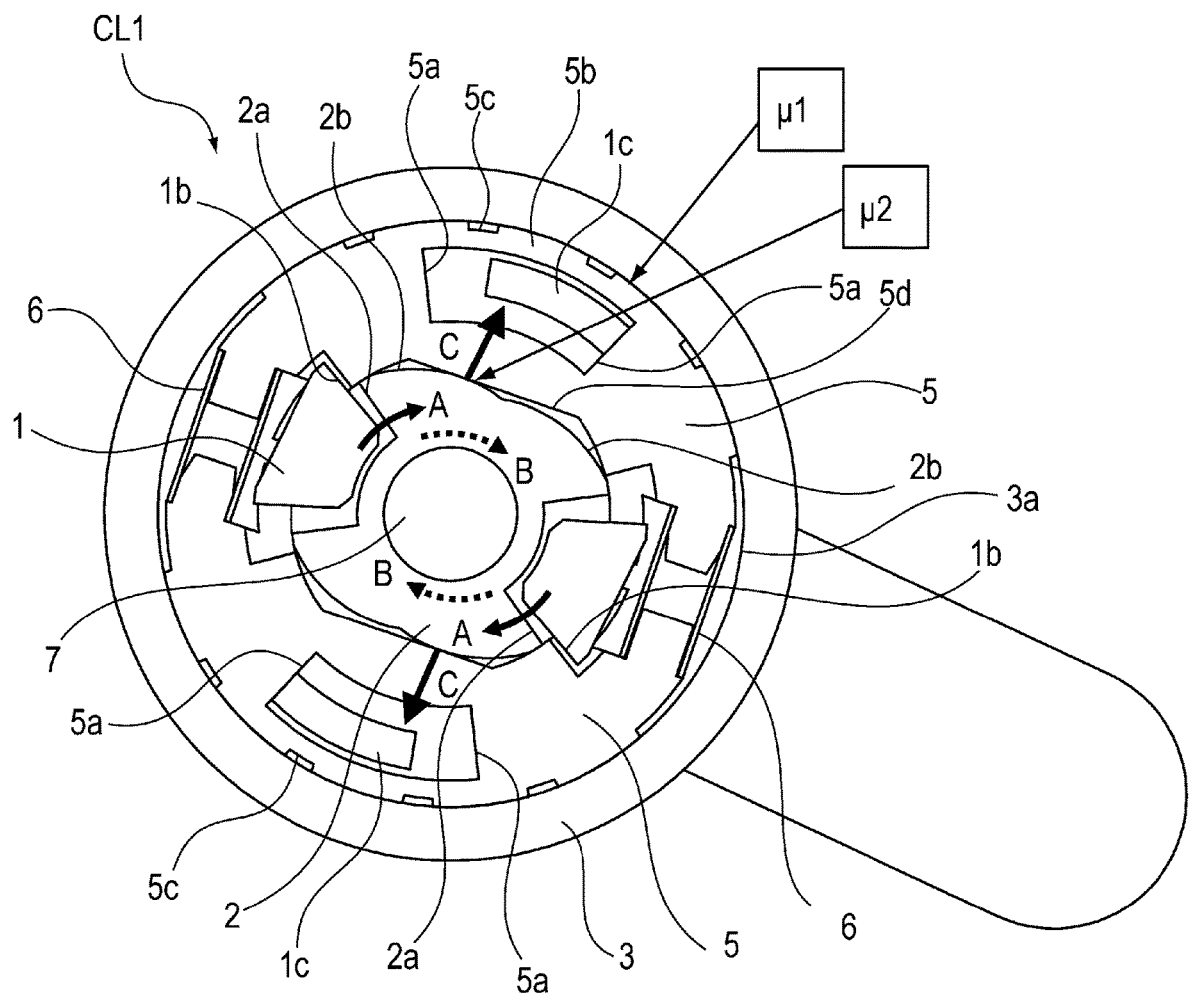

FIG. 31 is a sectional view of the clutch cutting off a reverse input cutoff clutch from the outputting member.

Figure 32:
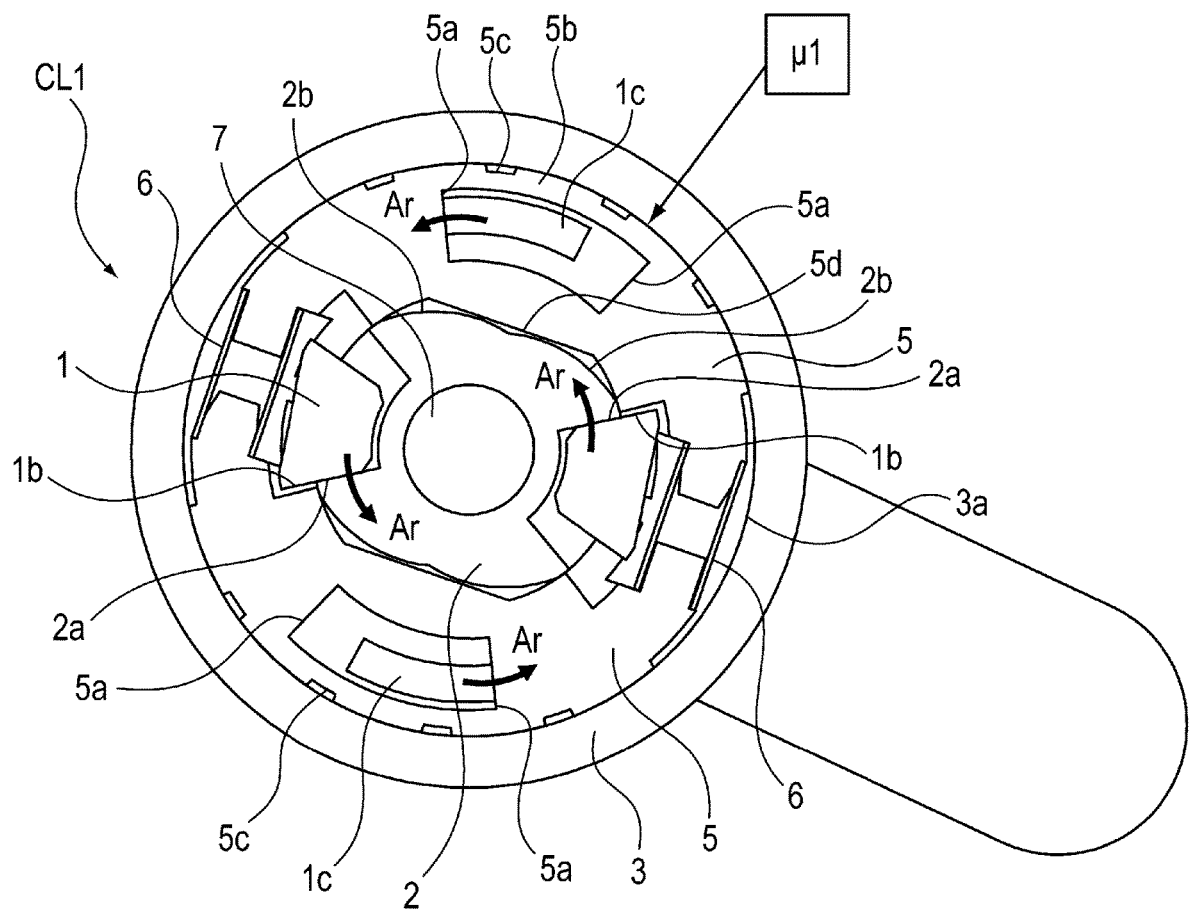

FIG. 32 is a sectional view of the clutch transmitting an input torque from the inputting member to the outputting member.

Figure 33:
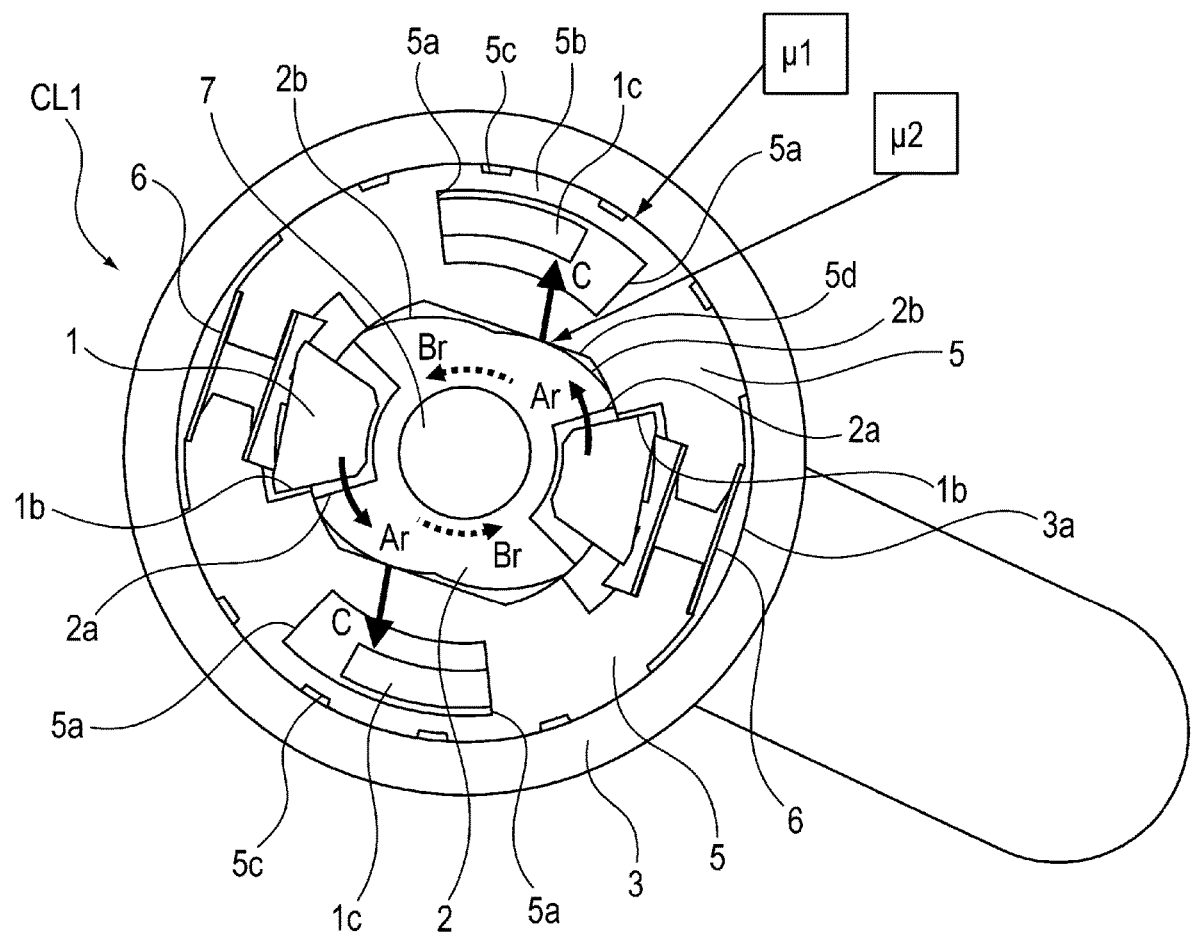

FIG. 33 is a sectional view of the clutch cutting off a reverse input cutoff clutch from the outputting member.

Figure 34:
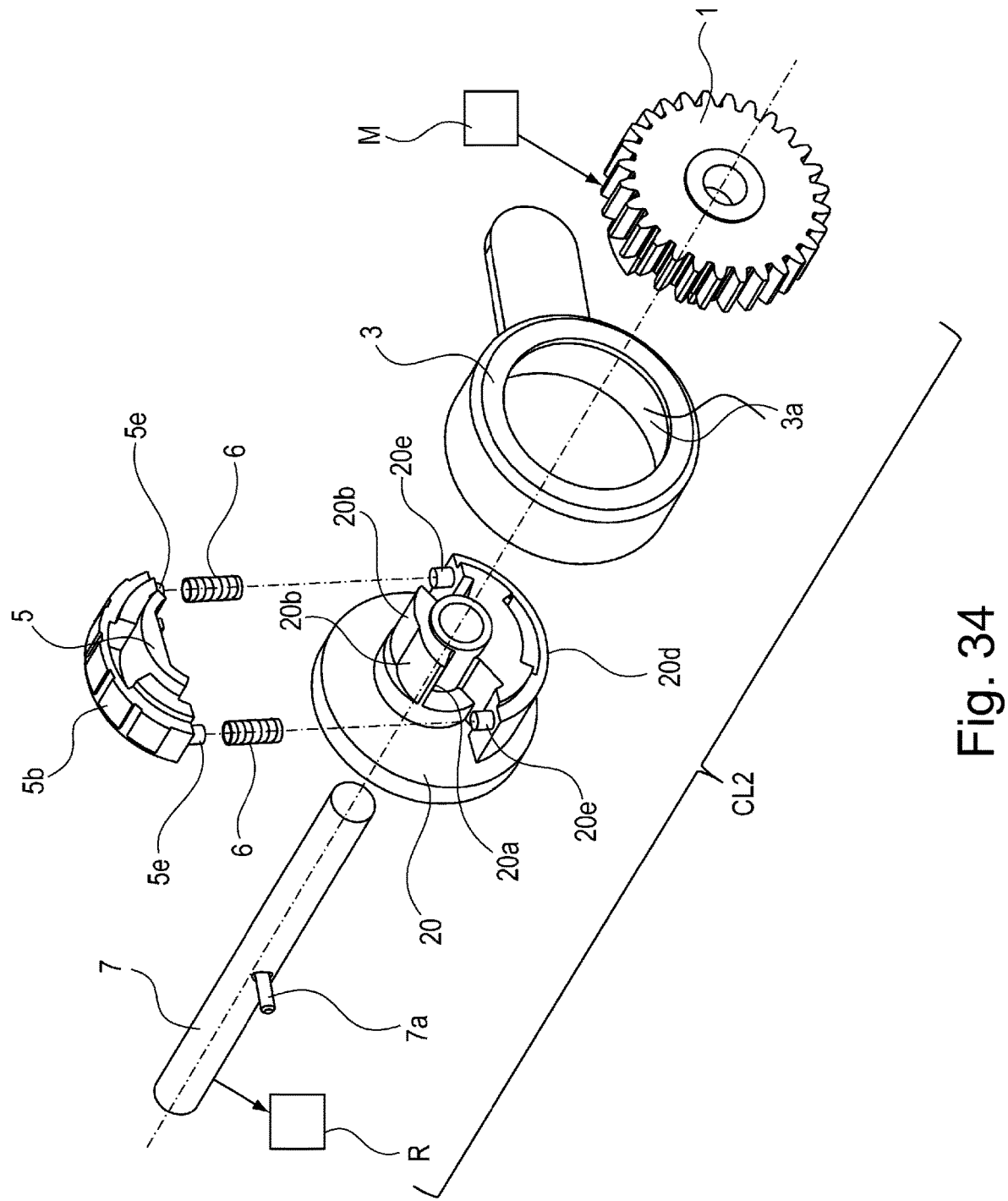

FIG. 34 is a perspective view of a clutch before assembling in Fifth Embodiment.

Figure 35:
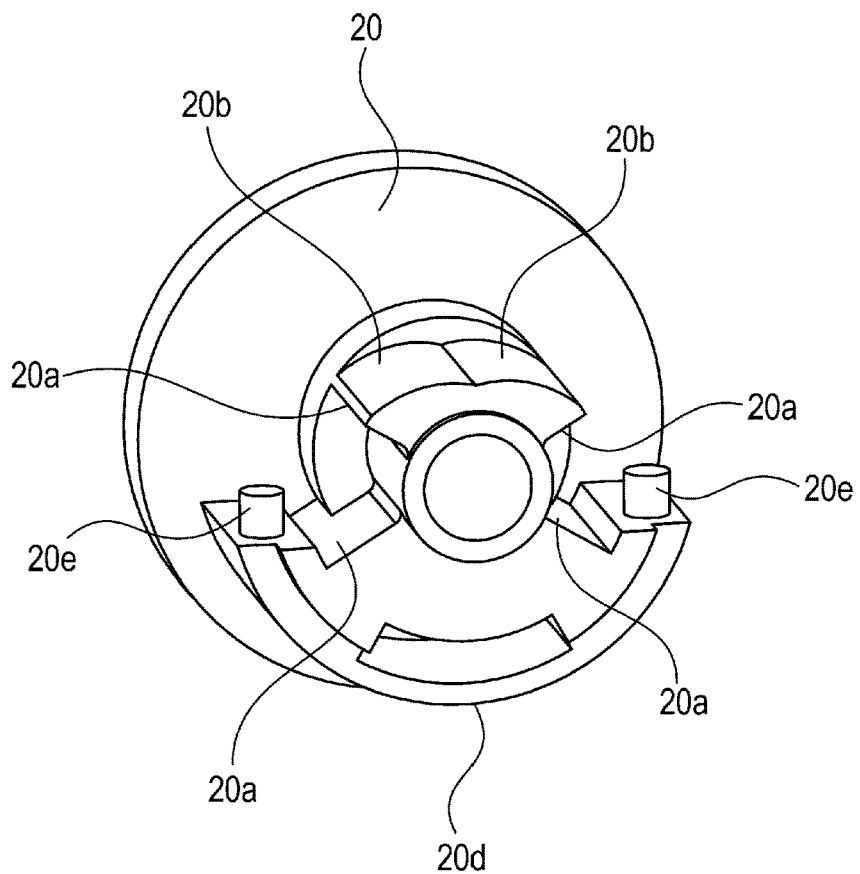
Figure 35:
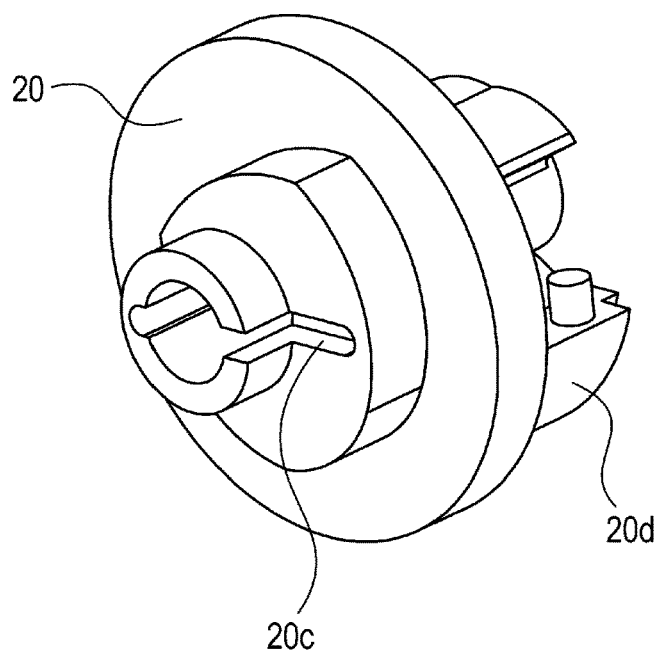

Parts (a) and (b) of FIG. 35 are perspective views of an outputting member in Fifth Embodiment.

Figure 36:
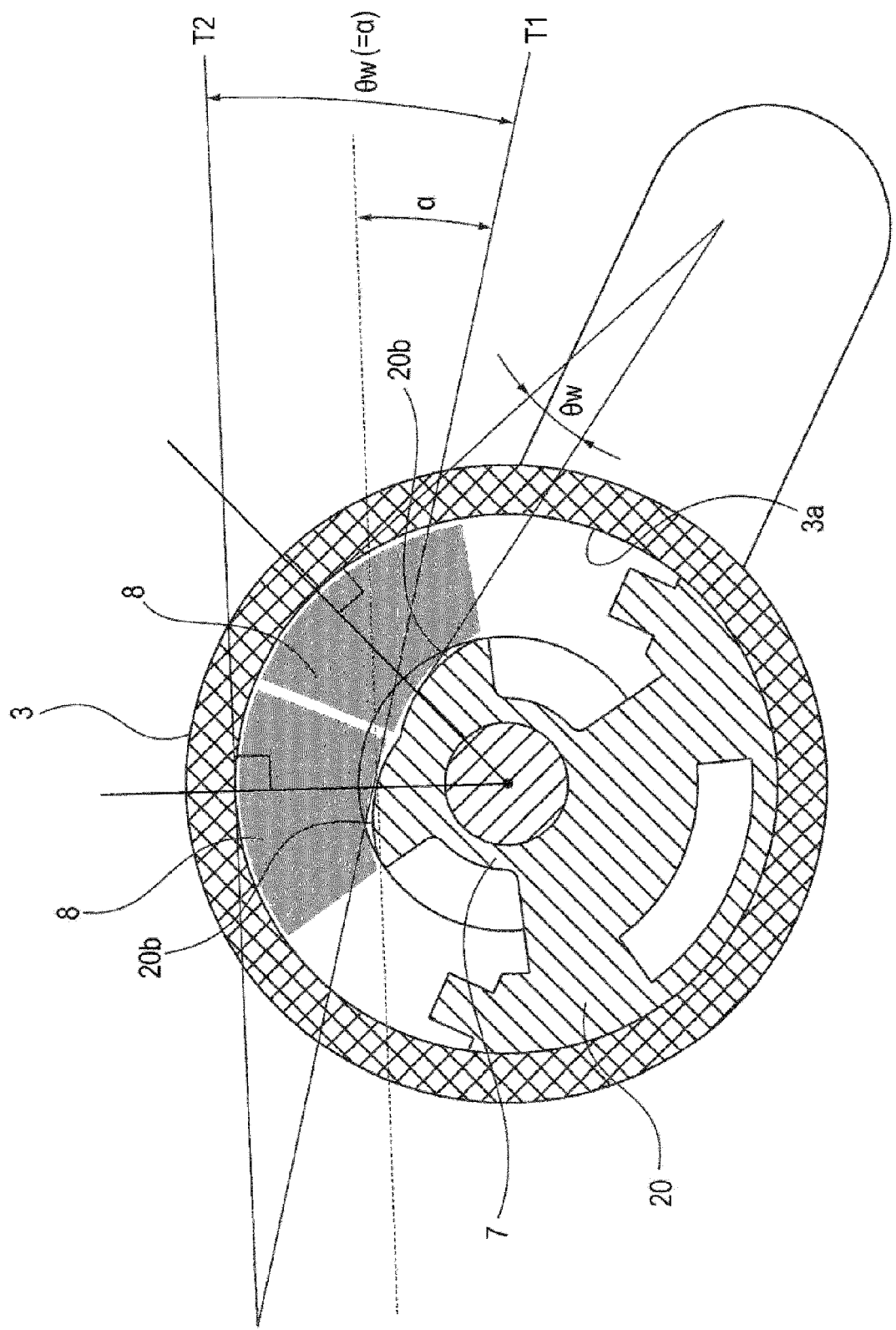

FIG. 36 is a sectional view of the outputting member and a stationary member in Fifth Embodiment.

Figure 37:
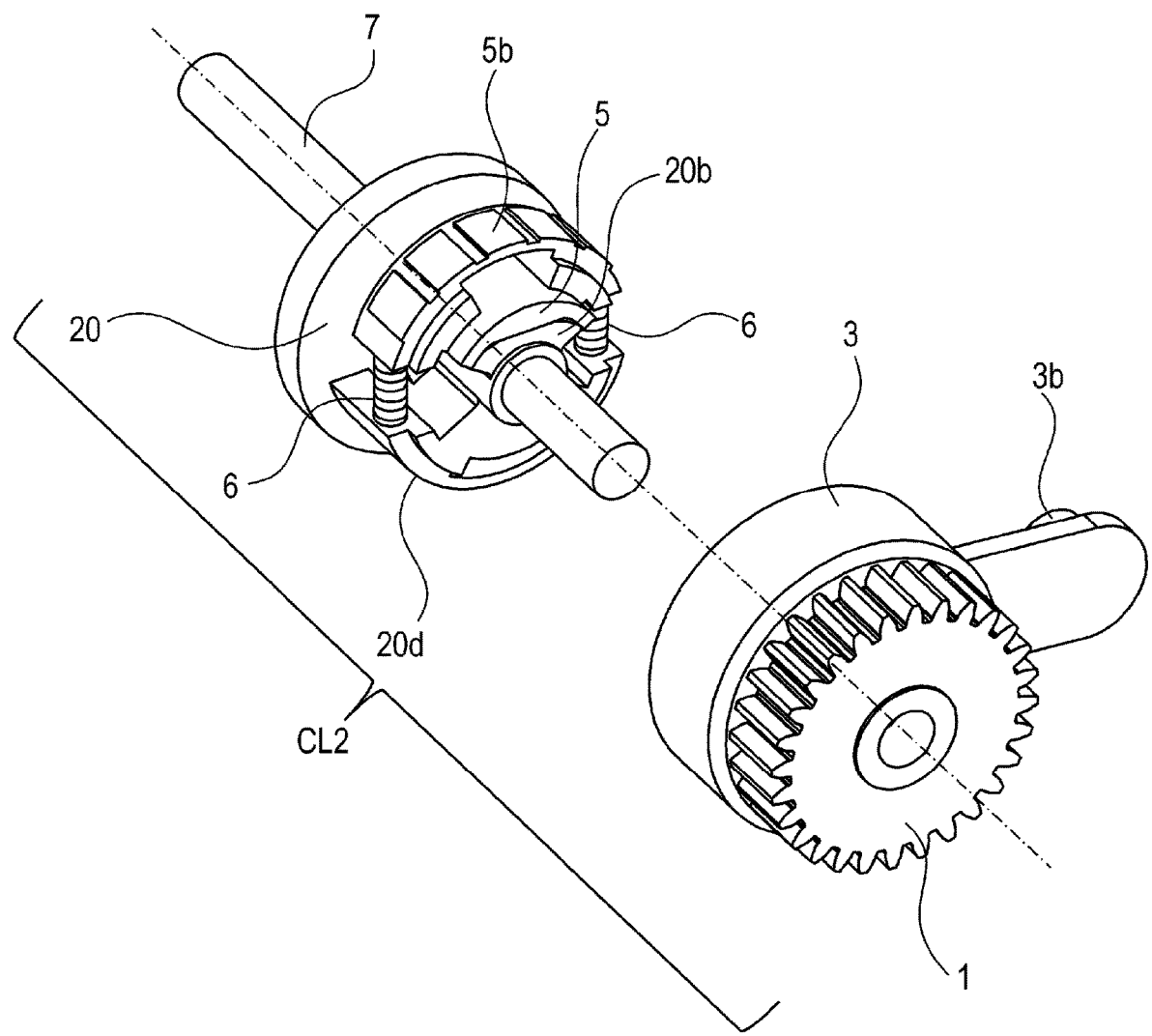

FIG. 37 is a perspective view of the clutch during assembling.

Figure 38:
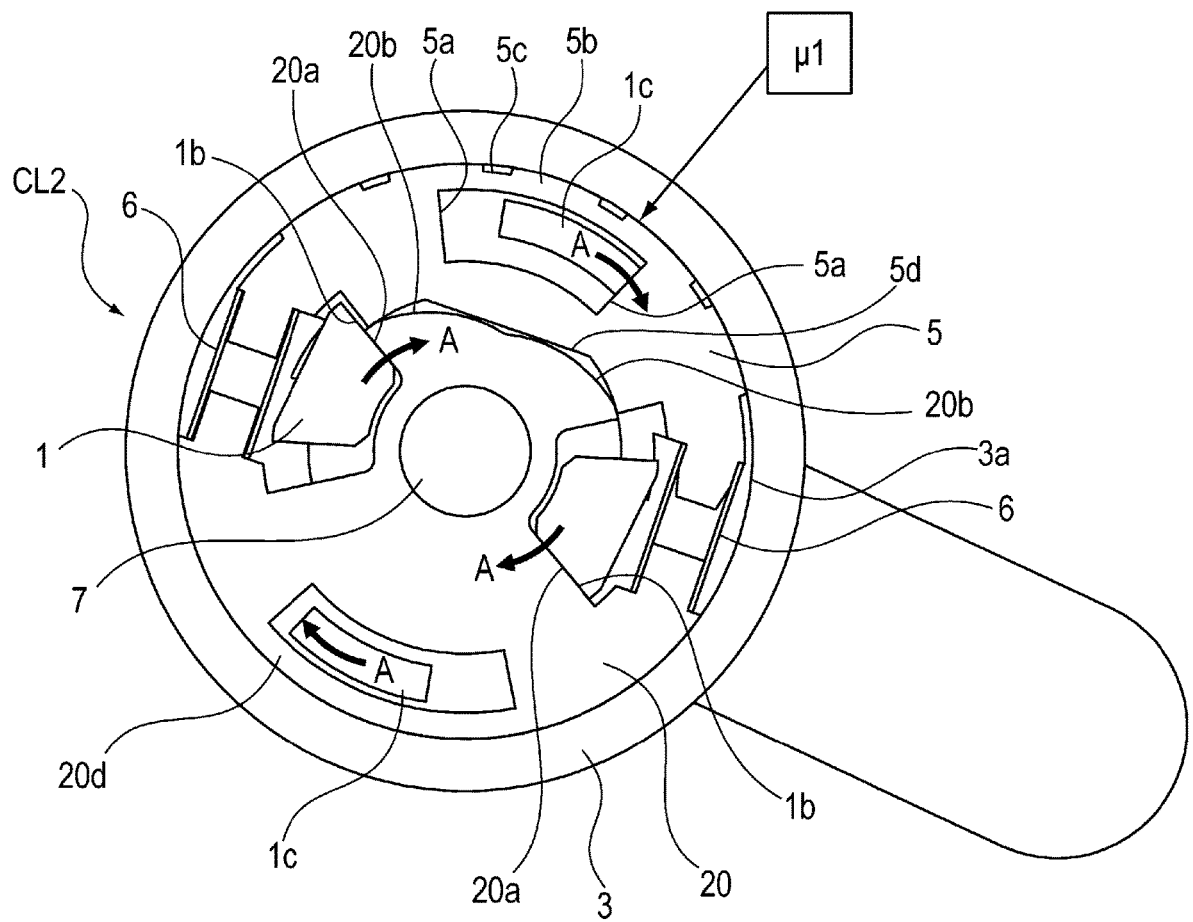

FIG. 38 is a sectional view of the clutch transmitting an input torque from an inputting member to the outputting member.

Figure 39:
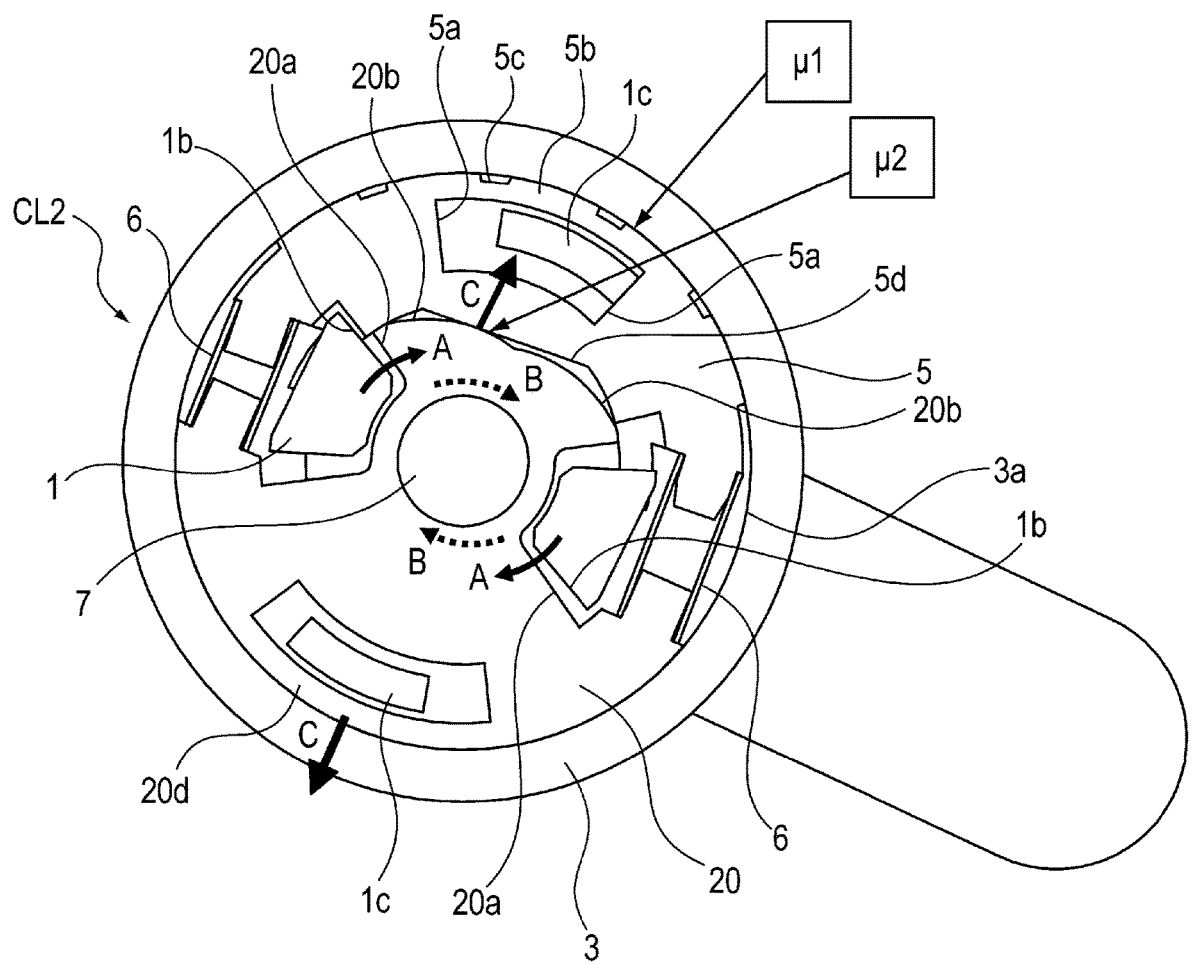

FIG. 39 is a sectional view of the clutch cutting off a reverse input torque from the outputting member.

Figure 40:
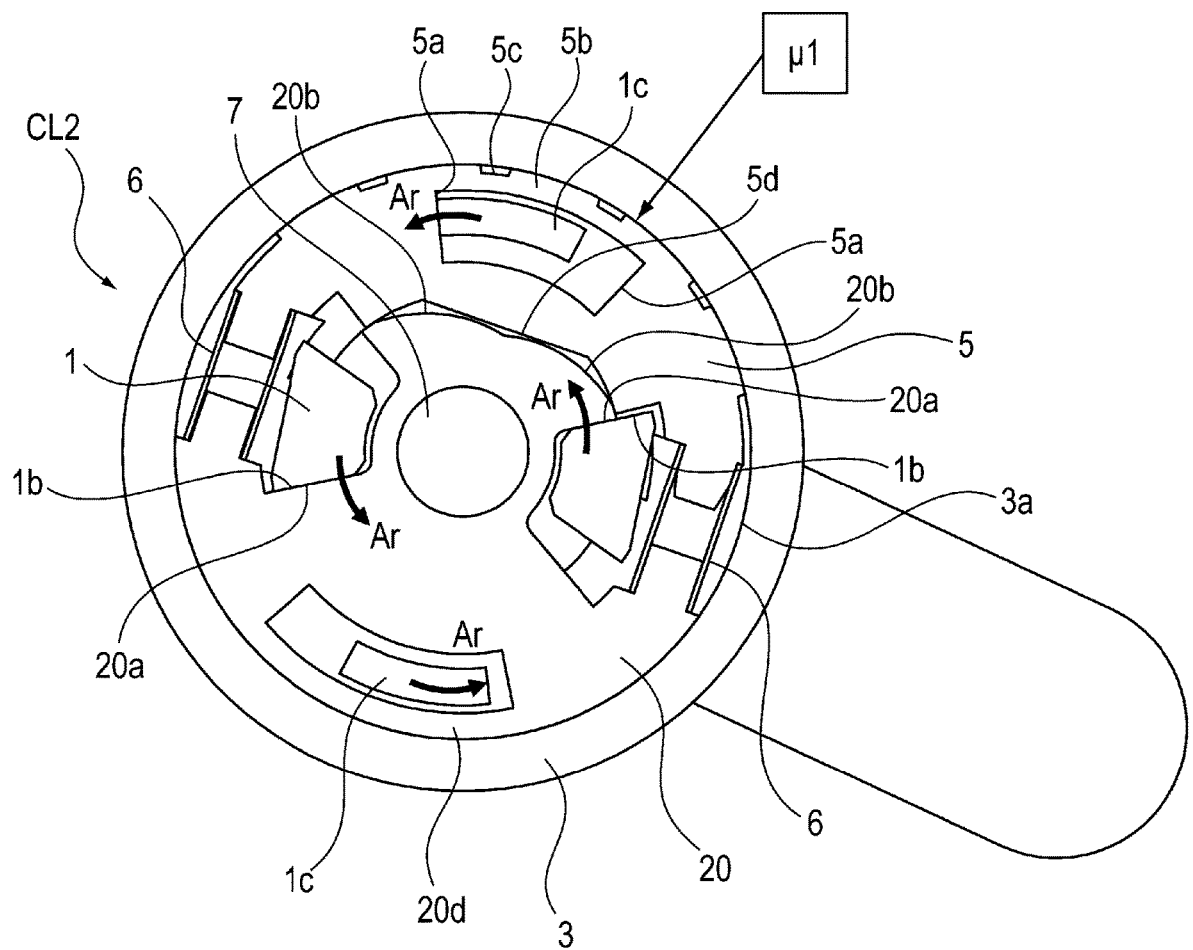

FIG. 40 is a sectional view of the clutch transmitting an input torque from the inputting member to the outputting member.

Figure 41:
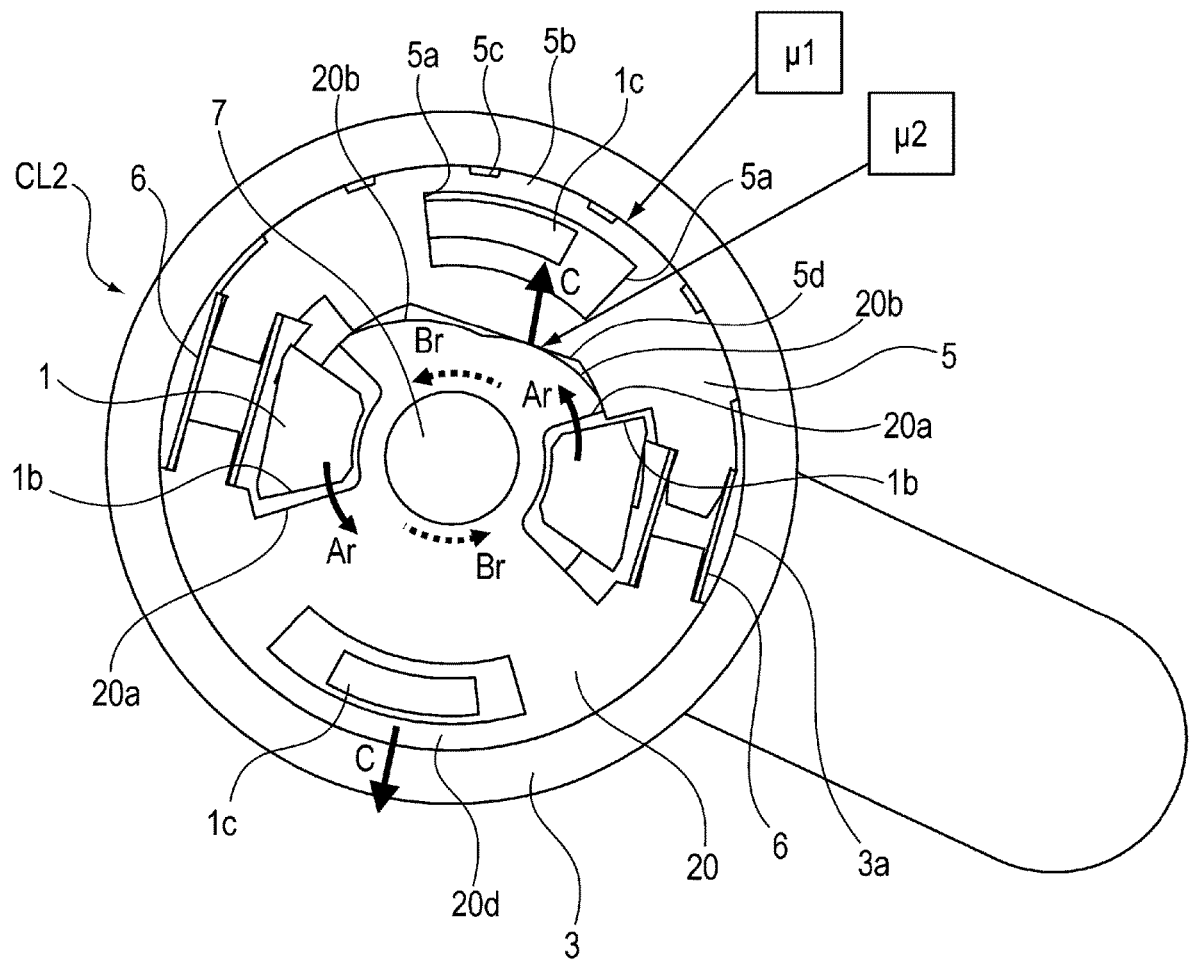

FIG. 41 is a sectional view of the clutch cutting off a reverse input cutoff clutch from the outputting member.

DESCRIPTION OF EMBODIMENTS

A reverse input cutoff clutch in an embodiment of the present invention will be described.

First Embodiment

The reverse input cutoff clutch in the present invention not only transmits an input torque from an inputting member to an outputting member but also cuts off a reverse input torque inputted from the outputting member toward the inputting member when the reverse input torque generates, for example. This reverse input cutoff clutch is incorporated in a drive transmission device for suppressing that the outputting member rotates at a driving speed faster than a driving speed of the inputting member.

In this embodiment, in an electrophotographic image forming apparatus, the reverse input cutoff clutch is incorporated in the drive transmission device for transmitting a driving force to a cam member for spacing rollers of a fixing roller pair press-contacted by a spring or the like. Incidentally, the apparatus in which the reverse input cutoff clutch in this embodiment is incorporated is not limited to the image forming apparatus.

Figure 1:
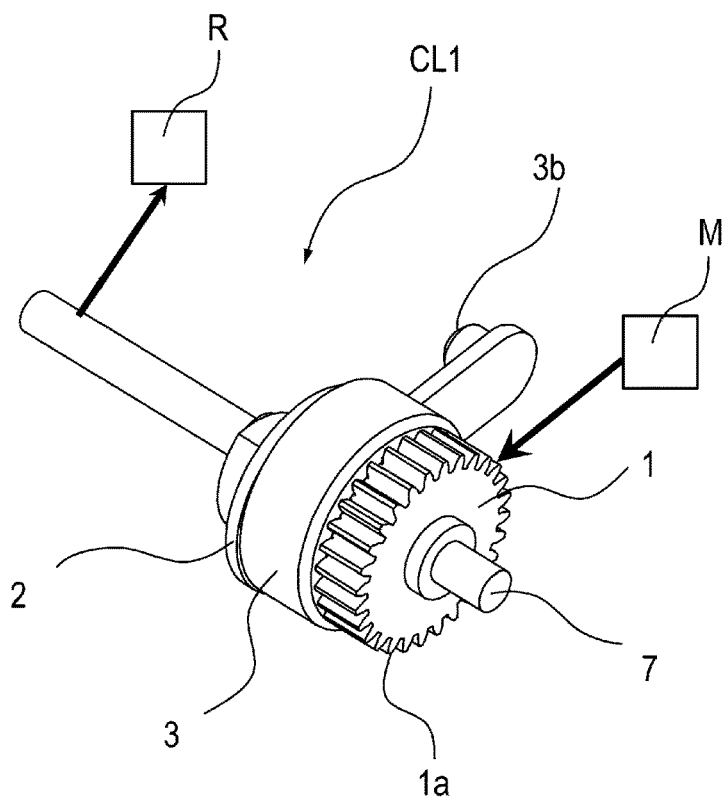
Figure 1:
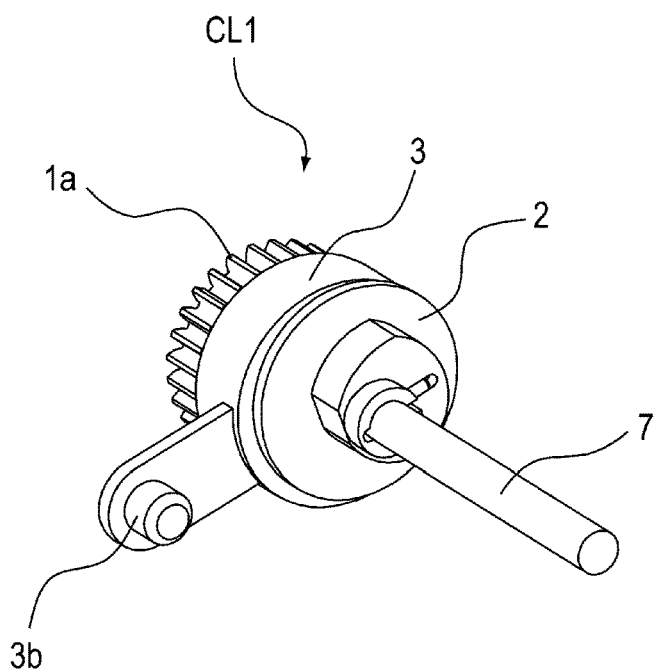
Figure 2:
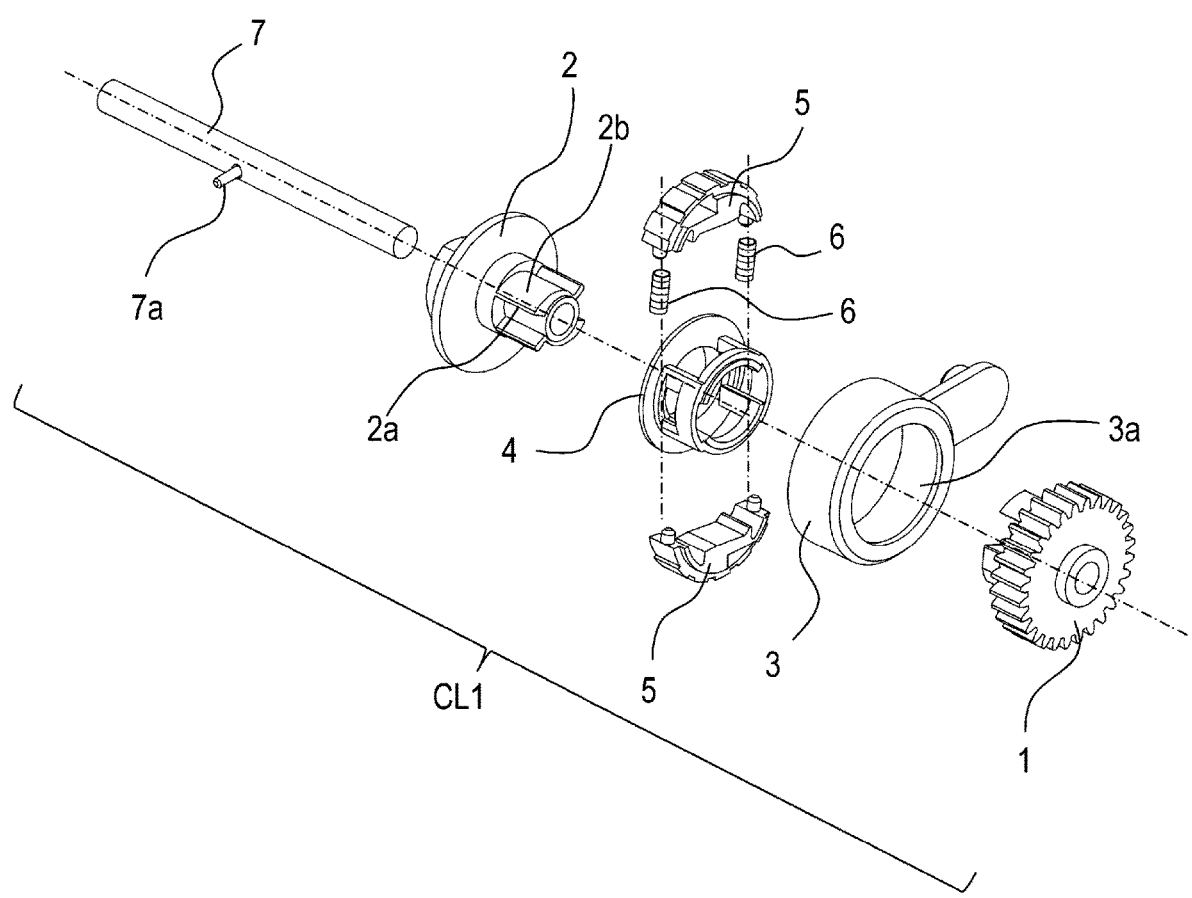
FIG. 2 is a perspective view before assembling of the clutch in First Embodiment.

A constitution of the reverse input cutoff clutch in this embodiment will be described with reference to FIGS. 1 to 8. Parts (a) and (b) of FIG. 1 are perspective views of a reverse input cutoff clutch CL1 (hereinafter simply referred to as a clutch CL1), and show a relationship between a front side and a rear side of the clutch CL1. In the following, the side of part (a) is the "front side", and the side of part (b) is the "rear side". FIG. 2 is a perspective view of the clutch CL1 before assembling.

[Structure of Clutch CL1]

As shown in FIGS. 1 and 2, the clutch CL1 includes an inputting member 1 to which an input torque of a driving source M1 is inputted, an outputting member 2 to which the input torque is transmitted, and a stationary member 3 of which rotation is constrained. The clutch CL1 further includes a pair of contact members 5 held by a holding member 4 and two urging members 6 for urging the contact member 5. The above-described members constituting the clutch CL1 are disposed coaxially with a rotation shaft 7, and the members other than the stationary member 3 are provided rotatably about the rotation shaft 7. The rotation shaft 7 is provided with a pin portion 7a.

Parts (a) and (b) of FIG. 3 are perspective views of the inputting member 1. As shown in FIG. 3, the inputting member 1 is provided at an outer peripheral portion of the clutch CL1, and the input torque is inputted to a gear portion 1a connected with the driving source M (not shown in the figure). Further, the inputting member 1 includes input engaging portions 1b for transmitting the input torque in engagement with the outputting member 2 (not shown in the figure) and input contact portions 1c for driving the contact members 5 in contact with the contact members 5 (not shown in the figure) so as to be symmetrical with respect to a rotation center.

The stationary member 3 includes, as shown in FIGS. 1 and 2, a cylindrical inner wall surface 3a contactable to the contact members 5 and a rotation constraining portion 3b.

The rotation constraining portion 3b is fixed to a mounting portion (not shown in these figures), whereby rotation of the stationary member 3 is prevented.

Parts (a) and (b) of FIG. 4 are perspective views of the outputting member 2. FIG. 5 is a sectional view showing a positional relationship between the outputting member 2 and the stationary member 3.

As shown in FIG. 4, the outputting member 2 includes output engaging portions 2a which are output contact portions to which the input torque is transmitted in engagement with the input engaging portion 1b (not shown in the figure) of the inputting member 1 and curved surface-shaped cam portions 2b which are output contact portions contacting the contact members 5 (not shown in the figure) so as to be symmetrical with respect to the rotation center.

As shown in FIGS. 1, 2 and 4, the outputting member 2 includes a pin groove 2c connected with the pin portion 7a of the rotation shaft 7, and the input torque transmitted to the outputting member 2 is transmitted to a follower (driven) portion R via the pin portion 7a.

As shown in FIG. 5, the cam portions 2b as the output contact portions of the outputting member 2 are formed in a helical shape. The cam portions 2b in this embodiment are formed in a logarithmic helical shape with a tangential line angle α which is a certain angle.

Accordingly, an angle θw tangential line T1 of the cam portion 2b and a tangential line T2 on the cylindrical inner wall surface 3a of the stationary member 3 at a position on an extended line connecting a rotational axis center and the cam portion 2b of the outputting member 2 is equal to a tangential line angle α of the cam portion 2b of the outputting member 2. The angle θw is hereinafter referred to as a wedge angle θw.

The wedge angle θw is an important angle for providing the contact members 5 with wedge action described later, and each of wedge-shaped space portions 8 with the wedge angle θw is formed between the cam portion 2b of the outputting member 2 and the cylindrical inner wall surface 3a of the stationary member 3.

Parts (a) and (b) of FIG. 6 are perspective views of the contact members 5. FIG. 6 is a front view of the contact member 5.

As shown in FIGS. 1 to 4 and 6, the contact member 5 includes a driven portion 5a to which the input contact portion 1c of the inputting member 1 is contacted and an arcuate engaging portion (first contact surface) 5b which has the same diameter as an inner peripheral diameter of the cylindrical inner wall surface 3a of the stationary member 3 and which contacts the cylindrical inner wall surface 3a. The arcuate engaging portion 5b which is the first contact surface of the contact member 5 is provided with a plurality of groove portions 5c which are recessed from the arcuate engaging portion 5b and which do not contact the stationary member 3. The plurality of groove portions 4c extend in a rotational axis direction (indicated by a chain line in FIG. 2). The arcuate engaging portion 5b of each of the contact members 5 and the cylindrical inner wall surface 3a of the stationary member 3 surface-contact each other. A range in which the arcuate engaging portion 5b surface-contacts the cylindrical inner wall surface 3a is within a range of an angle β formed by a rectilinear line r1 connecting a rotation center of the clutch CL1 and one end of the arcuate engaging portion 4b and a rectilinear line r2 connecting the rotation center of the clutch CL1 and the other end of the arcuate engaging portion 5b. Specifically, the angle β is within a range from 60 degrees to 180 degrees. However, the angle β is not limited to the above-described range. Convention-ally, the clutch is locked by point contact, and on the other hand, in the present invention, there is an effect when the clutch is locked by surface contact. The above-described plurality of groove portions 5c are provided within the range of the angle β in which the arcuate engaging portion 5b of the contact member 5 contacts the cylindrical inner wall surface 3a of the stationary member 3. The contact member 5 includes a cam contact surface (second contact surface) 5d contacting the operation 2b which is the output contact portion of the outputting member 2 and two bosses 5e.

As shown in FIG. 7, the cam contact surface 5d is constituted by an inclined surface with an angle θ formed between itself and a tangential line T3 of the arcuate engaging portion 5b at a position on an extended line connecting the rotational axis center and a contact portion 5f where the cam contact surface 5d contacts the cam portion 2b.

Here, the angle θ is equal to the above-described wedge angle θw (i.e., θ=θw). Incidentally, the angle θ is not required to be completely equal to the wedge angle θw, but may only be required to be substantially equal to the wedge angle θw.

Parts (a) and (b) of FIG. 8 are perspective views of the clutch CL1 during assembling.

As shown in FIGS. 2 and 8, the holding member 4 holds the contact members 5 so that the contact members 5 are slidable on the cylindrical inner wall surface 3a of the stationary member 3 and so that a diameter center axis of the arcuate engaging portions 5b of the contact member 5 is coaxial with a center axis of the rotation shaft 7. Further, the two contact members 5 are disposed symmetrically with respect to the rotation shaft 7 in the wedge-shaped space portions 8 between the outputting member 2 and the stationary member 3.

The urging members 6 are provided on the bosses 5e of the contact members 5 at two positions so that each of the contact members 5 is urged toward the cylindrical inner wall surface 3a of the stationary member 3 and thus the arcuate engaging portion 5b of the contact member 5 contacts the cylindrical inner wall surface 3a of the stationary member 3.

An urging force of the urging member 6 is constituted by an urging force such that a predetermined frictional force is generated between the arcuate engaging portion 5b of each of the contact members 5 and the cylindrical inner wall surface 3a of the stationary member 3.

[Operation of Clutch CL1]

An operation of the clutch CL1 will be described with reference to FIGS. 9 and 10. FIG. 9 is a sectional view of the clutch CL1 in a state in which the input torque from the inputting member 1 is transmitted to the outputting member 2, and FIG. 10 is a sectional view of the clutch CL1 in a state in which a reverse input torque from the outputting member 2 is cut off (blocked).

As shown in FIG. 9, the inputting member 1 is rotated in arrow A directions by the input torque, so that the input engaging portions 1b of the inputting member 1 engage with the output engaging portions 2a of the outputting member 2 and thus the inputting member 1 rotates the outputting member 2 in the arrow A directions.

The input contact portions 1c of the inputting member 1 engage with the driven portions 5a of the contact members 5 and rotate the contact members 5, and the arcuate engaging portions 5b are rotated in the arrow A directions by the urging forces of the urging members 6 while slide-contacting the cylindrical inner wall surface 3a of the stationary member 3. Incidentally, FIG. 9 is the sectional view of the clutch CL1 as seen on a plane (cross-section) perpendicular to the rotational axis (indicated by the chain line of FIG. 8) of the inputting member 1. As shown in FIG. 9, in the case where the clutch CL1 is seen on the plane perpendicular to the rotational axis of the inputting member 1, the input contact portions 1c of the inputting member 1 contacting the contact members 5 are surrounded by the contact members 5.

In the case where there are dust or the like and a small foreign matter between the arcuate engaging portion 5b and the cylindrical inner wall surface 3a, these matters are scraped off in the groove portions 5c by the groove portions 5c of the arcuate engaging portion 5b.

The contact members 5 rotating while slide-contacting the cylindrical inner wall surface 3a of the stationary member 3 are in a lock-released state in which the cam portions 2b of the outputting members 2 and the cam contact surfaces 5d of the contact members 5 do not engage with each other. Thus, in the rotation of the inputting member 1, in a state in which the input engaging portions 1b and the output engaging portions 2a engage with each other, the cam portions 2b of the outputting member 2 and the cam contact surfaces 5d are in a spaced phase relationship.

As shown in FIG. 10, the inputting member 1 is rotated in the arrow A directions by the input torques, so that a state in which reverse input torques B in the same rotational direction as that of the image 1 are generated in the outputting member 2 is formed.

When the reverse input torques B in the same rotational direction as that of the inputting member 1 are generated in the outputting member 2, the outputting member 2 is rotated by the reverse input torques B at a rotational speed faster than a rotational speed of the inputting member 1.

As a result, the cam portions 2b of the outputting member 2 engage with the cam contact surfaces 5d of the contact members 5, so that the input engaging portions 1b of the inputting member 1 and the output engaging portions 2a of the outputting member 2 are spaced from each other.

Then, an urging force C is generated by the contact of the cam portions 2b of the outputting member 2 with the cam contact surfaces 5d of the contact member 5, so that the arcuate engaging portions 5b of the contact members 5 are urged against the cylindrical inner wall surface 3a of the stationary member 3. The contact members 5 are in a locked state by generation of wedge action such that the contact members 5 bite into the wedge-shaped space portions 8 shown in FIG. 5.

When the contact members 5 are in the locked state, the outputting member 2 is prevented from being rotated by the reverse input torques B at the rotational speed faster than the rotational speed of the inputting member 1. As a result, the reverse input torques B from the outputting member 2 are cut off and thus are not transmitted toward the inputting member 1.

Then, when the state of the clutch CL1 is changed from the state of FIG. 10 to a state in which the reverse input torques B do not generate in the outputting member 2, as shown in FIG. 9, a state in which the input engaging portions 1b of the inputting member 1 are engaged again with the output engaging portions 2a of the outputting member 2 by the rotation of the inputting member 1 is formed.

As a result, the input contact portions 1c of the inputting member 1 engage with the driven portions 5a of the contact members 5 and rotate the contact members 5, so that the contact members 5 are operated from the locked state in which the contact members 5 bite to the lock-released state.

Thus, when the contact members 5 are in the lock-released state, the input torque from the inputting member 1 is transmitted to the outputting member 2, and in addition, when the contact members 5 are in the locked state, the reverse input torque from the outputting member 2 is cut off and is not transmitted toward the inputting member 1.

[Wedge Action Condition of Contact Member 5]

The clutch CL1 in this embodiment has the above-described wedge angle $\theta w$ in FIG. 5. Further, as shown in FIGS. 9 and 10, the clutch CL1 has a frictional coefficient $\mu 1$ between the cylindrical inner wall surface 3a of the stationary member 3 and each of the arcuate engaging portions 5b of the contact members 5 and a frictional coefficient $\mu 2$ between each of the cam portions 2b of the outputting member 2 and an associated cam contact surface 5d of the contact members 5.

As a condition capable of locking the rotation of the outputting member 2 with reliability by generation of the wedge action in the contact members 5 when the outputting member 2 is likely to be rotated by the reverse input torque, the clutch CL1 is constituted so that the following relational expression holds:

$$\mu 1 + \mu 2 > 2 \tan(\theta w/2),$$

which is a replaced calculation formula of general wedge action.

As regards the shape of the cam portions 2b in this embodiment, even other than the logarithmic helical shape, another helical shape such as Archimedes helical shape may also be employed when the tangential line angle $\alpha$ of each of the cam portions 2b is within a range satisfying the wedge angle $\theta w$ in which the contact member 5 is in the locked state.

The shape of the plurality of the groove portions 5c of the contact members 5 is not necessary since the shape does not affect the relational expression of the wedge angle $\theta w$ in which the contact members 5 are in the locked state.

As described above, the clutch CL1 in this embodiment includes the two contact members 5 disposed in the wedge-shaped space portions 8 between the outputting member 2 and the stationary member 3 so as to be symmetrical with respect to the center of the rotation shaft 7. As a result, also the input engaging portions 1b and the input contact portions 1c of the inputting member 1 and the output engaging portion 2a and the cam portions 2b of the outputting member 2 are constituted by a small number of component parts of the clutch CL1 correspondingly to the number of the contact members 5, and therefore, a structure of the clutch CL1 is simplified.

Further, each of the contact members 5 is constituted so that the arcuate engaging portion 5b and the cylindrical inner wall surface 3a of the stationary member 3 surface-engage with each other. As a result, the contact member 5 can reduce a surface pressure exerted on the contact member 5 and the stationary member 3, so that materials constituting the respective members can also be constituted by a resin material such as polyacetal, not a metallic material resistant to abrasion and breakage. As a result, it becomes possible to provide an inexpensive clutch. Incidentally, similarly as in the above-described contact members 5, also the above-described inputting member 1, outputting member 2, stationary member 3 and holding member 4 are formed of the resin material.

Also in the case where the members of the clutch CL1 are constituted by the metallic material, there is no need to constitute the members with the contact members 5 such as many rollers, balls or the like, and the two contact members 5 are enough to constitute the contact members 5, and therefore, the structure of the clutch CL1 is simplified. Further, the resistances to the abrasion and the breakage are further improved.

By constituting the wedge angle θw so as to be certain angle, it is possible to minimize an error of the wedge angle θw due to accuracy errors of members, such as those of outer diameters of the cam portions 2b of the outputting member 2 and the arcuate engaging portions 5b of the contact members and an inner diameter of the cylindrical inner wall surface 3a of the stationary member 3.

As a result, in the above-described relational expression of the wedge action, a tolerance of the wedge angle θw with respect to the frictional coefficient μ1 between the cylindrical inner wall surface 2a and the stationary member 3 and the arcuate engaging portion 5b of the contact member 5 and the frictional coefficient μ2 between the cam portion 2b of the outputting member 2 and the cam contact surface 5d of the contact member 5 is improved.

Second Embodiment

A constitution of a reverse input cutoff clutch in Second Embodiment of the present invention will be described with reference to FIGS. 11 to 16. FIG. 11 is a perspective view of a reverse input cutoff clutch CL2 (hereinafter simply referred to as a clutch CL2) before assembling. Incidentally, constituent elements similar to those in First Embodiment described above are represented by adding similar reference numerals or symbols and will be omitted from description.

[Structure of Clutch CL2]

As shown in FIG. 11, the clutch CL2 includes an inputting member 1 to which an input torque of a driving source M1 is inputted, an outputting member 2 to which the input torque is transmitted, a stationary member 3 of which rotation is constrained, a pair of contact members 5 and two urging members 6 for urging the contact member 5. The respective members constituting the clutch CL2 are disposed coaxially with a rotation shaft 7, and the members other than the stationary member 3 are provided rotatably about the rotation shaft 7.

As regards the clutch CL2, similarly as in First Embodiment, each of wedge-shaped space portions 8 (not shown) with the wedge angle θw is formed between the cam portion 2b of the outputting member 2 and the cylindrical inner wall surface 3a of the stationary member 3.

FIG. 12 is a perspective view of the contact member 5. FIG. 13 is a front view of the contact member 5.

As shown in FIGS. 12 and 13, the contact member 5 includes two rotation contact portions 5g.

FIG. 14 is a perspective view of the clutch CL2 during the assembling. As shown in FIG. 14, similarly as in First Embodiment, two contact members 5 are provided between the stationary member 3 and the cam portions 2b of the outputting member 2.

The contact members 5 are disposed at symmetrical positions with respect to a rotational axis center by contact of the rotation contact portions 5g of one contact member 5 with the rotation contact portions 5g of the other contact member 5 even when there is no holding member for holding the contact members 5. The contact members 5 are urged by the urging members 6 in directions toward the cylindrical inner wall surface 3a of the stationary member 3, so that the arcuate engaging portions 5b of the contact members 5 contact the cylindrical inner wall surface 3a of the stationary member 3.

[Operation of Clutch CL2]

An operation of the clutch CL2 will be described with reference to FIGS. 15 and 16. FIG. 15 is a sectional view of the clutch CL2 in a state in which the input torque from the inputting member 1 is transmitted to the outputting member 2, and FIG. 16 is a sectional view of the clutch CL2 in a state in which a reverse input torque from the outputting member 2 is cut off.

As shown in FIG. 15, the inputting member 1 is rotated in arrow A directions by the input torque, so that the input engaging portions 1b of the inputting member 1 engage with the output engaging portions 2a of the outputting member 2 and thus the inputting member 1 rotates the outputting member 2 in the arrow A directions.

The input contact portions 1c of the inputting member 1 engage with the driven portions 5a of the contact members 5 and rotate the contact members 5, and the arcuate engaging portions 5b are rotated in the arrow A directions by the urging forces of the urging members 6 while slide-contacting the cylindrical inner wall surface 3a of the stationary member 3.

The contact members 5 rotating while slide-contacting the cylindrical inner wall surface 3a of the stationary member 3 are in a lock-released state in which the cam portions 2b of the outputting members 2 and the cam contact surfaces 5d of the contact members 5 do not engage with each other.

As shown in FIG. 16, the inputting member 1 is rotated in the arrow A directions by the input torques, so that a state in which reverse input torques B in the same rotational direction as that of the image 1 are generated in the outputting member 2 is formed.

When the reverse input torques B in the same rotational direction as that of the inputting member 1 are generated in the outputting member 2, the outputting member 2 is rotated by the reverse input torques B at a rotational speed faster than a rotational speed of the inputting member 1.

As a result, the cam portions 2b of the outputting member 2 engage with the cam contact surfaces 5d of the contact members 5, so that the input engaging portions 1b of the inputting member 1 and the output engaging portions 2a of the outputting member 2 are spaced from each other.

Then, an urging force C is generated by the contact of the cam portions 2b of the outputting member 2 with the cam contact surfaces 5d of the contact member 5, so that the arcuate engaging portions 5b of the contact members 5 are urged against the cylindrical inner wall surface 3a of the stationary member 3. The contact members 5 are in a locked state by generation of wedge action such that the contact members 5 bite into the wedge-shaped space portions 8 shown in FIG. 5.

When the contact members 5 are in the locked state, the contact members 5 lock rotation of the outputting member 2 by the reverse input torques B at the rotational speed faster than the rotational speed of the inputting member 1. As a result, the reverse input torques B from the outputting member 2 are cut off and thus are not transmitted toward the inputting member 1.

Then, when the state of the clutch CL1 is changed from the state of FIG. 16 to a state in which the reverse input torques B do not generate in the outputting member 2, as shown in FIG. 15, by an operation similar to the operation in First Embodiment, the state of the contact members 5 is changed from the locked state to the lock-released state.

According to the above-described explanation, the clutch CL2 in this embodiment includes the contact members 5 provided with the rotation contact portions 5g, and during the assembling, the rotation contact portions 5g of one contact member 5 contact the rotation contact portions 5g of the other contact member 5, respectively. As a result, even when there is no holding member for holding the contact members 5 as in First Embodiment, the pair of contact members 5 can be disposed at the symmetric positions with respect to the rotational axis center.

As a result, the number of component parts constituting the clutch CL2 is smaller than that in First Embodiment, and therefore, the structure of the clutch CL2 can be further simplified and can be further reduced in cost.

Third Embodiment

A constitution of a reverse input cutoff clutch in Third Embodiment of the present invention will be described with reference to FIGS. 17 to 21. FIG. 17 is a perspective view of a reverse input cutoff clutch CL3 (hereinafter simply referred to as a clutch CL3) before assembling. Incidentally, constituent elements similar to those in First and Second Embodiments described above are represented by adding similar reference numerals or symbols and will be omitted from description.

[Structure of Clutch CL3]

As shown in FIG. 17, the clutch CL3 includes an inputting member 1 to which an input torque of a driving source M1 is inputted, an outputting member 20 to which the input torque is transmitted, a stationary member 3 of which rotation is constrained. The clutch CL3 further includes a contact member 5 provided with rotation contact portions 5g and two urging members 6 for urging the contact member 5. The above-described members constituting the clutch CL3 are disposed coaxially with a rotation shaft 7, and the members other than the stationary member 3 are provided rotatably.

Parts (a) and (b) of FIG. 18 are perspective views of the outputting member 20. As shown in FIGS. 17 and 18, the outputting member 20 includes output engaging portions 20a to which an input torque is transmitted in engagement with input engaging portions (not shown) of the inputting member 1 and curved surface-shaped cam portions 20b engaging with the contact member 5.

Further, the outputting member 20 includes a pin groove 20c connecting with a pin portion 7a of the rotation shaft 7, and the input torque transmitted to the outputting member 20 is transmitted to a driven portion R via the pin portion 7a of the rotation shaft 7.

The outputting member 20 further includes an arcuate output portion 20d which has a diameter substantially equal to an inner peripheral diameter of the cylindrical inner wall surface 3a of the stationary member 3 and which contacts the cylindrical inner wall surface 3a, and includes two bosses 20e.

FIG. 19 is a perspective view of the clutch CL3 during the assembling.

As shown in FIGS. 17, 18 and 19, the contact member 5 is provided singly between the stationary member 3 and the cam portion 2b of the outputting member 2.

The rotation contact portion 5g of the contact member 5 engages with the outputting member 20. As a result, the contact member 5 is disposed at a position opposing the arcuate output portion 20d of the outputting member 20 with respect to the center of the rotation shaft 7 and is urged against the cylindrical inner wall surface 3a of the stationary member 3 by the urging members 6, so that the arcuate engaging portion 5b of the contact member 5 contacts the cylindrical inner wall surface 3a of the stationary member 3.

Each of the urging members 6 is disposed on the boss 5e of the contact member 5 and the boss 20e of the outputting member 20 so as to urge the contact member 5 in a direction toward the cylindrical inner wall surface 3a of the stationary member 3.

[Operation of Clutch CL3]

An operation of the clutch CL3 will be described with reference to FIGS. 20 and 21. FIG. 20 is a sectional view of the clutch CL3 in a state in which the input torque from the inputting member 1 is transmitted to the outputting member 20, and FIG. 21 is a sectional view of the clutch CL3 in a state in which a reverse input torque from the outputting member 20 is cut off.

As shown in FIG. 20, the inputting member 1 is rotated in arrow A directions by the input torque, so that the input engaging portions 1b of the inputting member 1 engage with the output engaging portions 20a of the outputting member 20 and thus the inputting member 1 rotates the outputting member 20 in the arrow A directions.

The input contact portions 1c of the inputting member 1 engage with the driven portions 5a of the contact members 5 and rotate the contact members 5, and the arcuate engaging portions 5b are rotated in the arrow A directions by the urging forces of the urging members 6 while slide-contacting the cylindrical inner wall surface 3a of the stationary member 3. Incidentally, FIG. 20 is the sectional view of the clutch CL1 as seen on a plane (cross-section) perpendicular to the rotational axis (indicated by the chain line of FIG. 19) of the inputting member 1. As shown in FIG. 20, in the case where the clutch CL3 is seen on the plane perpendicular to the rotational axis of the inputting member 1, the input contact portion 1c of the inputting member 1 contacting the contact member 5 is surrounded by the contact member 5.

The contact member 5 rotating while slide-contacting the cylindrical inner wall surface 3a of the stationary member 3 is in a lock-released state in which the cam portions 2b of the outputting members 20 and the cam contact surface 5d of the contact member 5 does not engage with each other.

As shown in FIG. 21, the inputting member 1 is rotated in the arrow A directions by the input torques, so that a state in which reverse input torques B in the same rotational direction as that of the image 1 are generated in the outputting member 20 is formed.

When the reverse input torques B in the same rotational direction as that of the inputting member 1 are generated in the outputting member 20, the outputting member 20 is rotated by the reverse input torques B at a rotational speed faster than a rotational speed of the inputting member 1.

As a result, the cam portions 20b of the outputting member 20 engage with the cam contact surfaces 5d of the contact member 5, so that the input engaging portions 1b of the inputting member 1 and the output engaging portions 20a of the outputting member 20 are spaced from each other.

Then, an urging force C is generated by the contact of the cam portions 20b of the outputting member 20 with the cam contact surface 5d of the contact member 5, so that the arcuate engaging portions 5b of the contact member 5 are urged against the cylindrical inner wall surface 3a of the stationary member 3. The contact member 5 is in a locked state by generation of wedge action such that the contact member 5 bites into the wedge-shaped space portions 8 shown in FIG. 5.

Further, an operation for putting the contact member 5 in the locked state, a slide-contact pressure between the arcuate output portion 20d of the outputting member 20 and the cylindrical inner wall surface 3a of the stationary member 3 increases, so that a slide-contact resistance between the outputting member 20 and the stationary member 3 increases.

Thus, by the locked state of the contact member 5 and the slide-contact resistance between the outputting member 20 and the stationary member 3, the contact member 5 locks rotation of the outputting member 20 by the reverse input torques B at the rotational speed faster than the rotational speed of the inputting member 1. As a result, the reverse input torques B from the outputting member 20 are cut off and thus are not transmitted toward the inputting member 1.

Then, when the state of the clutch CL1 is changed from the state of FIG. 21 to a state in which the reverse input torques B do not generate in the outputting member 20, as shown in FIG. 20, a state in which the input engaging portions 1b of the inputting member 1 are engaged with the output engaging portions 20a of the outputting member 20 again by the rotation of the inputting member 1 is formed.

As a result, the input contact portion 1c of the inputting member 1 engages with the driven portion 5a of the contact member 5 and rotates the contact member 5, so that the contact member 5 is operated from the locked state in which the contact member 5 bites to the lock-released state.

When the contact member 5 is in the lock-released state, the slide-contact pressure between the arcuate output portion 20d of the outputting member 20 and the cylindrical inner wall surface 3a of the stationary member 3 returns to the slide-contact pressure by the urging force of the urging members 6.

As a result, the arcuate output portion 20d of the outputting member 20 rotates while slide-contacting the cylindrical inner wall surface 3a of the stationary member 3.

Thus, when the contact member 5 is in the lock-released state, the input torque from the inputting member 1 is transmitted to the outputting member 20, and when the contact member 5 is in the locked state, the reverse input torque B from the outputting member 20 is cut off.

According to the above-described explanation, the clutch CL3 in this embodiment includes the arcuate output portion 20d contacting the cylindrical inner wall surface 3a of the stationary member 3. The rotation contact portions 5g of the contact member 5 engage with the outputting member 20, so that the contact member 5 can be disposed at position opposing the arcuate output portion 20d of the outputting member 20 with respect to the rotational axis center.

As a result, in the above-described embodiments, the plurality of contact members were disposed, but in this embodiment, the number of component parts of the contact members 5 is one, so that the number of component parts constituting the clutch CL3 is further smaller than those in First and Second Embodiments. For that reason, the structure of the clutch CL3 can be further simplified and can be further reduced in cost.

Fourth Embodiment

A reverse input cutoff clutch in this embodiment will be described.

The reverse input cutoff clutch in this embodiment not only transmits an input torque from an inputting member to an outputting member but also cuts off a reverse input torque inputted from the outputting member toward the inputting member when the reverse input torque generates, for example. The reverse input cutoff clutch in this embodiment is incorporated in a drive transmission device for suppressing that the outputting member rotates at a driving speed faster than a driving speed of the inputting member.

A constitution of the reverse input cutoff clutch in this embodiment will be described with reference to FIGS. 22 to 29 Parts (a) and (b) of FIG. 22 are perspective views of a reverse input cutoff clutch CL1 (hereinafter simply referred to as a clutch CL1), and show a relationship between a front side and a rear side of the clutch CL1. In the following, the side of part (a) is the "front side", and the side of part (b) is the "rear side". FIG. 23 is a perspective view of the clutch CL1 before assembling.

[Structure of Clutch CL1]

As shown in FIGS. 22 and 23, the clutch CL1 includes an inputting member 1 to which an input torque of a driving source M1 is inputted, an outputting member 2 to which the input torque is transmitted, a stationary member 3 of which rotation is constrained, a pair of contact members 5 and two urging members 6 for urging the contact member 5. The above-described members constituting the clutch CL1 are disposed coaxially with a rotation shaft 7 provided with a pin portion 7a, and the members other than the stationary member 3 are provided rotatably about the rotation shaft 7.

Parts (a) and (b) of FIG. 24 are perspective views of the inputting member 1. As shown in FIG. 24, the inputting member 1 is provided at an outer peripheral portion of the clutch CL1, and the input torque is inputted to a gear portion 1a connected with the driving source M (not shown in the figure). Further, the inputting member 1 includes input engaging portions 1b for transmitting the input torque in engagement with the outputting member 2 (FIG. 25) and input contact portions 1c for driving the contact members 5 in contact with the contact members 5 (FIG. 27) so as to be symmetrical with respect to a rotation center.

The stationary member 3 includes, as shown in FIGS. 22 and 23, a cylindrical inner wall surface 3a contacting the contact members 5 and a rotation constraining portion 3b. The rotation constraining portion 3b is fixed to a mounting portion (not shown in these figures), whereby rotation of the stationary member 3 is prevented.

Parts (a) and (b) of FIG. 25 are perspective views of the outputting member 2. FIG. 26 is a sectional view showing a positional relationship between the outputting member 2 and the stationary member 3.

As shown in FIG. 25, the outputting member 2 includes output engaging portions 2a as output contact portions to which the input torque is transmitted in engagement with the input engaging portion 1b (FIG. 24) of the inputting member 1 and four curved surface-shaped cam portions 2b as output contact portions contacting the contact members 5 (FIG. 27).

As shown in FIGS. 22, 23 and 25, the outputting member 2 includes a pin groove 2c connected with the pin portion 7a of the rotation shaft 7, and the input torque transmitted to the outputting member 2 is transmitted to a follower (driven) portion R via the pin portion 7a.

As shown in FIG. 26, the cam portions 2b as the output contact portions of the outputting member 2 are formed in a helical shape, and are provided so that winding directions of the helical-shaped adjacent cam portions 2b are opposite to each other, and are disposed symmetrically with respect to a center of the rotation shaft 7. Further, the cam portions 2b in this embodiment are formed in a logarithmic helical shape with a tangential line angle α which is a certain angle.

Accordingly, an angle θw tangential line T1 of the cam portion 2b and a tangential line T2 on the cylindrical inner wall surface 3a of the stationary member 3 at a position on an extended line connecting a rotational axis center and the cam portion 2b of the outputting member 2 is equal to a tangential line angle α of the cam portion 2b of the outputting member 2. The angle θw is hereinafter referred to as a wedge angle θw.

The wedge angle θw is an important angle for providing the contact members 5 with wedge action described later, and each of wedge-shaped space portions 8 with the wedge angle θw is formed between the cam portion 2b of the outputting member 2 and the cylindrical inner wall surface 3a of the stationary member 3.

In FIG. 26, the wedge-shaped space portions 8 are formed at four positions so that wedge directions of the adjacent wedge-shaped space portions 8 are opposite from each other with respect to a rotational direction, and are disposed so that two adjacent wedge-shaped space portions 8 and other two adjacent wedge-shaped space portions 8 are symmetrical with respect to the center of the rotation shaft 7.

Parts (a) and (b) of FIG. 27 are perspective views of the contact members 5. FIG. 28 is a front view of the contact member 5. The contact member 5 is contactable to the inputting member 1, the outputting member 2 and the stationary member 3.

As shown in FIGS. 22 to 25, 27 and 28, the contact member 5 includes a driven portion 5a with which the input contact portion 1c of the inputting member 1 is engaged and an arcuate (sector-shaped) engaging portion (first contact surface) 5b contacting the cylindrical inner wall surface 3a. The arcuate engaging portion 5b has the same diameter as an inner peripheral diameter of the cylindrical inner wall surface 3a of the stationary member 3. The arcuate engaging portion 5b which is the first contact surface of the contact member 5 is provided with a plurality of groove portions 5c which are recessed from the arcuate engaging portion 5b and which do not contact the stationary member 3. The plurality of groove portions 4c extend in a rotational axis direction (indicated by a chain line in FIG. 23). The arcuate engaging portion 5b of each of the contact members 5 and the cylindrical inner wall surface 3a of the stationary member 3 surface-contact each other. A range in which the arcuate engaging portion 5b surface-contacts the cylindrical inner wall surface 3a is within a range of an angle β formed by a rectilinear line r1 connecting a rotation center of the clutch CL1 and one end of the arcuate engaging portion 4b and a rectilinear line r2 connecting the rotation center of the clutch CL1 and the other end of the arcuate engaging portion 5b. Specifically, the angle β is within a range from 60 degrees to 180 degrees. However, the angle β is not limited to the above-described range. Conventionally, the clutch is locked by point contact, and on the other hand, in the present invention, there is an effect when the clutch is locked by surface contact. The above-described plurality of groove portions 5c are provided within the range of the angle β in which the arcuate engaging portion 5b of the contact member 5 contacts the cylindrical inner wall surface 3a of the stationary member 3. The contact member 5 includes a cam contact surface (second contact surface) 5d contacting the operation 2b which is the output contact portion of the outputting member 2, two bosses 5e, and two rotation contact portions 5g.

FIG. 29 is a perspective view of the clutch CL1 during assembling.

As shown in FIGS. 23 and 29, during the assembling of the clutch CL1, by contact of the rotation contact portions 5g with each other, two contact members 5 are disposed (accommodated) symmetrically with respect to the rotational axis center in the above-described wedge-shaped space portions 8.

The urging members 6 are provided on the bosses 5e of the contact members 5 at two positions so that each of the contact members 5 is urged toward the cylindrical inner wall surface 3a of the stationary member 3 and thus the arcuate engaging portion 5b of the contact member 5 contacts the cylindrical inner wall surface 3a of the stationary member 3.

An urging force of the urging member 6 is constituted by an urging force such that a predetermined frictional force is generated between the arcuate engaging portion 5b of each of the contact members 5 and the cylindrical inner wall surface 3a of the stationary member 3.

[Operation of Clutch CL1]

An operation of the clutch CL1 will be described with reference to FIGS. 30 to 33. FIG. 30 is a sectional view of the clutch CL1 in a state in which the input torque from the inputting member 1 is transmitted to the outputting member 2, and FIG. 31 is a sectional view of the clutch CL1 in a state in which a reverse input torque from the outputting member 2 is cut off. FIG. 32 is a sectional view of the clutch CL1 in a state in which the input torque in a direction opposite to the direction in FIG. 30 is transmitted to the outputting member 2, and FIG. 33 is a sectional view of the clutch CL1 in a state in which the reverse input torque in a direction opposite to the direction in FIG. 31 is cut off.

First, the case where the input torque for rotating the inputting member 1 in one rotational direction (arrow A directions) is inputted will be described with reference to FIG. 30. As shown in FIG. 30, the input engaging portions 1b of the inputting member 1 are rotated in arrow A directions by the input torque (rotational driving force), so that the input engaging portions 1b of the inputting member 1 engage with the output engaging portions 2a of the outputting member 2 and thus the inputting member 1 rotates the outputting member 2 in the arrow A directions.

The input contact portions 1c of the inputting member 1 engage with the driven portions 5a of the contact members 5 and rotate the contact members 5, and the arcuate engaging portions 5b are rotated in the arrow A directions by the urging forces of the urging members 6 while slide-contacting the cylindrical inner wall surface 3a of the stationary member 3. Incidentally, FIG. 9 is the sectional view of the clutch CL1 as seen on a plane (cross-section) perpendicular to the rotational axis (indicated by the chain line of FIG. 29) of the inputting member 1. As shown in FIG. 30, in the case where the clutch CL1 is seen on the plane perpendicular to the rotational axis of the inputting member 1, the input contact portions 1c of the inputting member 1 contacting the contact members 5 are surrounded by the contact members 5.

In the case where there are dust or the like and a small foreign matter between the arcuate engaging portion 5b and the cylindrical inner wall surface 3a, these matters are scraped off in the groove portions 5c by the groove portions 5c of the contact members 5.

The contact members 5 rotating while slide-contacting the cylindrical inner wall surface 3a of the stationary member 3 are in a lock-released state in which the cam portions 2b of the outputting members 2 and the cam contact surfaces 5d of the contact members 5 do not engage with each other. Thus, in the rotation of the inputting member 1, in a state in which the input engaging portions 1b and the output engaging portions 2a engage with each other, the cam portions 2b of the outputting member 2 and the cam contact surfaces 5d are in a spaced phase relationship.

Next, the case where the reverse input torque for rotating the outputting member 2 in the same direction (the above-described one direction, the arrow A directions) as the rotational direction of the inputting member 1 is inputted will be described with reference to FIG. 31. As shown in FIG. 31, the input engaging portions 1b of the inputting member 1 are rotated in the arrow A directions by the input torques (rotational driving forces) so that a state in which reverse input torques (rotational forces) B in the same rotational direction as that of the image 1 are generated in the outputting member 2 is formed.

When the reverse input torques (rotational forces) B are generated in the outputting member 2, the outputting member 2 is rotated by the reverse input torques B at a rotational speed faster than a rotational speed of the inputting member 1. As a result, the cam portions 2b of the outputting member 2 engage with the cam contact surfaces 5d of the contact members 5, so that the input engaging portions 1b of the inputting member 1 and the output engaging portions 2a of the outputting member 2 are spaced from each other.

Then, an urging force C is generated by the contact of the cam portions 2b of the outputting member 2 with the cam contact surfaces 5d of the contact member 5, so that the arcuate engaging portions 5b of the contact members 5 are urged against the cylindrical inner wall surface 3a of the stationary member 3. The contact members 5 are in a locked state by generation of wedge action such that the contact members 5 bite into the wedge-shaped space portions 8 shown in FIG. 26.

When the contact members 5 are in the locked state, the contact members 5 lock rotation of the outputting member 2 is by the reverse input torques B at the rotational speed faster than the rotational speed of the inputting member 1. As a result, the reverse input torques B from the outputting member 2 are cut off and thus are not transmitted toward the inputting member 1.

Then, when the state of the clutch CL1 is changed from the state of FIG. 31 to a state in which the reverse input torques B do not generate in the outputting member 2, as described above with reference to FIG. 30, a state in which the input engaging portions 1b of the inputting member 1 are engaged again with the output engaging portions 2a of the outputting member 2 by the rotation of the inputting member 1 in the arrow A direction is formed. As a result, the input contact portions 1c of the inputting member 1 engage with the driven portions 5a of the contact members 5 and rotate the contact members 5, so that the contact members 5 are operated from the locked state in which the contact members 5 bite by the wedge action to the lock-released state.

Thus, when the contact members 5 are in the lock-released state, the input torque from the inputting member 1 is transmitted to the outputting member 2, and in addition, when the contact members 5 are in the locked state, the reverse input torque from the outputting member 2 is cut off and is not transmitted toward the inputting member 1.

Next, the case where the input torque for rotating the inputting member 1 in the other rotational direction (arrow Ar directions) which is an opposite direction to the above-described one rotational direction (arrow A directions) is inputted will be described with reference to FIG. 32. As shown in FIG. 32, the input engaging portions 1b of the inputting member 1 are rotated in the arrow A directions, which are opposite to the arrow A directions shown in FIG. 30, by the input torque. The input engaging portions 1b of the inputting member 1 engage with the output engaging portions 2a of the outputting member 2 and thus the inputting member 1 rotates the outputting member 2 in the arrow Ar directions.

The input contact portions 1c of the inputting member 1 engage with the driven portions 5a of the contact members 5 and rotate the contact members 5, and the arcuate engaging portions 5b are rotated in the arrow Ar directions by the urging forces of the urging members 6 while slide-contacting the cylindrical inner wall surface 3a of the stationary member 3.

The contact members 5 rotating while slide-contacting the cylindrical inner wall surface 3a of the stationary member 3 are, similarly as in FIG. 30, in a lock-released state in which the cam portions 2b of the outputting members 2 and the cam contact surfaces 5d of the contact members 5 do not engage with each other.

Next, the case where the reverse input torque for rotating the outputting member 2 in the same direction (the above-described the other direction, the arrow Ar directions) as the rotational direction of the inputting member 1 is inputted will be described with reference to FIG. 33. As shown in FIG. 33, the input engaging portions 1b of the inputting member 1 are rotated in the arrow Ar directions by the input torque, so that a state in which reverse input torques Br in the same rotational direction as that of the inputting member 1 are generated in the outputting member 2 is formed. When the reverse input torques (rotational forces) Br are generated in the outputting member 2, similarly as in FIG. 31 described above, the input engaging portions 1b of the inputting member 1 and the output engaging portions 2a of the outputting member 2 are spaced from each other. Then, an urging force C is generated by the contact of the cam portions 2b of the outputting member 2 with the cam contact surfaces 5d of the contact member 5, so that the wedge action generates and thus the contact members 5 are in a locked state. As a result, the reverse input torques Br from the outputting member 2 are cut off and thus are not transmitted toward the inputting member 1.

Then, when the state of the clutch CL1 is changed from the state of FIG. 33 to a state in which the reverse input torques Br do not generate in the outputting member 2, as described above with reference to FIG. 32, by the rotation of the inputting member 1 in the arrow Ar direction, the contact members 5 are operated from the locked state in which the contact members 5 bite by the wedge action to the lock-released state.

Thus, when the contact members 5 are in the lock-released state, the bi-directional input torque from the inputting member 1 is transmitted to the outputting member 2. When the contact members 5 are in the locked state, in the case where the bi-directional reverse input torque generates in the outputting member 2, the contact members 5 are in the lock-released state, so that rotation of the outputting member 2 is locked and thus the reverse input torque likely to flow toward the inputting member 1 is cut off.

[Wedge Action Condition of Contact Member 5]

The clutch CL1 in this embodiment has the above-described wedge angle θw in FIG. 26. Further, as shown in FIGS. 30 and 31 and FIGS. 32 and 33, the clutch CL1 has a frictional coefficient μ1 between the cylindrical inner wall surface 3a of the stationary member 3 and each of the arcuate engaging portions 5b of the contact members 5 and a frictional coefficient μ2 between each of the cam portions 2b of the outputting member 2 and an associated cam contact surface 5d of the contact members 5.

As regards the clutch CL1, the wedge action generates in the contact members 5 when the outputting member 2 is likely to be rotated by the reverse input torque. As a condition capable of locking the rotation of the contact member 2 with reliability, the clutch CL1 is constituted so that the following relational expression holds:

$$\mu1+\mu2>2\tan(\theta w/2),$$

which is a replaced calculation formula of general wedge action.

As regards the shape of the cam portions 2b in this embodiment, even other than the logarithmic helical shape, another helical shape such as Archimedes helical shape may also be employed when the tangential line angle α of each of the cam portions 2b is within a range satisfying the wedge angle θw in which the contact member 5 is in the locked state.

The shape of the plurality of the groove portions 5c of the contact members 5 is not necessary since the shape does not affect the relational expression of the wedge angle θw in which the contact members 5 are in the locked state.

As described above, the clutch CL1 in this embodiment includes the two contact members 5 accommodated in the wedge-shaped space portions 8 so as to be positioned symmetrically with respect to the rotational axis center. Thus, also the input engaging portions 1b and the input contact portions 1c of the inputting member 1 and the output engaging portion 2a and the cam portions 2b of the outputting member 2 are constituted by a small number of component parts of the clutch CL1 correspondingly to the number of the contact members 5, and therefore, a structure of the clutch CL1 is simplified.

Further, each of the contact members 5 is constituted so that the sector-shaped arcuate engaging portion 5b and the cylindrical inner wall surface 3a of the stationary member 3 surface-engage with each other. As a result, the contact member 5 can reduce a surface pressure exerted on the contact member 5 and the stationary member 3, so that materials constituting the respective members can also be constituted by a resin material such as polyacetal, not a metallic material resistant to abrasion and breakage. As a result, it becomes possible to provide an inexpensive clutch. Incidentally, similarly as in the above-described contact members 5, also the above-described inputting member 1, outputting member 2 and stationary member 3 are formed of the resin material.

Also in the case where the members of the clutch CL1 are constituted by the metallic material, there is no need to constitute the members with the contact members 5 such as many rollers, balls or the like, and therefore, the structure of the clutch CL1 is simplified. Further, the resistances to the abrasion and the breakage are further improved.

By constituting the wedge angle θw so as to be certain angle, it is possible to minimize an error of the wedge angle θw due to accuracy errors of members, such as those of outer diameters of the cam portions 2b of the outputting member 2 and the arcuate engaging portions 5b of the contact members and an inner diameter of the cylindrical inner wall surface 3a of the stationary member 3.

As a result, in the above-described relational expression of the wedge action, a tolerance of the wedge angle θw with respect to the frictional coefficient µ1 between the cylindrical inner wall surface 2a and the stationary member 3 and the arcuate engaging portion 5b of the contact member 5 and the frictional coefficient µ2 between the cam portion 2b of the outputting member 2 and the cam contact surface 5d of the contact member 5 is improved.

Fifth Embodiment

A constitution of a reverse input cutoff clutch in this embodiment will be described with reference to FIGS. 34 to 37. FIG. 34 is a perspective view of a reverse input cutoff clutch CL2 (hereinafter simply referred to as a clutch CL2) before assembling. Incidentally constituent elements similar to those in Fourth Embodiment described above are represented by adding similar reference numerals or symbols and will be omitted from description.

[Structure of Clutch CL2]

As shown in FIG. 34, the clutch CL2 includes an inputting member 1 to which an input torque of a driving source M1 is inputted, an outputting member 20 to which the input torque is transmitted, a stationary member 3 of which rotation is constrained, a single contact member 5 and two urging members 6 for urging the contact member 5. The above-described members constituting the clutch CL1 are disposed coaxially with a rotation shaft 7 provided with a pin portion 7a, and the members other than the stationary member 3 are provided rotatably.

Parts (a) and (b) of FIG. 35 are perspective views of the outputting member 20. FIG. 36 is a sectional view showing a positional relationship between the outputting member 20 and the stationary member 3.

As shown in FIG. 35, the outputting member 20 includes output engaging portions 20a to which the input torque is transmitted in engagement with the input engaging portion 1b (FIG. 24) of the inputting member 1 and two curved surface-shaped cam portions 20b engaging with the contact member 5 (FIG. 34).

As shown in FIGS. 34 and 35, the outputting member 20 includes a pin groove 20c connected with the pin portion 7a of the rotation shaft 7, and the input torque transmitted to the outputting member 20 is transmitted to a follower (driven) portion R via the pin portion 7a.

The outputting member 20 further includes a (sector-shaped) arcuate output portion 20d which has a diameter substantially equal to an inner peripheral diameter of the cylindrical inner wall surface 3a of the stationary member 3 and which contacts the cylindrical inner wall surface 3a, and includes two bosses 20e.

The arcuate output portion 20d of the outputting member 20 shown in FIG. 35 has the arcuate shape, but may also be provided with groove portions, such as the groove portion 5c (FIG. 27) of the contact member 5, for scraping off dust or the like and a small foreign matter which enter between the arcuate engaging portion 5b and the cylindrical inner wall surface 3a. That is, similarly as the plurality of groove portions 5c provided on the arcuate engaging portion 5b as the first contact surface of the contact member 5, on the arcuate output portion 20d of the above-described outputting member 20, a plurality of groove portions which do not contact the stationary member 3 may also be formed.

As shown in FIG. 36, the cam portions 20b of the outputting member 20 are formed in a logarithmic helical shape with a tangential line angle α similarly as the cam portions 20b in Fourth Embodiment, and are disposed so that winding directions of the adjacent helical cam portions 20b are opposite from each other.

Two wedge-shaped space portions 8 with an wedge angle θw are formed between the cylindrical inner wall surface 3a of the stationary member 3 and the cam portions 20b of the outputting member 20 so that wedge directions of the adjacent wedge-shaped space portions 8 are opposite from each other with respect to the rotational direction.

FIG. 37 is a perspective view of the clutch CL2 during assembling.

As shown in FIGS. 34 and 37, during the assembling of the clutch CL2, single contact member 5 is accommodated in the above-described wedge-shaped space portions 8.

The urging members 6 are provided on the bosses 5e of the contact member 5 and on bosses 20e of the outputting member 20 and urges the contact member 5 toward the cylindrical inner wall surface 3a of the stationary member 3.

The contact member 5 is disposed at a position opposing the arcuate output portion 20d of the outputting member 20 with respect to the center of the rotation shaft 7, and by an urging force of the urging member 6, the arcuate engaging portion 5b of the contact member 5 contacts the cylindrical inner wall surface 3a of the stationary member 3.

[Operation of Clutch CL2]

An operation of the clutch CL1 will be described with reference to FIGS. 38 to 41. FIG. 38 is a sectional view of the clutch CL2 in a state in which the input torque from the inputting member 1 is transmitted to the outputting member 20, and FIG. 39 is a sectional view of the clutch CL2 in a state in which a reverse input torque from the outputting member 20 is cut off. FIG. 40 is a sectional view of the clutch CL2 in a state in which the input torque in a direction opposite to the direction in FIG. 38 is transmitted to the outputting member 20, and FIG. 41 is a sectional view of the clutch CL2 in a state in which the reverse input torque in a direction opposite to the direction in FIG. 39 is cut off.

As shown in FIG. 38, the input engaging portions 1b of the inputting member 1 are rotated in arrow A directions by the input torque, so that the input engaging portions 1b of the inputting member 1 engage with the output engaging portions 20a of the outputting member 20 and thus the inputting member 1 rotates the outputting member 20 in the arrow A directions.

The input contact portions 1c of the inputting member 1 engage with the driven portions 5a of the contact member 5 and rotate the contact members 5, and the arcuate engaging portions 5b are rotated in the arrow A directions by the urging forces of the urging members 6 while slide-contacting the cylindrical inner wall surface 3a of the stationary member 3. Incidentally, FIG. 38 is the sectional view of the clutch CL2 as seen on a plane (cross-section) perpendicular to the rotational axis (indicated by the chain line of FIG. 37) of the inputting member 1. As shown in FIG. 38, in the case where the clutch CL2 is seen on the plane perpendicular to the rotational axis of the inputting member 1, the input contact portions 1c of the inputting member 1 contacting the contact members 5 are surrounded by the contact member 5.

The contact member 5 rotating while slide-contacting the cylindrical inner wall surface 3a of the stationary member 3 is in a lock-released state in which the cam portions 20b of the outputting members 2 and the cam contact surface 5d of the contact member 5 do not engage with each other.

As shown in FIG. 39, the input engaging portions 1b of the inputting member 1 are rotated in the arrow A directions by the input torques so that a state in which reverse input torques B in the same rotational direction as that of the image 1 are generated in the outputting member 20 is formed.

When the reverse input torques B are generated in the outputting member 20, the outputting member 20 is rotated by the reverse input torques B at a rotational speed faster than a rotational speed of the inputting member 1. As a result, the cam portions 20b of the outputting member 20 engage with the cam contact surfaces 5d of the contact member 5, so that the input engaging portions 1b of the inputting member 1 and the output engaging portions 20a of the outputting member 20 are spaced from each other.

Then, an urging force C is generated by the contact of the cam portions 2b of the outputting member 20 with the cam contact surface 5d of the contact member 5, so that the arcuate engaging portion 5b of the contact member 5 are urged against the cylindrical inner wall surface 3a of the stationary member 3. The contact member 5 is in a locked state by generation of wedge action such that the contact members 5 bite into the wedge-shaped space portions 8 shown in FIG. 36.

Further, when an operation for putting the contact member 5 in the locked state is performed, a slide-contact pressure between the arcuate output portion 20d of the outputting member 20 and the cylindrical inner wall surface 3a of the stationary member 3 increases due to the urging force C, so that a slide-contact resistance between the outputting member 20 and the stationary member 3 increases.

Thus, by the locked state of the contact member 5 and the slide-contact resistance between the outputting member 20 and the stationary member 3, the outputting member 20 is prevented from being rotated by the reverse input torques B at the rotational speed faster than the rotational speed of the inputting member 1. As a result, the reverse input torques B from the outputting member 20 are cut off and thus are not transmitted toward the inputting member 1.

Then, when the state of the clutch CL2 is changed from the state of FIG. 39 to a state in which the reverse input torques B do not generate in the outputting member 20, as described above with reference to FIG. 38, a state in which the input engaging portions 1b of the inputting member 1 are engaged again with the output engaging portions 20a of the outputting member 20 by the rotation of the inputting member 1 in the arrow A direction is formed. As a result, the input contact portions 1c of the inputting member 1 engage with the driven portions 5a of the contact members 5 and rotate the contact members 5, so that the contact members 5 are operated from the locked state in which the contact members 5 bite by the wedge action to the lock-released state.

When the contact member 5 is in the lock-released state, the slide-contact pressure between the arcuate output portion 20d of the outputting member 20 and the cylindrical inner wall surface 3a of the stationary member 3 returns to the slide-contact pressure due to the urging force of the urging members 6. As a result, the arcuate output portion 20d of the outputting member 20 rotates while slide-contacting the cylindrical inner wall surface 3a of the stationary member 3.

Thus, when the contact members 5 are in the lock-released state, the input torque from the inputting member 1 is transmitted to the outputting member 20, and in addition, when the contact member 5 is in the locked state, the reverse input torque from the outputting member 20 is cut off and is not transmitted toward the inputting member 1.

On the other hand, as shown in FIG. 40, the input engaging portions 1b of the inputting member 1 are rotated in the arrow A directions, which are opposite to the arrow A directions shown in FIG. 38, by the input torque. The input engaging portions 1b of the inputting member 1 engage with the output engaging portions 20a of the outputting member 20 and thus the inputting member 1 rotates the outputting member 20 in the arrow Ar directions.

The input contact portions 1c of the inputting member 1 engage with the driven portions 5a of the contact member 5 and rotate the contact members 5, and the arcuate engaging portions 5b are rotated in the arrow Ar directions by the urging forces of the urging members 6 while slide-contacting the cylindrical inner wall surface 3a of the stationary member 3.

The contact members 5 rotating while slide-contacting the cylindrical inner wall surface 3a of the stationary member 3 are, similarly as in FIG. 38, in a lock-released state in which the cam portions 2b of the outputting members 20 and the cam contact surface 5d of the contact member 5 do not engage with each other.

As shown in FIG. 41, the input engaging portions 1b of the inputting member 1 are rotated in the arrow Ar directions by the input torque, so that a state in which reverse input torques Br in the same rotational direction as that of the inputting member 1 are generated in the outputting member 20 is formed.

When the reverse input torques (rotational forces) Br are generated in the outputting member 20, similarly as in FIG. 38 described above, the input engaging portions 1b of the inputting member 1 and the output engaging portions 20a of the outputting member 20 are spaced from each other. Then, an urging force C is generated by the contact of the cam portions 20b of the outputting member 20 with the cam contact surfaces 5d of the contact member 5, so that the wedge action generates and thus the contact members 5 are in a locked state. As a result, the reverse input torques Br from the outputting member 2 are cut off and thus are not transmitted toward the inputting member 1.

Then, when the state of the clutch CL2 is changed from the state of FIG. 41 to a state in which the reverse input torques Br do not generate in the outputting member 20, as described above with reference to FIG. 40, by the rotation of the inputting member 1, the contact member 5 is operated from the locked state in which the contact member 5 bites by the wedge action to the lock-released state.

Thus, when the contact members 5 are in the lock-released state, the bi-directional input torque from the inputting member 1 is transmitted to the outputting member 20. In the case where the bi-directional reverse input torque generates in the outputting member 20, the contact member 5 is in the lock-released state, so that rotation of the outputting member 20 is locked and thus the reverse input torque likely to flow toward the inputting member 1 is cut off.

According to the above-described explanation, the clutch CL2 in this embodiment includes the outputting member 20 provided with the sector-shaped arcuate output portion 20d contacting the cylindrical inner wall surface 3a of the stationary member 3, and the single contact member 5 is accommodated in the wedge-shaped space portions 8. The contact member 5 is disposed at the position opposing the arcuate output portion 20d of the outputting member 20 with respect to the center of the rotation shaft 7.

As a result, the number of component parts of the contact member(s) 5 is decreased from 2 to 1, so that the number of component parts constituting the clutch CL2 is further decreased, and therefore, the structure of the clutch CL2 can be further simplified and can be reduced in cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2017-002417 filed on Jan. 11, 2017, 2017-120277 filed on Jun. 20, 2017 and 2017-208848 filed on Oct. 30, 2017, which are hereby incorporated by reference herein in their entirety.

What is claimed is:

1. A clutch comprising:
an inputting member rotatable by input of an input torque;
a rotatable outputting member to which the input torque is transmitted through said inputting member;
a stationary member including a cylindrical inner wall surface surrounding said inputting member and said outputting member and configured to be mounted on a mounting portion in a rotation prevented state; and
a contact member contactable to said inputting member, said outputting member and said stationary member,
wherein said outputting member includes an output contact portion contactable to an input engaging portion of said inputting member,
wherein said contact member is positioned between said outputting member and said stationary member and includes an arcuate first contact surface configured to contact the cylindrical inner wall surface of said stationary member and a second contact surface contactable to said output contact portion,
wherein when the input torque for rotating said inputting member in a rotational direction is inputted, said outputting member and said contact member rotate in contact with said inputting member, and
wherein when a reverse input torque for rotating said outputting member in the rotational direction is inputted, the input engaging portion of said inputting member and the output contact portion of said outputting member are spaced from each other, and said output contact portion of said outputting member urges the first contact surface against the cylindrical inner wall surface of said stationary member by urging the second contact surface of said contact member thereby to prevent rotation of said outputting member.

2. The clutch according to claim 1, wherein the first contact surface of said contact member has an arcuate shape, and
wherein, when seen in a plane perpendicular to the axis of rotation of said inputting member and outputting member, an angle θ between a tangential line of the first contact surface at a position on an extended line connecting a rotation center of said outputting member and a contact portion where said output contact portion and the second contact surface contact each other, and the second contact surface including the contact portion is substantially equal to an angle θw between a tangential line of said output contact portion of said outputting member and a tangential line of the cylindrical inner wall surface of said stationary member at a position on an extended line connecting the rotation center of said outputting member to said output contact portion.

3. The clutch according to claim 1, wherein said contact member is provided in plurality and each of said contact members is held by a holding member.

4. The clutch according to claim 3, wherein said contact members include rotation contact portions, and the first contact surfaces of said contact members contact the cylindrical inner wall surface through contact of the respective rotation contact portions, and
wherein said contact members are disposed at symmetrical positions with respect to the rotation center.

5. The clutch according to claim 1, wherein said outputting member includes an arcuate output portion slide contacting the cylindrical inner wall surface of said stationary member, and
wherein said contact member includes a rotation contact portion contactable to said outputting member.

6. A clutch comprising:
an inputting member rotatable by input of an input torque;
a rotatable outputting member to which the input torque is transmitted from said inputting member;
a stationary member including a cylindrical inner wall surface surrounding said inputting member and said outputting member and configured to be mounted on a mounting portion in a rotation prevented state; and a contact member contactable to said inputting member, said outputting member and said stationary member, wherein said outputting member includes an output contact portion contactable to an input engaging portion of said inputting member, wherein said contact member is positioned between said outputting member and said stationary member and includes an arcuate first contact surface configured to contact the cylindrical inner wall surface of said stationary member and a second contact surface contactable to said output contact portion, wherein when the input torque for rotating said inputting member in one rotational direction is inputted, said outputting member and said contact member rotate in the one rotational direction in contact with said inputting member, wherein when a reverse input torque for rotating said outputting member in the one rotational direction is inputted, the input engaging portion of said inputting member and the output contact portion of said outputting member are spaced from each other, and said output contact portion of said outputting member urges the first contact surface against said stationary member by urging the second contact surface of said contact member thereby to prevent rotation of said outputting member in the one rotational direction, wherein when the input torque for rotating said inputting member in the other rotational direction opposite to the one rotational direction is inputted, said outputting member and said contact member rotate in the other rotational direction in contact with said inputting member, and wherein when a reverse input torque for rotating said outputting member in the other rotational direction is inputted, the input engaging portion of said inputting member and the output contact portion of said outputting member are spaced from each other, and said output contact portion of said outputting member urges the first contact surface against the cylindrical inner wall surface of said stationary member by urging the second contact surface of said contact member thereby to prevent rotation of said outputting member in the other rotational direction.

7. The clutch according to claim 6, wherein said inputting member includes an input engaging portion engageable with said outputting member and an input contact portion contactable to said contact member, wherein said output contact portion of said outputting member includes an output engaging portion engaging with said input engaging portion of said inputting member and a cam portion contactable to the second contact surface of said contact member, wherein said contact member includes a driven portion contactable to said input contact portion of said inputting member, wherein when said input engaging portion engages with said output engaging portion by the input torque for rotating said inputting member, the input torque from said inputting member is transmitted to said outputting member, and said cam portion of said outputting member and the second contact surface of said contact member are spaced from each other and said input contact portion of said inputting member drives said driven portion of said contact member, and wherein when the reverse input torque for rotating said outputting member is inputted, said output engaging portion of said outputting member is spaced from said input engaging portion of said inputting member, and said cam portion of said outputting member urges said first contact surface against the cylindrical inner wall surface of said stationary member by urging the second contact surface of said contact member thereby to prevent rotation of said outputting member.

8. The clutch according to claim 6, wherein said contact member is provided at two positions so as to be symmetrically disposed with respect to a center of a rotational axis, and wherein said contact members include rotation contact portions contacting each other.

9. The clutch according to claim 7, wherein said outputting member includes an arcuate output portion slide contacting the cylindrical inner wall surface of said stationary member, wherein said contact member includes a rotation contact portion contactable to said outputting member, and wherein when the reverse input torque is inputted:
said input engaging portion of said inputting member and said output engaging portion of said outputting member are spaced from each other,
said contact member contacts said output contact portion of said outputting member and the cylindrical inner wall surface of said stationary member,
said arcuate output portion of said outputting member is urged against the cylindrical inner wall surface of said stationary member, and
rotation of said outputting member is locked by wedge action of said contact member thereby to block the reverse input torque with respect to two directions.

10. The clutch according to claim 5, wherein said arcuate output portion of said outputting member is provided with a plurality of groove portions.

11. A clutch comprising:
an inputting member rotatable by input of an input torque;
a rotatable outputting member to which the input torque is transmitted from said inputting member;
a stationary member including a cylindrical inner wall surface surrounding said inputting member and said outputting member and configured to be mounted on a mounting portion in a rotation prevented state; and
a contact member contactable to said inputting member, said outputting member and said stationary member, wherein said outputting member includes an output contact portion contactable to an input engaging portion of said inputting member, wherein said contact member is positioned between said outputting member and said stationary member and includes an arcuate first contact surface configured to contact the cylindrical inner wall surface of said stationary member and a second contact surface contactable said output contact portion, wherein when a rotational force with respect to one rotational direction is inputted to said inputting member, said outputting member and said contact member rotate in the one rotational direction in contact with said inputting member, wherein when a rotational force for rotating said outputting member in the one rotational direction at a rotational speed faster than a rotational speed of said inputting member generates in said outputting member, the input engaging portion of said inputting member and the output contact portion of said outputting member are spaced from each other, and said output contact portion of said outputting member urges the first contact surface against said stationary member by urging the second contact surface of said contact member thereby to prevent rotation of said outputting member in the one rotational direction, wherein when a rotational force with respect to the other rotational direction opposite to the one rotational direction is inputted to said inputting member, said outputting member and said contact member rotate in the other rotational direction in contact with said inputting member, and wherein when a rotational force for rotating said outputting member in the other rotational direction at a rotational speed faster than a rotational speed of said inputting member generates in said outputting member, the input engaging portion of said inputting member and the output contact portion of said outputting member are spaced from each other, and said output contact portion of said outputting member urges the first contact surface against the cylindrical inner wall surface of said stationary member by urging the second contact surface of said contact member thereby to prevent rotation of said outputting member in the other rotational direction.

12. The clutch according to claim 11, further comprising an urging member configured to urge said contact member against said stationary member, wherein said inputting member includes an input contact portion contactable to said contact member, wherein said contact member includes a driven portion contactable to said input contact portion of said contact member and is urged against said stationary member by said urging member, and wherein when a rotational driving force is inputted to said inputting member, said input contact portion is contacted to said driven portion, and said contact member is rotated in the same direction as said inputting member while slide contacting the cylindrical inner wall surface of said stationary member.

13. The clutch according to claim 1, wherein the following relationship is satisfied:

$$\mu 1 + \mu 2 > 2 \tan(\theta w/2),$$

where $\mu 1$ is a friction coefficient in contact between said contact member and said stationary member, $\mu 2$ is a friction coefficient in contact between said contact member and said outputting member, and $\theta w$ is an angle between a tangential line of said output contact portion of said outputting member and a tangential line of the cylindrical inner wall surface of said stationary member at a position on an extended line connecting a center of a rotational axis of said outputting member to said output contact portion.

14. The clutch according to claim 1, wherein the first contact surface is provided with a plurality of groove portions which are in non contact with said stationary member.

15. The clutch according to claim 1, wherein said contact member is formed of a resin material.

16. The clutch according to claim 1, wherein said contact member is formed of a metallic material.

17. The clutch according to claim 1, wherein each of said inputting member, said outputting member and said stationary member is formed of a resin material.

18. The clutch according to claim 1, wherein when said clutch is seen on a plane perpendicular to a rotational axis of said inputting member, said input contact portion of said inputting member contactable to said outputting member is surrounded by said contact member.

19. The clutch according to claim 1, wherein an angle formed by a rectilinear line connecting a rotation center and one end of the first contact surface and a rectilinear line connecting the rotation center and the other end of the first contact surface is within a range from 60 degrees to 180 degrees.

20. The clutch according to claim 1, wherein said output contact portion of said outputting member has a helical shape.

21. The clutch according to claim 20, wherein said output contact portion of said outputting member has a logarithmic helical shape or an Archimedes helical shape.

22. The clutch according to claim 14, wherein the plurality of groove portions extend in a rotational axis direction.

23. A drive transmission device comprising:
the clutch according to claim 1, wherein said clutch transmits an input torque from an inputting member to an outputting member, and when a reverse input torque inputted from said outputting member toward said inputting member, the reverse input torque is blocked;
a gear configured to transmit a driving force to said inputting member; and
a gear configured to transmit the driving force from said outputting member.

24. A image forming apparatus comprising:
the drive transmission device according to claim 23, wherein said drive transmission device transmits the driving force to a cam member configured to space a press contacted roller pair; and
said cam member configured to space the roller pair.

* * * * *